US007588808B2

(12) United States Patent
Hutchinson et al.

(10) Patent No.: US 7,588,808 B2
(45) Date of Patent: Sep. 15, 2009

(54) MONO AND MULTI-LAYER ARTICLES AND INJECTION MOLDING METHODS OF MAKING THE SAME

(75) Inventors: Gerald A. Hutchinson, Coto De Caza, CA (US); Robert A. Lee, Bowdon Cheshire (GB); Said K. Farha, Pleasantville, NY (US)

(73) Assignee: Advanced Plastics Technologies Luxembourg S.A., Luxembourg (LU)

( * ) Notice: Subject to any disclaimer, the term of this patent is extended or adjusted under 35 U.S.C. 154(b) by 178 days.

(21) Appl. No.: 11/108,345

(22) Filed: Apr. 18, 2005

(65) Prior Publication Data

US 2006/0073294 A1    Apr. 6, 2006

Related U.S. Application Data

(60) Provisional application No. 60/563,021, filed on Apr. 16, 2004, provisional application No. 60/575,231, filed on May 28, 2004, provisional application No. 60/586,399, filed on Jul. 7, 2004, provisional application No. 60/620,160, filed on Oct. 18, 2004, provisional application No. 60/643,008, filed on Jan. 11, 2005.

(51) Int. Cl.
*B32B 1/02* (2006.01)
*B32B 5/18* (2006.01)
*B32B 27/04* (2006.01)
*B32B 27/32* (2006.01)
*B32B 27/36* (2006.01)

(52) U.S. Cl. .................. 428/35.7; 428/313.3; 428/480; 428/523; 428/542.8

(58) Field of Classification Search ................ 428/35.7, 428/36.5, 304.4, 305.5, 500, 516, 523
See application file for complete search history.

(56) References Cited

U.S. PATENT DOCUMENTS

| 2,708,288 | A |   | 5/1955  | Fuller et al. |
|-----------|---|---|---------|---------------|
| 3,221,954 | A | * | 12/1965 | Lux ........................... 222/566 |
| 3,224,043 | A |   | 12/1965 | Lameris et al. |
| 3,305,528 | A |   | 2/1967  | Wynstra et al. |
| 3,317,471 | A |   | 5/1967  | Johnson et al. |
| 3,395,118 | A |   | 7/1968  | Reining et al. |
| 3,401,475 | A |   | 9/1968  | Morehouse et al. |
| 3,418,398 | A |   | 12/1968 | Seefluthy |
| 3,430,680 | A |   | 3/1969  | Leghorn |

(Continued)

FOREIGN PATENT DOCUMENTS

CA    1 174 020    9/1984

(Continued)

OTHER PUBLICATIONS

Proceedings of 3$^{rd}$ International Conference on Rigid Polyester Packaging Innovations for Food and Beverages; Nova-Pak Americas '98 (1998).

(Continued)

*Primary Examiner*—Ramsey Zacharia
(74) *Attorney, Agent, or Firm*—Knobbe Martens Olson & Bear LLP

(57) ABSTRACT

In preferred embodiments methods and apparatuses can produce articles that have formable material. The articles may be mono and multilayer. The articles can be formed by various methods.

20 Claims, 32 Drawing Sheets

U.S. PATENT DOCUMENTS

| | | |
|---|---|---|
| 3,482,284 A | 12/1969 | Rees |
| 3,535,144 A | 10/1970 | Gunderman et al. |
| 3,632,267 A | 1/1972 | Kader |
| 3,719,735 A | 3/1973 | Valyi |
| 3,740,181 A | 6/1973 | Uhlig |
| 3,810,965 A | 5/1974 | Sen et al. |
| 3,813,198 A | 5/1974 | Valyi |
| 3,819,314 A | 6/1974 | Marcus |
| 3,857,660 A | 12/1974 | Flynn et al. |
| 3,869,056 A | 3/1975 | Valyi |
| 3,878,282 A | 4/1975 | Bonis |
| 3,882,213 A | 5/1975 | Uhlig |
| 3,900,286 A | 8/1975 | Wegmann et al. |
| 3,944,643 A | 3/1976 | Sato et al. |
| 3,947,176 A | 3/1976 | Rainville |
| 3,963,399 A | 6/1976 | Zavasnik |
| 3,966,378 A | 6/1976 | Valyi |
| 4,040,233 A | 8/1977 | Valyi |
| 4,061,705 A | 12/1977 | Marcus |
| 4,065,246 A | 12/1977 | Marcus |
| 4,079,851 A | 3/1978 | Valyi |
| 4,092,391 A | 5/1978 | Valyi |
| 4,104,222 A | 8/1978 | Date et al. |
| 4,108,956 A | 8/1978 | Lee |
| 4,116,606 A | 9/1978 | Valyi |
| 4,127,633 A | 11/1978 | Addleman |
| 4,145,392 A | 3/1979 | Valyi |
| 4,149,645 A | 4/1979 | Valyi |
| 4,150,079 A | 4/1979 | Chang |
| 4,151,247 A | 4/1979 | Hafele |
| 4,151,248 A | 4/1979 | Valyi |
| 4,208,177 A | 6/1980 | Allen |
| 4,213,751 A | 7/1980 | Fernandez |
| 4,267,143 A | 5/1981 | Roullet |
| 4,323,341 A | 4/1982 | Valyi |
| 4,357,288 A | 11/1982 | Oas et al. |
| 4,357,296 A | 11/1982 | Hafele |
| 4,370,368 A | 1/1983 | Hirata et al. |
| 4,375,947 A | 3/1983 | Marcus |
| 4,376,090 A | 3/1983 | Marcus |
| 4,378,963 A | 4/1983 | Schouenberg |
| 4,381,277 A | 4/1983 | Nilsson |
| 4,393,106 A | 7/1983 | Maruhashi et al. |
| 4,395,222 A | 7/1983 | Gaiser et al. |
| 4,403,090 A | 9/1983 | Smith |
| 4,438,254 A | 3/1984 | Doorakian et al. |
| 4,451,224 A | 5/1984 | Harding |
| 4,480,082 A | 10/1984 | Mc Lean et al. |
| 4,487,789 A | 12/1984 | Iwanami et al. |
| 4,499,262 A | 2/1985 | Fagerburg et al. |
| 4,505,951 A | 3/1985 | Kennedy |
| 4,515,836 A | 5/1985 | Cobbs et al. |
| 4,528,219 A | 7/1985 | Yamada et al. |
| 4,528,321 A | 7/1985 | Allen et al. |
| 4,534,995 A | 8/1985 | Pocock et al. |
| 4,538,542 A | 9/1985 | Kennon et al. |
| 4,540,543 A | 9/1985 | Thomas et al. |
| 4,544,698 A | 10/1985 | Roullet et al. |
| 4,560,741 A | 12/1985 | Davis et al. |
| 4,564,541 A | 1/1986 | Taira et al. |
| 4,569,869 A | 2/1986 | Kushida et al. |
| 4,573,429 A | 3/1986 | Cobbs et al. |
| 4,573,596 A | 3/1986 | Slat |
| 4,578,295 A | 3/1986 | Jabarin |
| 4,587,073 A | 5/1986 | Jakobsen |
| 4,590,021 A | 5/1986 | Ota et al. |
| 4,604,044 A | 8/1986 | Hafele |
| 4,604,258 A | 8/1986 | Valyi |
| 4,615,667 A | 10/1986 | Roy |
| 4,615,925 A | 10/1986 | Nilsson |
| 4,623,497 A | 11/1986 | Waters |
| 4,632,053 A | 12/1986 | Villanueva et al. |
| 4,646,925 A | 3/1987 | Nohara |
| 4,647,648 A | 3/1987 | Silvis et al. |
| 4,659,531 A | 4/1987 | Ezaki |
| 4,680,001 A | 7/1987 | Waters |
| 4,690,789 A | 9/1987 | Ritchie et al. |
| 4,698,013 A | 10/1987 | Butcher |
| 4,699,809 A | 10/1987 | Maruhashi et al. |
| 4,715,504 A | 12/1987 | Chang et al. |
| 4,717,521 A | 1/1988 | Border et al. |
| 4,731,266 A | 3/1988 | Bonnebat et al. |
| 4,741,936 A | 5/1988 | Nohara et al. |
| 4,755,404 A | 7/1988 | Collette |
| 4,764,405 A | 8/1988 | Bauman et al. |
| 4,818,213 A | 4/1989 | Roy |
| 4,818,575 A | 4/1989 | Hirata et al. |
| 4,830,811 A | 5/1989 | Aoki |
| 4,844,987 A | 7/1989 | Hirose et al. |
| 4,847,129 A | 7/1989 | Collette et al. |
| 4,867,664 A | 9/1989 | Fukuhara |
| 4,871,410 A | 10/1989 | Bonnebat et al. |
| 4,871,507 A | 10/1989 | Ajmera et al. |
| 4,937,130 A | 6/1990 | Clagett et al. |
| 4,940,616 A | 7/1990 | Yatsu et al. |
| 4,955,804 A | 9/1990 | Martell et al. |
| 4,956,143 A | 9/1990 | McFarlane |
| 4,977,191 A | 12/1990 | Salsman |
| 4,980,211 A | 12/1990 | Kushida |
| 5,006,381 A | 4/1991 | Nugent, Jr. et al. |
| 5,028,462 A | 7/1991 | Matlack et al. |
| 5,053,257 A | 10/1991 | Hasegawa et al. |
| 5,071,340 A | 12/1991 | LaBianca |
| 5,077,111 A | 12/1991 | Collette |
| 5,085,821 A | 2/1992 | Nohara |
| 5,089,588 A | 2/1992 | White et al. |
| 5,094,793 A | 3/1992 | Schrenk et al. |
| 5,115,075 A | 5/1992 | Brennan et al. |
| 5,134,218 A | 7/1992 | Brennan et al. |
| 5,143,998 A | 9/1992 | Brennan et al. |
| 5,149,768 A | 9/1992 | White et al. |
| 5,164,472 A | 11/1992 | White et al. |
| 5,171,820 A | 12/1992 | Mang et al. |
| 5,184,373 A | 2/1993 | Lange |
| 5,188,787 A | 2/1993 | King et al. |
| 5,196,469 A | 3/1993 | Cushing et al. |
| 5,202,074 A | 4/1993 | Schrenk et al. |
| 5,218,075 A | 6/1993 | Brennan et al. |
| 5,219,593 A | 6/1993 | Schmidte et al. |
| 5,246,751 A | 9/1993 | White et al. |
| 5,275,853 A | 1/1994 | Silvis et al. |
| 5,281,630 A | 1/1994 | Salsman |
| RE34,537 E | 2/1994 | Dyrup |
| 5,288,548 A | 2/1994 | Weber |
| 5,300,326 A | 4/1994 | Zezinka et al. |
| 5,300,541 A | 4/1994 | Nugent, Jr. et al. |
| 5,302,417 A | 4/1994 | Yamauchi et al. |
| 5,314,751 A | 5/1994 | Nield et al. |
| 5,328,724 A | 7/1994 | Deak |
| 5,352,401 A | 10/1994 | Dalgewicz, III et al. |
| 5,354,532 A | 10/1994 | Nakai et al. |
| 5,376,317 A | 12/1994 | Maus et al. |
| 5,409,983 A | 4/1995 | Jones et al. |
| 5,411,698 A | 5/1995 | Mero et al. |
| 5,443,378 A | 8/1995 | Jaroschek et al. |
| 5,443,766 A | 8/1995 | Slat et al. |
| 5,460,761 A | 10/1995 | Larsson |
| 5,464,106 A | 11/1995 | Slat et al. |
| 5,464,924 A | 11/1995 | Silvis et al. |
| 5,472,753 A | 12/1995 | Farha |
| 5,489,455 A | 2/1996 | Nugent, Jr. et al. |
| 5,491,204 A | 2/1996 | Nugent, Jr. et al. |
| 5,508,076 A | 4/1996 | Bright |
| 5,509,965 A | 4/1996 | Harry et al. |

| | | |
|---|---|---|
| 5,516,470 A | 5/1996 | Larsson |
| 5,540,878 A | 7/1996 | Schrenk et al. |
| 5,551,858 A | 9/1996 | Yoshizawa et al. |
| 5,571,470 A | 11/1996 | Plester |
| 5,582,788 A | 12/1996 | Collette et al. |
| 5,599,494 A | 2/1997 | Marcus |
| 5,602,091 A | 2/1997 | Monson et al. |
| 5,628,950 A | 5/1997 | Schrenk et al. |
| 5,628,957 A | 5/1997 | Collette et al. |
| 5,637,365 A | 6/1997 | Carlblom |
| 5,639,848 A | 6/1997 | Nugent, Jr. et al. |
| 5,645,183 A | 7/1997 | Slat et al. |
| 5,646,924 A | 7/1997 | Nonoyama et al. |
| 5,651,933 A | 7/1997 | Slat et al. |
| 5,652,034 A | 7/1997 | Seiner |
| 5,653,907 A | 8/1997 | Kendall et al. |
| 5,676,267 A | 10/1997 | Slat et al. |
| 5,688,570 A | 11/1997 | Ruttinger |
| 5,688,572 A | 11/1997 | Slat et al. |
| 5,726,277 A | 3/1998 | Salsman |
| 5,728,439 A | 3/1998 | Carlblom |
| 5,731,094 A | 3/1998 | Brennan et al. |
| 5,759,653 A | 6/1998 | Collette et al. |
| 5,759,654 A | 6/1998 | Cahill |
| 5,759,656 A | 6/1998 | Collette et al. |
| 5,772,056 A | 6/1998 | Slat |
| 5,780,128 A | 7/1998 | Farha |
| 5,804,305 A | 9/1998 | Slat et al. |
| 5,813,991 A | 9/1998 | Willis et al. |
| 5,814,373 A | 9/1998 | White et al. |
| 5,834,078 A | 11/1998 | Cavitt et al. |
| 5,837,339 A | 11/1998 | Wood et al. |
| 5,851,471 A | 12/1998 | Schloss et al. |
| 5,876,812 A | 3/1999 | Frisk et al. |
| 5,879,727 A | 3/1999 | Puri |
| 5,882,559 A | 3/1999 | Eckardt et al. |
| 5,894,023 A | 4/1999 | Schramm et al. |
| 5,902,541 A | 5/1999 | Imai et al. |
| 5,906,285 A | 5/1999 | Slat |
| 5,906,787 A | 5/1999 | Plester |
| 5,914,138 A | 6/1999 | Swenson |
| 5,927,525 A | 7/1999 | Darr et al. |
| 5,939,516 A | 8/1999 | Greaves et al. |
| 5,942,563 A | 8/1999 | DeGraaf |
| 5,968,620 A | 10/1999 | Harvey et al. |
| 5,971,742 A | 10/1999 | McCollum et al. |
| 5,972,445 A | 10/1999 | Kimura et al. |
| 5,989,661 A | 11/1999 | Krishnakumar et al. |
| 6,011,111 A | 1/2000 | Brennan et al. |
| 6,051,294 A | 4/2000 | White et al. |
| 6,068,900 A | 5/2000 | Kohn et al. |
| 6,090,460 A | 7/2000 | Collette et al. |
| 6,103,152 A | 8/2000 | Gehlsen et al. |
| 6,109,006 A | 8/2000 | Hutchinson |
| 6,121,387 A | 9/2000 | Choudhery |
| 6,123,211 A | 9/2000 | Rashid et al. |
| 6,136,354 A | 10/2000 | Wood et al. |
| 6,168,740 B1 | 1/2001 | Koch et al. |
| 6,180,715 B1 | 1/2001 | Schmidt |
| 6,184,281 B1 | 2/2001 | Craun et al. |
| 6,194,043 B1 | 2/2001 | Fehn |
| 6,196,830 B1 | 3/2001 | Foltuz et al. |
| 6,218,013 B1 | 4/2001 | Wood et al. |
| 6,257,867 B1 | 7/2001 | McCollum et al. |
| 6,276,656 B1 | 8/2001 | Baresich |
| 6,276,914 B1 | 8/2001 | Sicilia |
| 6,309,757 B1 | 10/2001 | Carlblom et al. |
| 6,312,628 B1 | 11/2001 | Wieder et al. |
| 6,312,641 B1 | 11/2001 | Hutchinson |
| 6,315,549 B1 | 11/2001 | Jenko et al. |
| 6,319,574 B1 | 11/2001 | Slat |
| 6,346,596 B1 | 2/2002 | Mallen et al. |
| 6,350,796 B1 | 2/2002 | Dworak et al. |
| 6,352,426 B1 | 3/2002 | Hutchinson et al. |
| 6,365,247 B1 | 4/2002 | Cahill et al. |
| 6,372,318 B1 | 4/2002 | Collette et al. |
| 6,391,408 B1 | 5/2002 | Hutchinson |
| 6,391,946 B2 | 5/2002 | Wood et al. |
| 6,393,803 B1 | 5/2002 | Luka et al. |
| 6,403,231 B1 | 6/2002 | Mueller et al. |
| 6,413,075 B1 | 7/2002 | Koch et al. |
| 6,419,874 B1 | 7/2002 | Rashid et al. |
| 6,428,305 B2 | 8/2002 | Jenko |
| 6,428,737 B1 | 8/2002 | Collette et al. |
| 6,455,116 B1 | 9/2002 | Xia et al. |
| 6,461,697 B1 | 10/2002 | Slat et al. |
| 6,471,503 B1 | 10/2002 | Priest et al. |
| 6,474,499 B2 | 11/2002 | Donelson et al. |
| 6,485,804 B1 | 11/2002 | Makamachi et al. |
| 6,489,387 B2 | 12/2002 | Mallya et al. |
| 6,503,587 B2 | 1/2003 | Kashiba et al. |
| 6,509,384 B2 | 1/2003 | Kron et al. |
| 6,515,067 B2 | 2/2003 | Cai et al. |
| 6,517,664 B1 | 2/2003 | Dronzek |
| 6,524,672 B1 | 2/2003 | Slat et al. |
| 6,533,571 B2 | 3/2003 | Fikani |
| 6,548,133 B2 | 4/2003 | Schmidt et al. |
| 6,558,762 B2 | 5/2003 | Cahill et al. |
| 6,582,633 B2 | 6/2003 | Elfving et al. |
| 6,596,803 B2 | 7/2003 | Lan et al. |
| 6,673,432 B2 | 1/2004 | Kiik et al. |
| 6,673,874 B1 | 1/2004 | Choudhery |
| 6,676,883 B2 | 1/2004 | Hutchinson et al. |
| 6,702,978 B1 | 3/2004 | Kuehn |
| 6,709,735 B2 | 3/2004 | Posey et al. |
| 6,709,759 B2 | 3/2004 | Mueller et al. |
| 6,749,785 B2 | 6/2004 | Subramanian et al. |
| 6,808,820 B2 | 10/2004 | Lee et al. |
| 6,872,802 B2 | 3/2005 | Noda |
| 6,933,055 B2 | 8/2005 | Share et al. |
| 6,939,591 B2 | 9/2005 | Hutchinson et al. |
| 2002/0014722 A1 | 2/2002 | Baresich |
| 2003/0021927 A1 | 1/2003 | Boenig |
| 2003/0031814 A1 | 2/2003 | Hutchinson et al. |
| 2003/0219555 A1 | 11/2003 | Hutchinson et al. |
| 2004/0013833 A1 | 1/2004 | Lee et al. |
| 2004/0071885 A1 | 4/2004 | Hutchinson et al. |
| 2004/0086703 A1* | 5/2004 | Semersky ............... 428/319.3 |
| 2004/0151937 A1 | 8/2004 | Hutchinson et al. |
| 2004/0247735 A1 | 12/2004 | Hutchinson et al. |
| 2005/0053739 A1 | 3/2005 | Lee et al. |

FOREIGN PATENT DOCUMENTS

| | | |
|---|---|---|
| CN | 1216949 A | 5/1999 |
| DE | 298620 | 8/1925 |
| DE | 2108774 | 9/1971 |
| DE | 2461925 | 11/1975 |
| DE | 26 49 640 | 5/1978 |
| DE | 30 44 930 | 10/1981 |
| DE | 3407 060 | 4/1986 |
| DE | 3518 441 | 3/1987 |
| DE | 3518 875 | 11/1989 |
| DE | 3121 420 | 3/1990 |
| DE | 3121 421 | 8/1990 |
| DE | 196 40662 | 3/1998 |
| EP | 0 019 438 | 11/1980 |
| EP | 0 073 151 | 3/1983 |
| EP | 0 099 727 | 2/1984 |
| EP | 0 100 375 | 2/1984 |
| EP | 0 125 107 | 11/1984 |
| EP | 0 126 575 | 11/1984 |
| EP | 0 174 265 | 3/1986 |
| EP | 0 191 701 | 8/1986 |
| EP | 0 096 581 | 9/1986 |
| EP | 0 203 630 | 12/1986 |

| | | | | | | |
|---|---|---|---|---|---|---|
| EP | 0 105 826 | 3/1987 | | JP | 04074620 | 3/1992 |
| EP | 0 218 245 | 4/1987 | | JP | 04-197634 | 7/1992 |
| EP | 0 156 085 | 7/1987 | | JP | 05-200793 A | 8/1993 |
| EP | 0 225 049 | 2/1988 | | JP | 06027882 | 2/1994 |
| EP | 0 266 900 | 5/1988 | | JP | 07-156349 | 6/1995 |
| EP | 0 280 736 | 9/1988 | | JP | 08-281892 | 10/1996 |
| EP | 0 287 839 | 10/1988 | | JP | 09-296056 | 11/1997 |
| EP | 0321946 A2 | 12/1988 | | JP | 10-128839 A | 5/1998 |
| EP | 0 160 984 | 2/1989 | | JP | 11-090975 | 4/1999 |
| EP | 0 302 117 | 2/1989 | | JP | 11255244 | 9/1999 |
| EP | 0 304 059 A1 | 2/1989 | | JP | 2001-106219 | 4/2001 |
| EP | 0 095 909 | 4/1989 | | JP | 2003-103324 | 4/2003 |
| EP | 0 171 161 | 6/1989 | | KR | 0078944 | 6/1994 |
| EP | 0 180 191 | 7/1989 | | WO | WO 87/02680 | 5/1987 |
| EP | 0 325 030 | 7/1989 | | WO | WO 87/05276 | 9/1987 |
| EP | 0 176 229 | 10/1989 | | WO | WO 89/08556 | 9/1989 |
| EP | 0 153 894 | 1/1990 | | WO | WO 90/07553 | 7/1990 |
| EP | 0 350 745 | 1/1990 | | WO | WO 91/08099 A1 | 6/1991 |
| EP | 0 351 118 | 1/1990 | | WO | WO 92/01558 | 2/1992 |
| EP | 0 368 278 | 5/1990 | | WO | WO 93/01988 | 2/1993 |
| EP | 0 092 979 | 8/1990 | | WO | WO 93/07068 | 4/1993 |
| EP | 0 118 226 | 10/1990 | | WO | WO 93/25835 | 12/1993 |
| EP | 0 395 237 | 10/1990 | | WO | WO 94/01268 | 1/1994 |
| EP | 0 215 630 | 9/1991 | | WO | WO 94/19186 | 9/1994 |
| EP | 0 153 120 | 12/1991 | | WO | WO 94/25366 | 11/1994 |
| EP | 0 462 455 | 12/1991 | | WO | WO 95/00325 | 1/1995 |
| EP | 0 278 403 | 1/1992 | | WO | WO 95/06680 | 3/1995 |
| EP | 0 491 650 A2 | 6/1992 | | WO | WO 95/07219 | 3/1995 |
| EP | 0 518 703 A2 | 12/1992 | | WO | WO 95/18002 | 7/1995 |
| EP | 0 518 703 A3 | 12/1992 | | WO | WO 95/22451 | 8/1995 |
| EP | 0 544 545 | 6/1993 | | WO | WO 95/29805 | 11/1995 |
| EP | 0 199 633 | 7/1993 | | WO | WO 95/34425 | 12/1995 |
| EP | 0 555 976 A1 | 8/1993 | | WO | WO 96/08371 A1 | 3/1996 |
| EP | 0 571 116 | 11/1993 | | WO | WO 96/18685 | 6/1996 |
| EP | 0 306 675 | 12/1993 | | WO | WO 96/20074 | 7/1996 |
| EP | 0 581 970 | 2/1994 | | WO | WO 96/33062 | 10/1996 |
| EP | 0 583 953 | 2/1994 | | WO | WO 96/35571 | 11/1996 |
| EP | 0 387 614 | 6/1994 | | WO | WO 97/02939 | 1/1997 |
| EP | 0644035 A1 | 9/1994 | | WO | WO 97/09366 | 3/1997 |
| EP | 0 376 469 | 3/1995 | | WO | WO 97/15420 | 5/1997 |
| EP | 0 212 339 | 8/1995 | | WO | WO 97/26127 | 7/1997 |
| EP | 0 671 251 | 9/1995 | | WO | WO 97/28218 | 8/1997 |
| EP | 0 678 554 | 10/1995 | | WO | WO 97/31050 | 8/1997 |
| EP | 0 689 933 | 1/1996 | | WO | WO 97/32708 A | 9/1997 |
| EP | 0 341 044 | 9/1996 | | WO | WO 97/34758 | 9/1997 |
| EP | 0 524 572 | 10/1996 | | WO | WO 97/40972 | 11/1997 |
| EP | 0 744 263 | 11/1996 | | WO | WO 97/40981 | 11/1997 |
| EP | 0 756 931 A2 | 2/1997 | | WO | WO 97/42250 | 11/1997 |
| EP | 0 756 931 A3 | 2/1997 | | WO | WO 97/43182 | 11/1997 |
| EP | 0 767 049 | 4/1997 | | WO | WO 97/44174 | 11/1997 |
| EP | 0 774 491 | 5/1997 | | WO | WO 97/47695 | 12/1997 |
| EP | 0 653 982 | 9/1997 | | WO | WO 98/02479 | 1/1998 |
| EP | 0 794 007 | 9/1997 | | WO | WO 98/14498 | 4/1998 |
| EP | 0 822 213 | 2/1998 | | WO | WO 98/17470 | 4/1998 |
| EP | 0 894 604 | 2/1999 | | WO | WO 98/21730 | 5/1998 |
| EP | 0 964 031 | 12/1999 | | WO | WO 98/25746 | 6/1998 |
| EP | 1072389 A1 | 1/2001 | | WO | WO 98/29491 | 7/1998 |
| EP | 0 837 763 | 12/2001 | | WO | WO 98/46410 | 10/1998 |
| EP | 1264675 | 12/2002 | | WO | WO 99/12995 | 3/1999 |
| EP | 1403027 A2 | 3/2004 | | WO | WO 99/20462 | 4/1999 |
| FR | 2538297 | 6/1984 | | WO | WO 99/25533 A1 | 5/1999 |
| GB | 1362133 | 7/1974 | | WO | WO 99/38914 A2 | 8/1999 |
| GB | 1 482 956 | 8/1977 | | WO | WO 99/43563 | 9/1999 |
| GB | 2011309 | 7/1979 | | WO | WO 99/48962 | 9/1999 |
| GB | 2 159 441 A | 12/1985 | | WO | WO 99/61514 | 12/1999 |
| JP | 55-37335 | 3/1980 | | WO | WO 00/03922 A1 | 1/2000 |
| JP | 57-093126 | 6/1982 | | WO | WO 00/37321 A2 | 6/2000 |
| JP | 58-92536 | 6/1983 | | WO | WO 00/44819 A1 | 8/2000 |
| JP | 58173634 | 10/1983 | | WO | WO 00/62998 | 10/2000 |
| JP | 58215309 | 12/1983 | | WO | WO 01/53062 A1 | 7/2001 |
| JP | 60170672 A2 | 9/1985 | | WO | WO 01/57124 A2 | 8/2001 |
| JP | 61-002519 | 1/1986 | | WO | WO 01/83193 | 11/2001 |
| JP | 61-185417 | 8/1986 | | WO | WO 0183100 | 11/2001 |

| | | |
|---|---|---|
| WO | WO 02/16484 A2 | 2/2002 |
| WO | WO 02/16484 A3 | 2/2002 |
| WO | WO 02/16485 A2 | 2/2002 |
| WO | WO 02/16485 A3 | 2/2002 |
| WO | WO 02/20246 | 3/2002 |
| WO | WO 02/088232 A1 | 11/2002 |
| WO | WO 03/080731 A2 | 10/2003 |
| WO | WO 03/100125 A1 | 12/2003 |
| WO | WO 2004/004929 A1 | 1/2004 |
| WO | WO 2004/043675 | 5/2004 |

OTHER PUBLICATIONS

White et al.; "*High-Barrier Structural Thermoplastics Based on Diglycidyl Ethers*"; Polymer Science; 34(1):904-905 (1993).

"*Mitsui B-010:Gas Barrier Polyester*"; Chemical Data Sheet; Mitsui Chemicals, Inc. (1998).

The Condensed Chemical Dictionary, p. 65 (1981).

International Preliminary Examination Report Issued in Application No. PCT/US03/22333 on Oct. 13, 2004.

International Search Report issued in Application No. PCT/US03/22333 on Oct. 27, 2003.

International Search Report issued in Application No. PCT/US2005/024726 on Feb. 20, 2006.

Reinking et al., "*Polyhydroxyethers. 1. Effect Of Structures On Properties Of High Molecular Weight Polymers From Dihydric Phenols And Epichlorohydrin.*" J. App. Polymer Sci. 7(6):2135-2144 (1963).

PCT International Search Report: mailed Jan. 28, 2002 for International Application No. PCT/US01/28128, Filed on Sep. 5, 2001.

International Search Report dated Feb. 8, 2000 regarding PCT Application PCT/US1998/022026 (published as WO 1999/020462).

Carl Hanser Verlag, "*Konzepte Füer Die Werkzeugtemperierung Eine Uebersicht Mit Erfahrungen Aus Der Praxis*" Dunststoffe, Munchen, DE, 92(11):28-36, XP001121639 ISSN: 0023-5563 p. 30, col. 3, last paragraph p. 31, col. 3 paragraph 1 (2002).

PCT International Search Report: mailed Mar. 30, 2004 for International Application No. PCT/US03/35949, Filed Nov. 10, 2003.

"*Tool Steel Recommendations for Injection Molds Designed for Processing Geon® Vinyl Compounds*," Technical Service Report, No. 12 (1996).

Mold-Making Handbook, 2nd Edition, pp. 223 and 343, Gunter Mennig (1998).

European Search Report issued in Application No. 05077555.0-2307 on Apr. 28, 2006.

Yukihiko Suematsu; Growth Prospects & Challenges for Pet in Asia/Japan: A Producer's Perspective, May 19, 1997.

Examination Report dated Feb. 10, 2008, issued in corresponding Saudi Arabian Application No. 05260116.

\* cited by examiner

FIG. 7
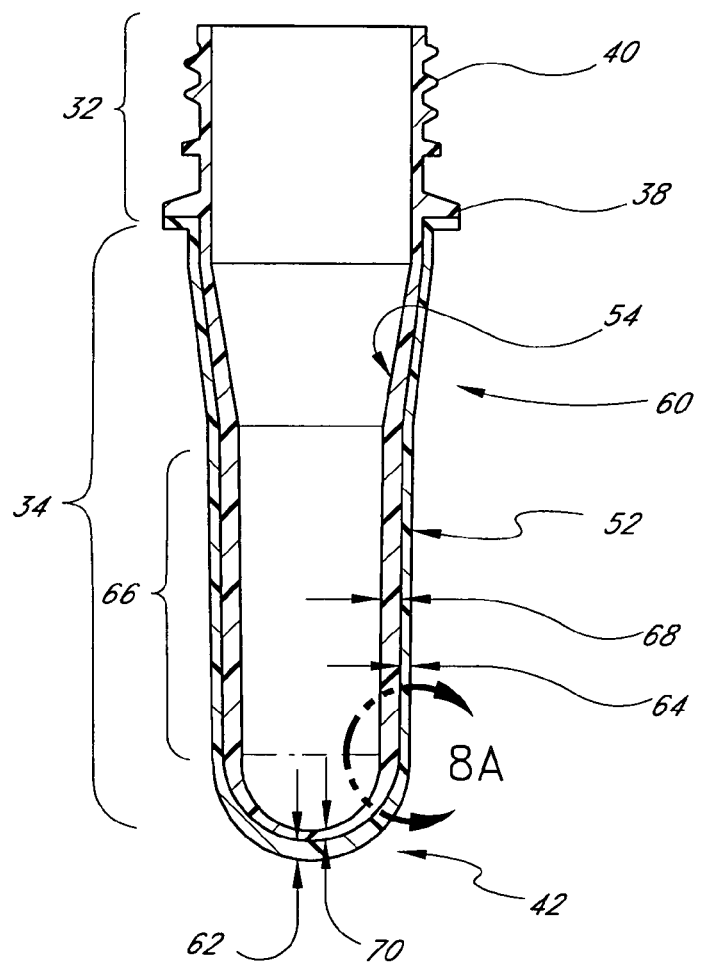
FIG. 8
FIG. 8A

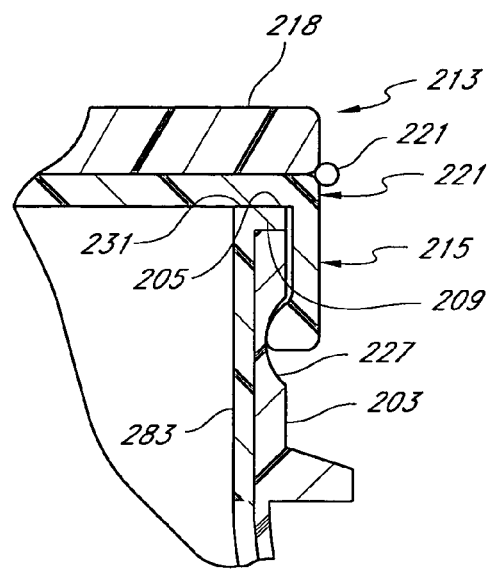
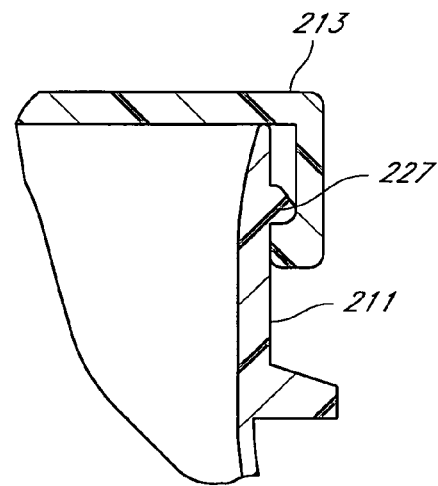
FIG. 14B
FIG. 14C
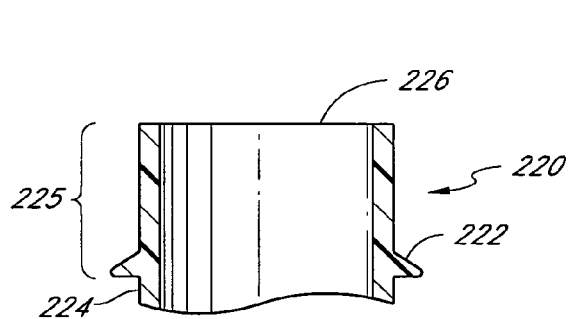
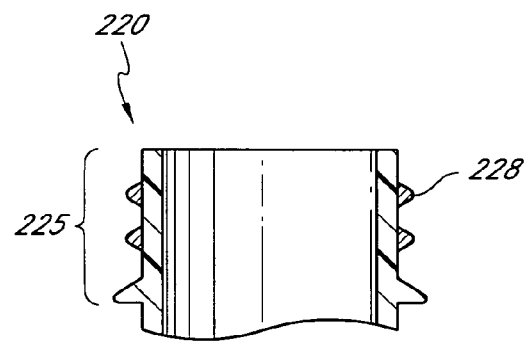
FIG. 15A
FIG. 15B
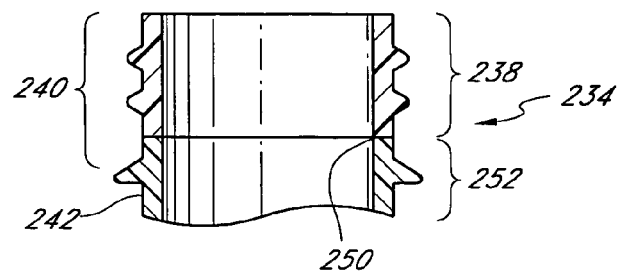
FIG. 15C

MONO AND MULTI-LAYER ARTICLES AND INJECTION MOLDING METHODS OF MAKING THE SAME

RELATED APPLICATIONS

This application claims the priority benefit under 35 U.S.C. § 119(e) of the provisional applications 60/563,021, filed Apr. 16, 2004, 60/575,231, filed May 28, 2004, 60/586,399, filed Jul. 7, 2004, 60/620,160, filed Oct. 18, 2004, and 60/643,008, filed Jan. 11, 2005, which are hereby incorporated by reference in their entireties.

BACKGROUND OF THE INVENTIONS

1. Field of the Inventions

This invention relates to articles having formable material, more specifically for mono and multi-layer articles having formable materials and methods of making such articles.

2. Description of the Related Art

Articles have been commonly used for holding beverages and foodstuffs. The use of articles, such as plastic containers, as a replacement for entirely glass or metal containers in the packaging of beverages has become increasingly popular. The advantages of plastic packaging include lighter weight, decreased breakage as compared to glass, and potentially lower costs. The most common plastic used in making beverage containers today is polyethylene terephthalate ("PET"). Virgin PET has been approved by the FDA for use in contact with foodstuffs. Containers made of PET are generally transparent, thin-walled, lightweight, and have the ability to maintain their shape by withstanding the force exerted on the walls of the container by pressurized contents, such as carbonated beverages. PET resins are also fairly inexpensive and easy to process.

Most PET bottles are made by a process that includes the blow-molding of plastic preforms, which have been made by processes including injection molding or extrusion process. The PET bottle may not provide a suitable thermal barrier for limiting thermal communication through the walls of the PET bottles. It may be desirable to reduce the heat transfer between the liquid within the bottle and the environment surrounding the bottle to maintain the temperature of the liquid within the bottles. Similarly, most inexpensive containers for holding foodstuffs do not provide an effective thermal barrier to reduce heat transfer through the container. It may be desirable to reduce the heat transfer through containers or packaging.

Additionally, articles in the form of conduits, food packaging, and the like may have unsuitable structural, barrier, or other characteristics. Many times fluids, foods, or beverages, such as carbonated soda, are stored in a container that may undesirably affect its contents. Unfortunately, when the food contacts the surface of some materials of the known articles, the taste of the food may be adversely altered. It may be desirable to maintain the taste of the foodstuffs in contact with the article.

SUMMARY OF THE INVENTIONS

In a preferred embodiment, there is provided a method for forming a preform. At least a portion of the preform comprises expandable material that can expand to form a thermal barrier or desired finish. The preform is heated to a temperature suitable for blow molding and at least a portion of the expandable material expands. The preform is blow molded into a container. In one arrangement, the preform is a monolayer preform. In another arrangement, the preform is a multilayer preform.

In another embodiment, there is provided a process for making a foam coated polymer article comprising the acts of providing a foam coated polymer preform and blow molding the preform to a desired container shape. In one arrangement, the process comprises preheating the foam coated polymer preform before blow molding, causing the foam coating, which comprises microspheres, to initiate expansion of the microspheres. The microspheres can expand before blow molding, during blow molding, and/or after blow molding.

In one embodiment, a foam coated polymer article comprises at least one layer of foam surrounding at least a portion of another layer substantially comprising polyester. The foam comprises a polymer carrier material and a foaming agent.

In another embodiment, there is provided a process for making an article comprising foam. The foam can have a first component and a second component. The first component can expand when thermally activated. Optionally, the first component comprises microspheres that are generally in a first state of expansion. In one arrangement, the second component is a carrier material mixed with the first component. When the mixture is heated, the mixture is expanded to form a generally closed cell foam.

In one embodiment, the mixture is formed into a preform having microspheres that are expanded from the first state of expansion to a second state of expansion. The preform is molded into a container having the microspheres which are expanded from the second state of expansion to a third state of expansion. In one arrangement, a substantial portion of the microspheres are generally unexpanded in the first position. Optionally, a substantial portion of the microspheres are generally partially expanded in the second position. Optionally, a substantial portion of the microspheres are generally expanded in the third position.

In one embodiment, the preform comprises a plurality of layers and one of the layers comprises an expandable material. The preform is optionally formed into a container. In one embodiment, an inner layer of the preform or container comprises material suitable for contacting foodstuff and/or liquid and defines a holding chamber of the preform or container. In one arrangement, the inner layer comprises thermoplastic material. A second layer of the preform or container comprises expandable material including a polymer and microspheres. Alternatively, the expandable material can form an inner layer or liner of the preform or container.

In one embodiment, the expandable material comprises a carrier material and a foaming agent. The carrier material is preferably a material that can be mixed with the microspheres to form an expandable material. The carrier material can be a thermoplastic or polymeric material, including, but not limited to, ethylene acrylic acid ("EAA"), ethylene vinyl acetate ("EVA"), linear low density polyethylene ("LLDPE"), poly (hydroxyamino ethers) ("PHAE"), polyethylene terephtalate ("PET") and other copolymers including polyethylene terephtalate glycol (PETG), polyethylene ("PE"), polypropylene ("PP"), polystyrene ("PS"), cellulose material, pulp, mixtures thereof, and the like. In one embodiment, the foaming agent comprises microspheres that expand when heated and cooperate with the carrier material to produce foam. In one arrangement, the foaming agent comprises EXPANCEL® micropheres.

In preferred embodiments, the expandable material has insulating properties to inhibit heat transfer through the walls of the container comprising the expandable material. The expandable material can therefore be used to maintain the temperature of food, fluids, or the like. In one embodiment, when liquid is in the container, the expandable material of the container reduces heat transfer between liquid within the container and the environment surrounding the container. In one arrangement, the container can hold a chilled liquid and the expandable material of the container is a thermal barrier that inhibits heat transfer from the environment to the chilled fluid. Alternatively, a heated liquid can be within the container and the expandable material of the container is a thermal barrier that reduces heat transfer from the liquid to the environment surrounding the container. Although use in connection with food and beverages is one preferred use, these containers may also be used with non-food items.

In one embodiment, the foam material is extruded to produce sheets that are formed into containers for holding food, trays, bottles, and the like. Optionally, the sheets are formed into clamshells that are adapted to hold food. The foam sheets can be pre-cut and configured to form a container for holding foodstuff. The sheets may be formed into a container by one or more processes, e.g., a thermomolding or thermoforming process.

In another embodiment, an article is provided comprising foam material that forms a coating on a paper or wood pulp based material or container. In one arrangement, the foam material is mixed with pulp. Optionally, the foam material and pulp can be mixed to form a generally homogeneous mixture which can be formed into a desired shape. The mixture may be heated before, during, and/or after the mixture is shaped to cause expansion of at least a portion of the foam material component of the mixture.

In another embodiment, a preform comprises at least a first layer comprising material suitable for contacting foodstuff and a second layer comprising a thermoplastic, such as polypropylene. Optionally, the first layer comprises a thermoplastic material, such as PET, and the second layer comprises foam material having polypropylene and microspheres. Optionally, the first layer comprises PET and the second layer contains mostly or entirely polypropylene. Optionally, the first layer comprises phenoxy type thermoplastic and the second layer contains another material, such as polypropylene. The preform may be formed into a container by one or more processes, e.g., a blow molding process.

In one embodiment, a method of producing a bottle comprises providing a preform comprising an inner layer of PET and an outer layer comprising PP. The preform is heated to a temperature not typically suitable for processing PP. The preform is blow molded into a bottle after heating the preform. In one arrangement, the outer layer comprises foam material. In one arrangement, the outer layer contains mostly or entirely PP.

In another embodiment, a preform comprises an inner layer that has a flange that defines at least a portion of an opening of the preform. An outer layer surrounds the inner layer and defines a substantial portion of a neck finish of a preform and forms an outer surface of a body portion of the preform.

In another embodiment, there is a tube comprising a first layer and a second layer. In one embodiment, the first layer comprises a thermoplastic material, such as PET, and the second layer comprises the same or different thermoplastic material, such as PP, and a foaming agent. Optionally, the first layer comprises primarily PET and the second layer comprises PP based foam material. In one arrangement, the tube is formed by a co-extrusion process. Optionally, the tube can be blow molded into a container. Optionally, the tube can be used as a fluid line to deliver ingestible liquids.

In another embodiment, a preform comprises an inner layer and an outer layer. The outer layer surrounds the inner layer and defines a substantial portion of a neck finish of a preform. The outer layer also forms an outer surface of a body portion of the preform In another embodiment, an apparatus for molding preforms comprises a mold core section and a mold cavity section. The mold cavity section has a delivery system. The mold core section and mold cavity section cooperate to define a void when the mold core section and mold cavity section are in a closed position. The delivery system is configured to deliver tying material into the void. Optionally, the apparatus also comprises an exhaust system in fluid communication with the void.

In another embodiment, a method of forming a preform comprises positioning a portion of a preform on a mandrel of a mold. Tie material is delivered from an outlet of a delivery system formed within a cavity section defining a cavity. At least a portion of the preform is coated with the tie material.

In some embodiments, a preform comprises a neck portion and a body portion. The body portion has a wall portion and an end cap and comprises a first layer and a second layer, the first layer comprising an expandable material. In some arrangements, the expandable material is adapted to expand by heat treatment.

In some embodiments, a preform comprises a threaded neck portion and a body portion. The body portion includes a wall portion and an end cap. The body portion comprises expandable material forming less than about 40% by weight of the preform. In some embodiments, the expandable material comprises less than 20% by weight of the preform. The expandable material can optionally comprise microspheres and a preferably thermoplastic carrier material including those selected from the group consisting of polypropylene, PET, and combinations thereof.

In some embodiments, a method of producing a preform comprises forming a first layer of the preform. A second layer of the preform is formed and comprises a controllable, expandable material. In some arrangements, the first layer is formed by injecting a first material preferably comprising polyester through a gate into a space defined by a cavity mold half and a core mold half to form an article. The article comprises an inner surface and an outer surface. The second layer is formed by injecting expandable material into a second space defined by the outer surface of the article formed by the first injected material and a second cavity mold half to form the second layer of the preform.

In some embodiments, a method of producing a bottle comprises providing a preform having a neck portion and a body portion. The preform is heated so that a portion of the preform at least partially expands to form foam. The preform is blow molded into a bottle comprising foam material.

In some embodiments, an article comprises a neck portion having threads and a body portion. The body portion comprises a first layer and a second layer. The first layer has an upper end that terminates below the threads of the neck portion and comprises foam material. The second layer is positioned interior to the first layer. In some embodiments, the article is a preform, bottle, container, or the like. The second layer can optionally comprise a material suitable for contacting foodstuffs. For example, the second layer can comprise a material including at least one material selected from a group consisting of polyester, polypropylene, phenoxy-type thermoplastic, and combinations thereof.

In some embodiments, a bottle comprises a neck portion and a body portion. The body portion comprises an inner layer comprising polyester and an outer layer comprising foam material. The foam material comprises polypropylene. The inner layer and the outer layer define at least a portion of a wall of the body portion.

In some embodiments, a method of making a multilayer preform comprises providing a substrate preform which has been made by any of a variety of methods as are known in the art. The substrate preform is positioned within a cavity defined between a first mold portion and a second mold portion. First material is injected from an outlet of the first mold portion into the cavity onto the substrate preform. The first material is adapted to form a layer on the substrate preform. A second material is injected from a melt gate of the first mold portion onto the substrate preform. In some arrangements, the first material comprises a tie material. In some embodiments, the first material coats at least a portion, preferably a substantial portion of a body portion of the substrate preform. The second material can be injected directly onto the first material to form an outer layer. Optionally, the unused portion of the first material can be removed from the cavity by an exhaust system. In some arrangements, the first mold portion is a cavity section and the second mold portion is a core section.

In some embodiments, a method of injecting material into a mold for molding an article comprises providing an injection mold being movable between an open position and a closed position. The mold comprises a core section and a cavity section. Material is delivered through a first gate of the cavity section. Melt is delivered through a second gate of the cavity section. In some arrangements, the article is a preform or closure. The material delivered through the first gate can optionally comprise a fluid comprising a tie material.

In some embodiments, a mold for molding preforms or containers comprises a core section and a cavity section movable between an open position and a closed position. The core section and cavity section define a cavity when the core section and the cavity section are in the closed position. A gate in the cavity section is configured to inject melt into the cavity. An outlet in the cavity section is positioned and configured to inject a first material from an inlet line into the cavity. An inlet in the cavity section is positioned and configured to draw in material within the cavity and deliver the material to an output line. In some arrangements, the gate is positioned in the area of the cavity section for molding an end cap of a preform. Optionally, the gate, the outlet, and the inlet are spaced from each other and are formed in a molding surface of the cavity section.

In some embodiments, a mold for molding articles comprises a first mold section that defines a first molding surface. A second mold section defines a second molding surface. The first mold section and the second mold section cooperate to form a cavity in the shape of an article. A delivery system of the mold has a source of fluid and a feed line. The feed line is in fluid communication with the source of fluid and an output. The output is positioned along one of the first mold section and the second mold section. An exhaust system has an inlet positioned along one of the first mold section and the second mold section. The exhaust system comprises an exhaust line in fluid communication with the cavity. A melt injection gate is positioned along the second mold section and is configured to deliver melt into the cavity. In some arrangements, the delivery system further comprises a valve system configured to selectively control the amount of fluid delivered into the cavity. Optionally, the cavity is in the shape of a preform or closure.

In some embodiments, a mold for producing an article comprises a core half and a cavity half that are configured to mate to form a cavity for molding a preform. The cavity half has a gate. The mold has means for delivering coating material into the cavity and means for removing coating material delivered by the means for delivering coating material from the cavity. Optionally, the article can be a preform or closure. The gate can be spaced from the means for delivering coating material and the means for removing coating material.

In preferred embodiments laminates, preforms, containers, and articles comprising PETG and polypropylene, and methods of making the same, are disclosed. In one embodiment polypropylene may be grafted or modified with maleic anhydride, glycidyl methacrylate, acryl methacrylate and/or similar compounds to improve adhesion. In another embodiment polypropylene further comprises "nanoparticles" or "nanoparticular material." In another embodiment polypropylene comprises nanoparticles and is grafted or modified with maleic anhydride, glycidyl methacrylate, acryl methacrylate and/or similar compounds.

Preferred articles, preforms, containers, and articles can be made using various techniques. For example, laminates, preforms, containers, and articles can be formed through injection molding, overmolding, blow molding, injection blow molding, extrusion, co-extrusion, and injection stretch blow molding, and other methods disclosed herein and/or known to those of skill in the art.

In some non-limiting embodiments, the articles may comprise one or more layers or portions having one or more of the following advantageous characteristics: an insulating layer, a gas barrier layer, UV protection layers, protective layer (e.g., a vitamin protective layer, scuff resistance layer, etc.), a foodstuff contacting layer, a non-flavor scalping layer, non-color scalping layer a high strength layer, a compliant layer, a tie layer, a gas scavenging layer (e.g., oxygen, carbon dioxide, etc), a layer or portion suitable for hot fill applications, a layer having a melt strength suitable for extrusion, strength, recyclable (post consumer and/or post-industrial), clarity, etc. In one embodiment, the monolayer or multi-layer material comprises one or more of the following materials: PET (including recycled and/or virgin PET), PETG, foam, polypropylene, phenoxy type thermoplastics, polyolefins, phenoxy-polyolefin thermoplastic blends, and/or combinations thereof.

BRIEF DESCRIPTION OF THE DRAWINGS

FIG. 7 is an enlarged view of the container of FIG. 6 taken along 7.

FIG. 8 is a cross-section of a multilayer preform.

FIG. 8A is an enlarged view of the preform of FIG. 8 taken along 8A.

FIG. 14B is an enlarged view of a portion of the container and closure of FIG. 14A taken along 14B.

FIG. 14C is an enlarged view of a portion of the container and closure in accordance with another embodiment.

FIG. 15A is a cross-section of a portion of a preform having a neck portion without threads.

FIG. 15B is a cross-section of the preform of FIG. 15A.

FIG. 15C is a cross-section of a portion a multi-piece preform.

DETAILED DESCRIPTION OF THE PREFERRED EMBODIMENTS

All patents and publications mentioned herein are hereby incorporated by reference in their entireties. Except as further described herein, certain embodiments, features, systems, devices, materials, methods and techniques described herein may, in some embodiments, be similar to any one or more of the embodiments, features, systems, devices, materials, methods and techniques described in U.S. Pat. Nos. 6,109,006; 6,808,820; 6,528,546; 6,312,641; 6,391,408; 6,352,426; 6,676,883; U.S. patent application Ser. Nos. 09/745,013 (Publication No. 2002-0100566); 10/168,496 (Publication No. 2003-0220036); 09/844,820 (2003-0031814); 10/090,471 (Publication No. 2003-0012904); 10/395,899 (Publication No. 2004-0013833); 10/614,731 (Publication No. 2004-0071885), provisional application 60/563,021, filed Apr. 16, 2004, provisional application 60/575,231, filed May 28, 2004, provisional application 60/586,399, filed Jul. 7, 2004, provisional application 60/620,160, filed Oct. 18, 2004, provisional application 60/621,511, filed Oct. 22, 2004, and provisional application 60/643,008, filed Jan. 11, 2005, entitled MONO AND MULTI-LAYER ARTICLES AND COMPRESSION METHODS OF MAKING THE SAME, filed on the same day as the present application, entitled MONO AND MULTI-LAYER ARTICLES AND EXTRUSION METHODS OF MAKING THE SAME, filed on the same day as the present application, which are hereby incorporated by reference in their entireties. In addition, the embodiments, features, systems, devices, materials, methods and techniques described herein may, in certain embodiments, be applied to or used in connection with any one or more of the embodiments, features, systems, devices, materials, methods and techniques disclosed in the above-mentioned patents and applications.

A. Articles

In preferred embodiments articles may comprise one or more formable materials. Articles described herein may be mono-layer or multi-layer (i.e., two or more layers). In some embodiments, the articles can be packaging, such as drinkware (including preforms, containers, bottles, closures, etc.), boxes, cartons, and the like.

The multi-layer articles may comprise an inner layer (e.g., the layer that is in contact with the contents of the container) of a material approved by a regulatory agency (e.g., the U.S. Food and Drug Association) or material having regulatory approval to be in contact with food (including beverages), drugs, cosmetics, etc. In other embodiments, an inner layer comprises material(s) that are not approved by a regulatory scheme to be in contact with food. A second layer may comprise a second material, which can be similar to or different than the material forming the inner layer. The articles can have as many layers as desired. It is contemplated that the articles may comprise one or more materials that form various portions that are not "layers."

1. Detailed Description of Drawings

Figure 1:
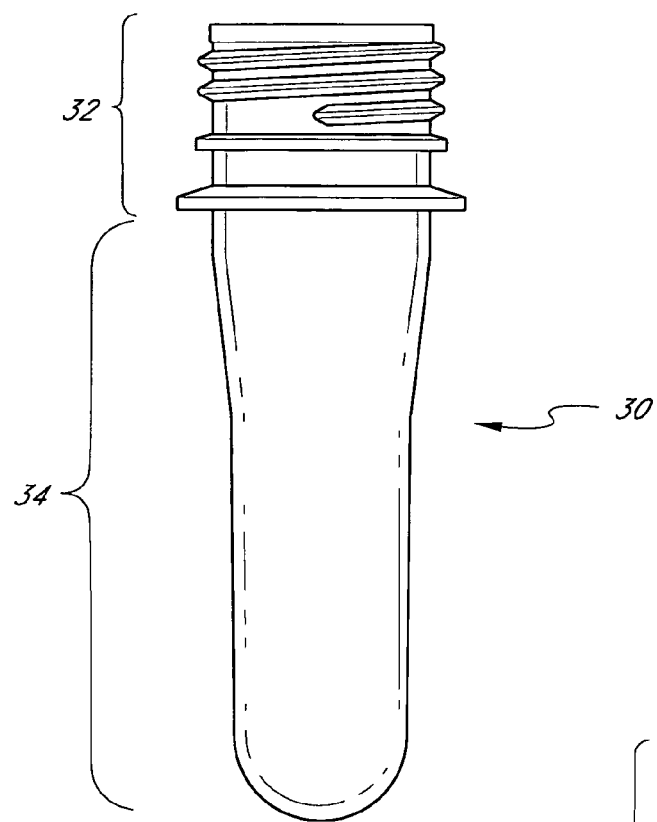
FIG. 1 is a preform used as a starting material for forming containers.
Figure 2:
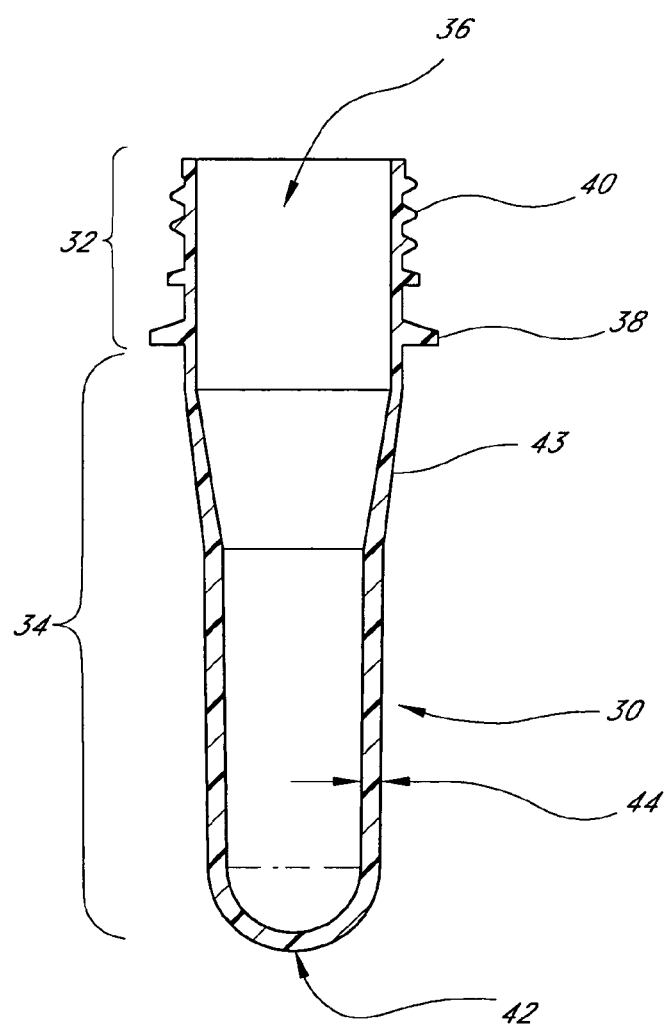
FIG. 2 is a cross-section of the preform of FIG. 1.

With reference to FIGS. 1 and 2, a preferred monolayer preform 30 is illustrated. Generally, the preform 30 has a neck portion 32 and a body portion 34. The illustrated preform 30 can have a single layer formed of a material that can be blow-molded. The preform 30 is preferably blow molded into a container for holding liquids, such as non-carbonated liquids such as fruit juice, water, and the like. Optionally, the preform 30 can be formed into a container to hold other liquids, such as carbonated liquids. The illustrated preform 30 can be suitable for forming a 16 oz. beverage bottle that is especially well suited for holding carbonated beverage. As used herein, the term "bottle" is a broad term and is used in accordance with its ordinary meaning and may include, without limitation a container (typically of glass and/or plastic having a comparatively narrow neck or mouth), a bottle-shaped container for storing fluid (preferably a liquid), etc. The bottle may or may not have a handle.

The illustrated preform 30 has a neck portion 32 which begins at an opening 36 (FIG. 2) to the interior of the preform 30 and extends to and includes the support ring 38. As used herein, the term "neck portion" is a broad term and is used in accordance with its ordinary meaning and may include, without limitation a portion of a preform attached to a body portion. The neck portion may include a neck finish. The neck finish together with the neck cylinder may form what is referred to herein as the "neck portion." The neck portion 32 in the illustrated embodiment is further characterized by the presence of the threads 40, which provide a way to fasten a cap or closure member to the bottle produced from the preform 30. Alternatively, the neck portion 32 may not be configured to engage a closure or may have means other than threads to engage a closure. The body portion 34 is an elongated and generally cylindrically shaped structure extending down from the neck portion 32 and culminating in an end cap 42. The illustrated end cap 42 is rounded; however, the end cap can have other suitable shapes. The preform thickness 44 will depend upon the overall length of the preform 30 and the desired wall thickness and overall size of the resulting container.

Figure 3:
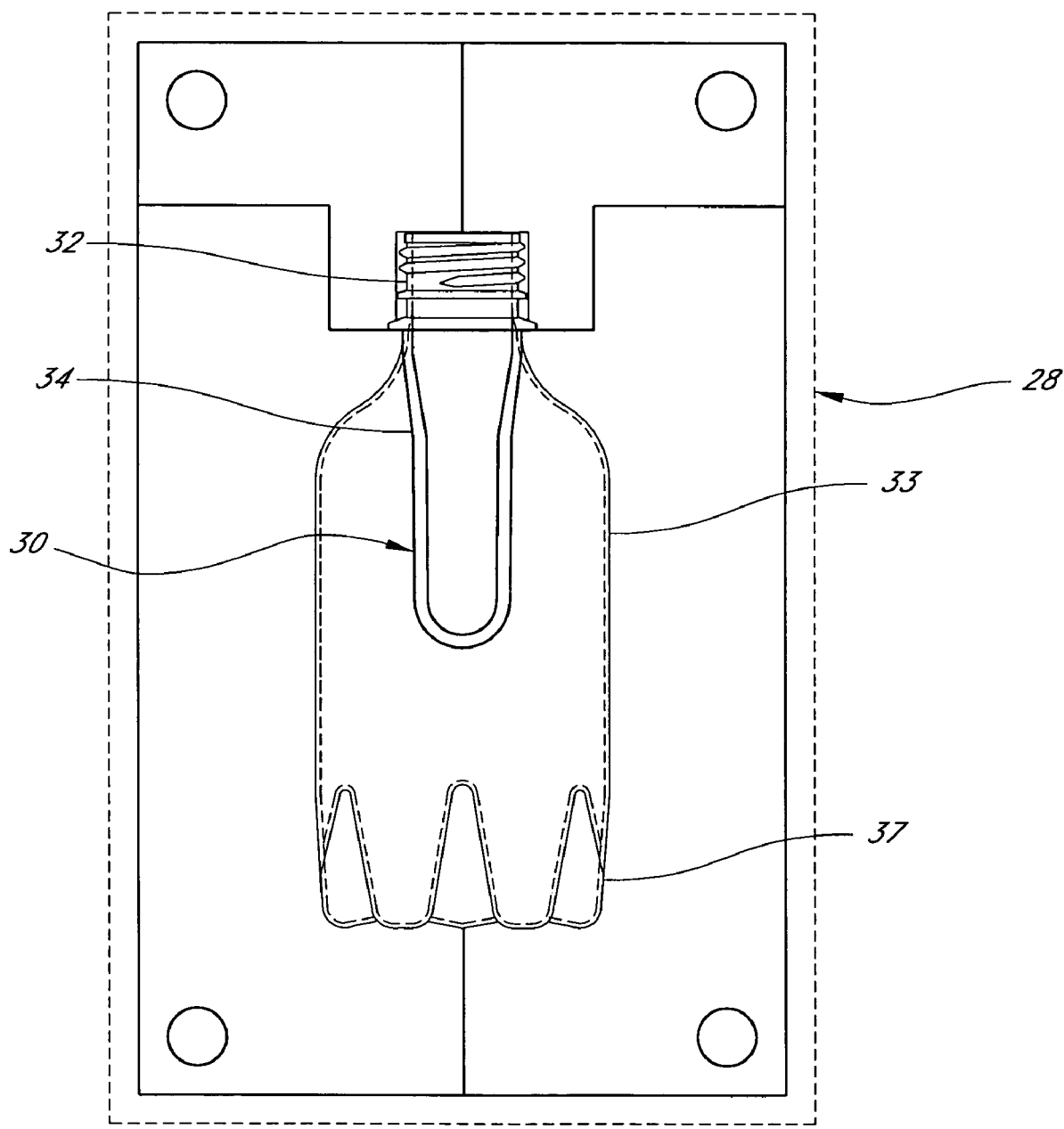
FIG. 3 is a cross-section of a blow-molding apparatus of a type that may be used to make a preferred container.
Figure 4:
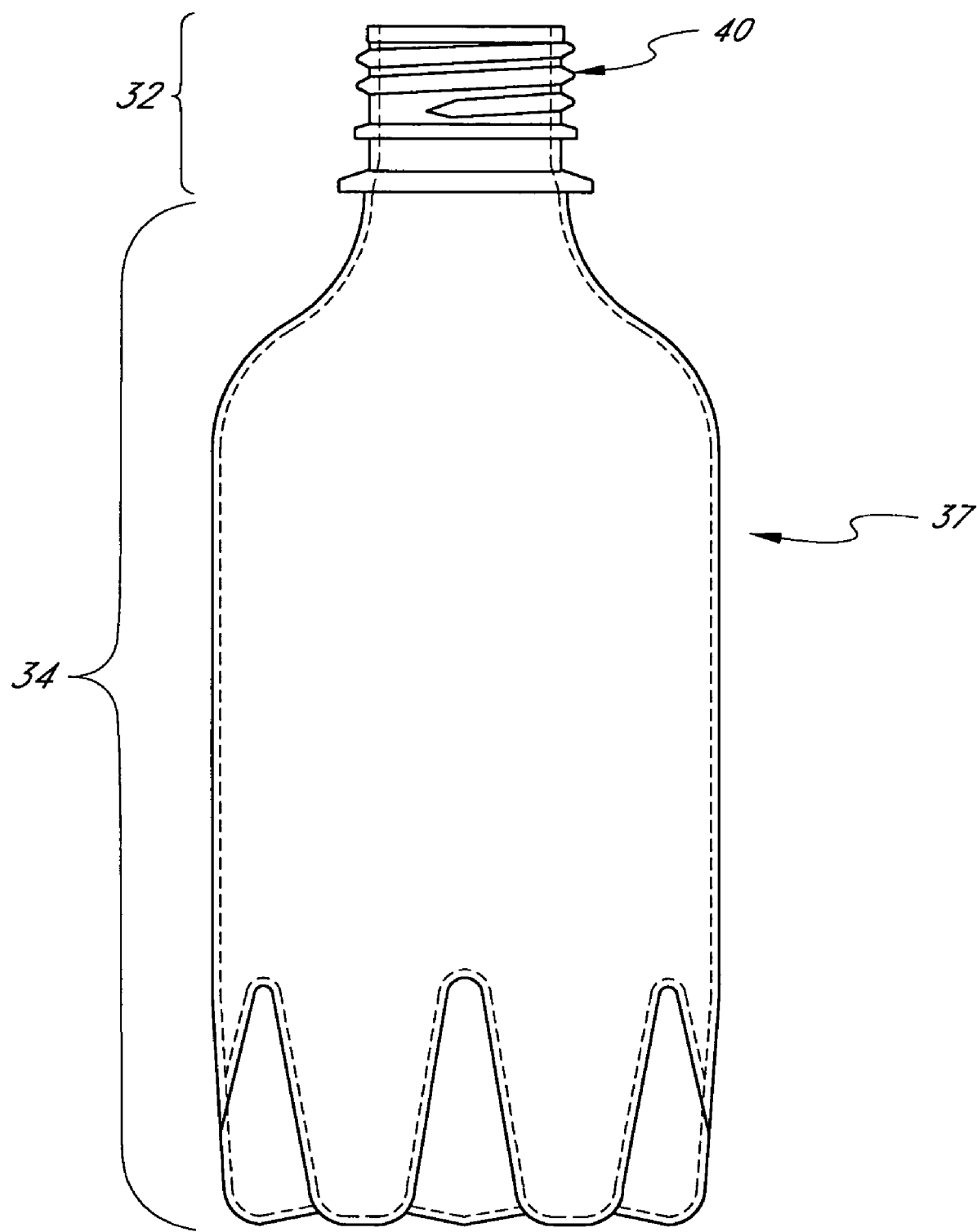
FIG. 4 is a side view of a container formed from a preform.

Referring to FIG. 3, in this blow molding process the preform 30 is placed in a mold having a cavity corresponding to the desired container shape. The preform 30 is then heated and expanded by forcing air or other suitable fluid into the interior of the preform to stretch the preform so that it fills the cavity, thus creating a container 37 (FIG. 4). This blow-molding process is described in detail below. A stretched rod or similar means may also be used to aid in the blow molding process, as is known in the art.

In some embodiments, a blow molding machine can receive warm articles (e.g., profiles such as sleeves, preforms, etc.) to aid in the blow molding process, as is known in the art. The mold 28 can receive warm preforms from an injection molding machine, such as the injection molding machines described herein. The preforms manufactured by the injection molding machine can be quickly transported to the mold 28 via a delivery system. The inherent heat of the preforms may provide one or more of the following: reduced blow molding time, reduced energy required to heat preforms to a temperature suitable for blow molding, and/or the like.

Optionally, one or more delivery systems can be employed to transport preforms to and/or bottles away from a mold. For example, a delivery system may comprise a shuttle system (e.g., a linear or rotary shuttle system) for transporting preforms to and/or away from the mold 28. The shuttle system can batch feed preforms to or remove blow molded bottles from the mold 28. Alternatively, the delivery system can comprise a reciprocating and/or wheel delivery system. In some embodiments, a wheel delivery system is used to rapidly deliver preforms to or remove bottles from the mold 28. Advantageously, wheel delivery systems can continuously transport articles to and from the mold 28 thereby increasing output.

It is contemplated that a delivery system can be used in combination with molding machine suitable for blow molding preforms, extrusion blow molding, extruding profiles and the like. Additionally, a delivery system may comprise a plurality of systems, such as a wheel delivery system and a shuttle system that cooperate to transport articles.

Referring to FIG. 4, there is disclosed an embodiment of a container 37 that can be formed from the preform 30. The container 37 has a neck portion 32 and a body portion 34 corresponding to the neck and body portions of the preform 30. As described above with respect to preforms, the neck portion 32 can be adapted to engage with closures. The illustrated neck portion 32 is characterized by the presence of the threads 40 which provide a way to fasten a cap onto the container. Optionally, the wall of the container 37 may inhibit, preferably substantially prevent, migration of gas (e.g. $CO_2$) through the wall of the container 37. In some embodiments, the container 37 comprises substantially closed cell foam that may inhibit the migration of fluid through the foam.

The blow molding operation normally is restricted to the body portion 34 of the preform with the neck portion 32 including any threads, pilfer ring, and/or support ring retaining the original configuration as in the preform. However, any portion(s) of the preform 30 can be stretch blow-molded. The container 37 can also be formed by other processes, such as through an extrusion process or combinations of process (e.g., injection over an extruded portion). For example, the container 37 can be formed through an extrusion blow molding process. Thus, the containers described herein may be formed from preforms, extruded profiles, etc.

Figure 5:
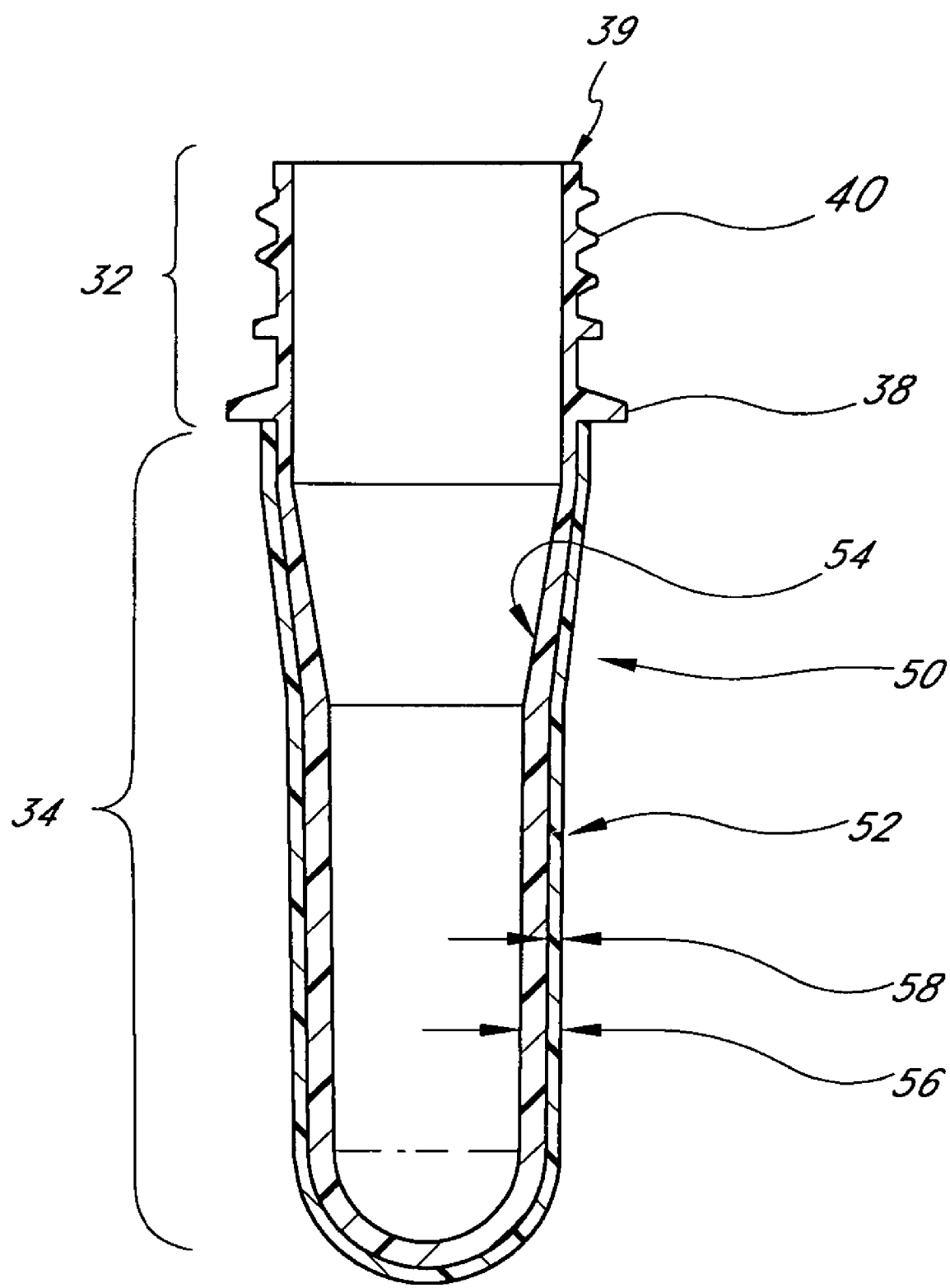
FIG. 5 is a cross-section of a multilayer preform.

Referring to FIG. 5, a cross-section of one type of multilayer preform 50 having features in accordance with a preferred embodiment is disclosed. The preform 50 preferably comprises an uncoated (monolayer) preform 39 coated with an outer layer 52. Preferably, the uncoated preform 39 comprises a polymer material, such as polypropylene, polyester, and/or other thermoplastic materials, preferably suitable for contacting food. In one embodiment, for example, the uncoated preform 39 comprises substantially polypropylene. In another embodiment, the uncoated preform 39 comprises substantially polyester, such as PET.

The multilayer preform 50 has a neck portion 32 and a body portion 34 similar to the preform 30 of FIGS. 1 and 2. In the illustrated embodiment, the outer layer 52 is disposed about at least a portion of the body portion 34. In one embodiment, the outer layer 52 is disposed about a substantial portion, preferably the entire portion, of the surface of the body portion 34 of the inner layer (illustrated as the preform 39 of FIG. 1), terminating at the bottom of the support ring 38. The outer layer 52 in the illustrated embodiment does not extend to the neck portion 32, nor is it present on the interior surface of the inner layer 39 which is preferably made of a material suitable for contact with the contents of the resulting container. The outer layer 52 may comprise either a single material or several layers (e.g., microlayers) of one or more materials. Further, the outer layer 52 can be generally homogenous, generally heterogeneous, or somewhere in between. Although not illustrated, the outer layer 52 can form other portions of the preform 50. For example, the outer layer 52 can form at least a portion of the inner surface of the preform 50 (such as when the outer layer is injected over a tube or profile that is open on both ends), or a portion of the neck portion 32. The outer layer 52 may or may not be suitable for contacting foodstuffs.

The overall thickness 56 of the preform is equal to the thickness of the initial uncoated preform 39 (i.e., the inner layer 54) plus the thickness 58 of the outer layer 52, and is dependent upon the overall size and desired coating thickness of the resulting container. However, the preform 50 may have any thickness depending on the desired thermal, optical, barrier, and/or structural properties of the container formed from the preform 50. If a tie layer is included, the overall thickness will include any thickness of the tie layer. The preforms and containers can have layers which have a wide variety of relative thicknesses. In view of the present disclosure, the thicknesses of a given layer and of the overall preform or container, whether at a given point or over the entire container, can be chosen to fit a manufacturing process or a particular end use for the container. In the illustrated embodiment, the outer layer 52 has a generally uniform thickness. However, the outer layer 52 and/or inner layer 54 need not to be uniform and they may have, for example, a thickness that varies along the longitudinal axis of the preform 50.

Figure 6:
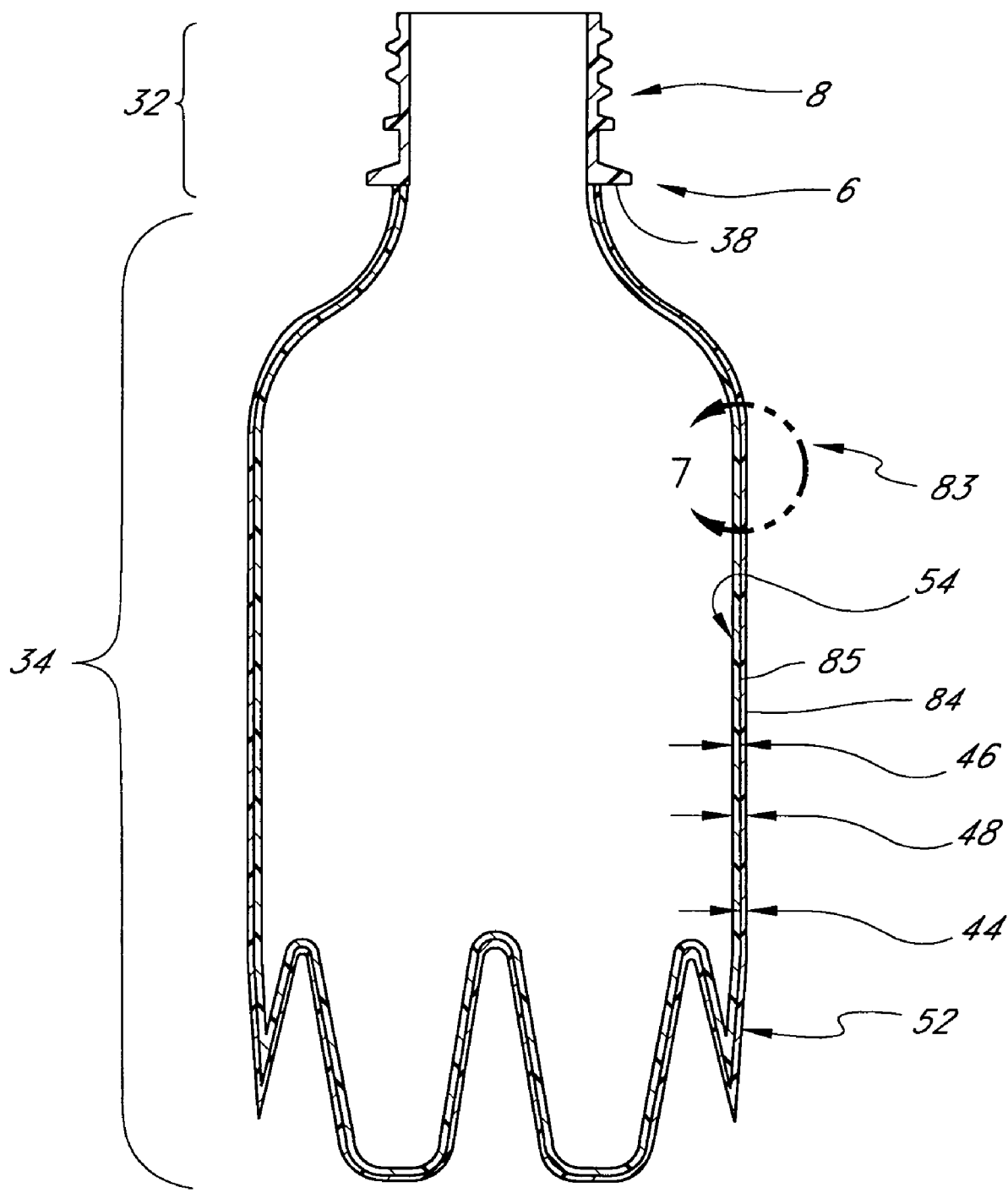
FIG. 6 is a cross-section of a multilayer container formed from the multilayer preform of FIG. 5.

The multilayer preforms can be used to produce the containers. For example, the preform 50 can be used to form a container 180 (FIG. 6). In one embodiment, the outer layer 52 cooperates with the inner layer 54 so as to provide a layer or space 85 therebetween, as shown in FIGS. 6 and 7. The layer 85 can permit the passage of air between the layers 52, 54 and can advantageously further insulate the container 83. The passages can be formed between the layer 52 which loosely surrounds the inner layer 54. Alternatively, the outer layer 52 can be sized and configured to snuggly hold the inner layer 54 and so that inner surface of the layer 52 contacts the outer surface of the layer 54. In some embodiments, the layer 85 can be a foam layer that is similar, or dissimilar, to one or more of the layers 52, 54. In yet another embodiment, the layer 85 can be a layer that couples the layer 52 to the inner layer 54. For example, the layer 85 can be crafting or a tie layer that inhibits, preferably that substantially prevents, relative movement between the layers 52, 54. For example, the layer 85 can be an adhesive layer that limits relative movement between the layers 52, 54. It is contemplated that some or none of the layers of the embodiments disclosed herein can be coupled together with a tie layer or the like.

In one embodiment, at least one of the layers 52, 54 can be treated to promote or reduce adhesion between the layers 52, 54. For example, the outer surface of the inner layer 54 can be chemically treated so that the outer layer 52 adheres to the inner layer 54. For example, a tie material can be applied to react and chemically treat one or more of the layers 52, 54. However, it is contemplated that any of the layer(s) can be modified to achieve the desired interaction between the layers of the preform. Optionally, the layers 52, 54 can be directly adhered together.

In some embodiments, a container comprises foam material that preferably has insulating properties to inhibit thermal transfer through the walls of the container. When liquid is in the container, such as container 83 of FIG. 6, for example, the foam material forming a wall 84 of the container 83 can reduce heat transfer between the liquid contents and the environment surrounding the container 83. For example, the container 83 can hold chilled contents, such as a carbonated beverage, and the foam insulates the container 83 to inhibit temperature changes of the chilled fluid. Thus, the contents can remain chilled for a desired duration of time despite an exterior ambient temperature that is greater than the temperature of the liquid. Alternatively, a heated material, such as a hot beverage, can be within the container 83 and the wall 84 can insulate the container 83 to inhibit heat transfer from the liquid to the environment surrounding the container 83. Further, the foam material of the container 83 can result in a surface temperature of the container 83 that is within a desired temperature range so that a person can comfortably grip the container 83 holding a heated or chilled liquid. The thickness of the foam layer and the size and configuration of the foam portion of the container can be varied in order to obtain the desired thermal properties of the container.

Referring to FIG. 8, a preferred embodiment of a multilayer preform 60 is shown in cross-section. One difference between the coated preform 60 and the preform 50 in FIG. 5 is the relative thickness of the two layers in the area of the end cap. In the preform 50, the outer layer 52 is generally thinner than the thickness of the initial preform throughout the entire body portion of the preform. In the preform 60, however, the outer layer 52 is thicker at 62 near the end cap 42 than it is at 64 in the wall portion 66, and conversely, the thickness of the inner layer 54 is greater at 68 in the wall portion 66 than it is at 70, in the region of the end cap 42. This preform design is especially useful when an outer coating is applied to the initial preform in an overmolding process to make a multilayer preform, as described below, where it presents certain advantages including that relating to reducing molding cycle time. Either layer may be homogeneous or may be comprised of a plurality of microlayers. In other embodiments of the preform 60 which are not illustrate, the outer layer 52 is thinner at 62 near the end cap 42 than it is at 64 in the wall portion 66, and conversely, the thickness of the inner layer 54 is less at 68 in the wall portion 66 than it is at 70, in the region of the end cap 42. At least one of the layers 52, 54 can optionally compromise a barrier material.

FIG. 8A is an enlargement of a wall section of the preform showing the makeup of the layers in a LIM-over-inject embodiment. The layer 54 is the inner layer of the preform and layer 52 is the outer layer of the preform. The outer layer 52 comprises a plurality of microlayers (i.e., lamellar material) of material as will be made when a LIM system is used. Of course, not all preforms of FIG. 8 will be of this type.

Figure 9:
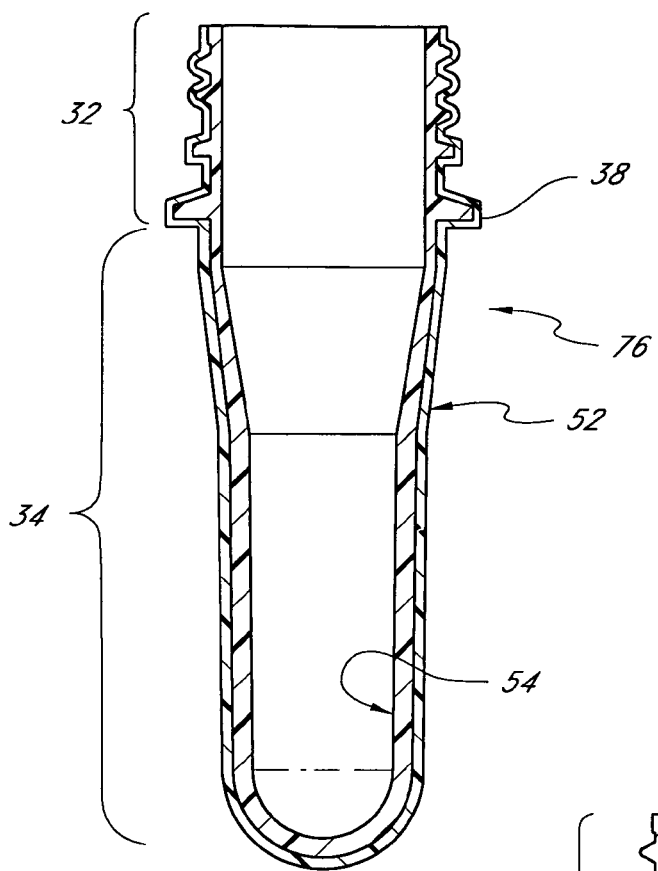
FIG. 9 is a cross-section of a multilayer preform having a multilayer neck portion.

Referring to FIG. 9, another embodiment of a multilayer preform is shown in cross-section. The primary difference between the coated preform 76 and the preforms 50 and 60 in FIGS. 5 and 8, respectively, is that the outer layer 52 is disposed on the neck portion 32 as well as the body portion 34.

The preforms and containers can have layers which have a wide variety of relative thicknesses. In view of the present disclosure, the thickness of a given layer and of the overall preform or container, whether at a given point or over the entire container, can be chosen to fit a coating process or a particular end use for the container. Furthermore, as discussed above in regard to the layer(s) in FIG. 8, the layers in the preform and container embodiments disclosed herein may comprise a single material, more than one materials, or several materials.

Figure 10:
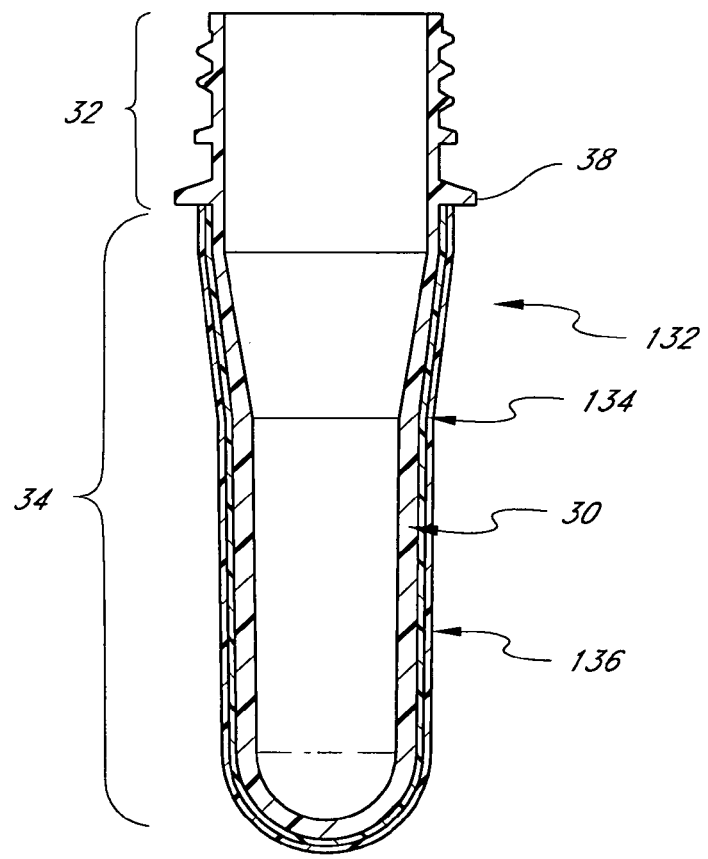
FIG. 10 is a cross-section of a multilayer preform in accordance with another embodiment.

The apparatuses and methods disclosed herein can be also used to create preforms with three or more layers. In FIG. 10, there is shown a three-layer embodiment of a preform 132. The preform shown therein has two coating layers, a middle layer 134 and an outer layer 136. The relative thickness of the layers shown in FIG. 10 may be varied to suit a particular combination of materials or to allow for the making of different sized bottles. As will be understood by one skilled in the art, a procedure analogous to that disclosed herein would be followed, except that the initial preform would be one which had already been coated, as by one of the methods for making coated preforms described herein, including overmolding.

Figure 11:
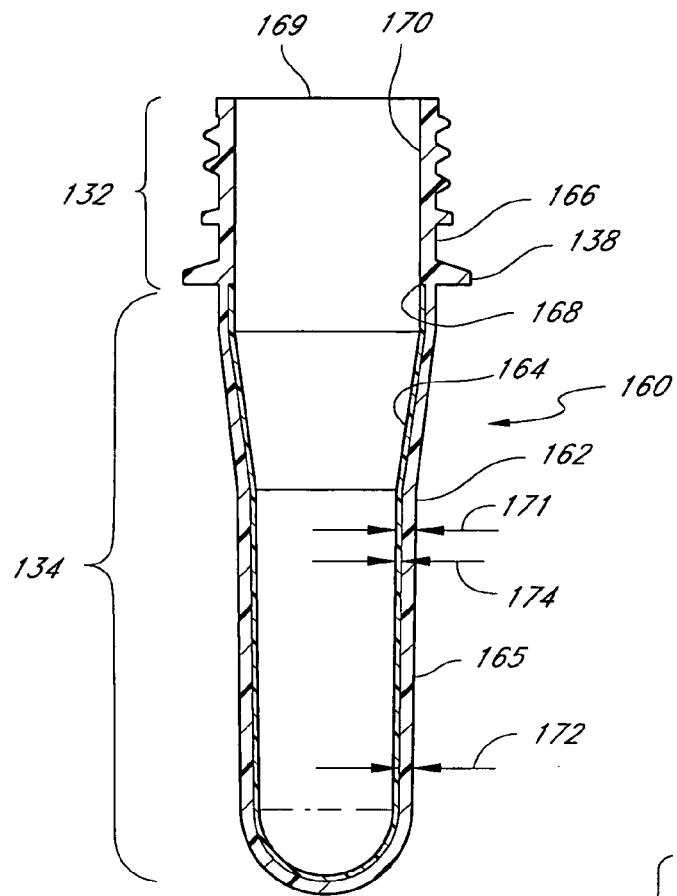
FIG. 11 is a cross-section of a multi-layer preform having an inner layer defining an interior of the preform.

FIG. 11 illustrates a cross-section of one type of multilayer preform 160 having features in accordance with a preferred embodiment. The preform 160 preferably comprises an outer layer 162 and an inner layer 164.

The multi-layer preform 160 has a neck portion 132 and a body portion 134 similar to the preforms described above. Preferably, the outer layer 162 forms the outer surface 165 of the body portion 134 and the outer surface 166 of the neck portion 132. The outer surface 166 can be configured to engage a closure. The outer layer 162 is disposed about a substantial portion, preferably the entire portion, of the inner layer 164.

The illustrated outer layer 162 extends from the upper end 168 of the inner layer 164 to an opening 169 of the preform 160. The inner layer 164 in the illustrated embodiment does not extend along the neck portion 132. Thus, the outer layer 162 can form substantially the entire neck portion 132, as shown in FIG. 11. In other embodiments, the upper end 168 of the inner layer 164 can be disposed at some point along the neck portion 132. Thus, the inner layer 164 and outer layer 162 may both define the neck portion. In one non-limiting embodiment, the outer layer 162 comprises at least about 70% of neck portion (or neck finish) of the neck portion 132 by weight. In another non-limiting embodiment, the outer layer 62 comprises at least about 50% of the neck portion 132 by weight. In yet another non-limiting embodiment, the outer layer 162 comprises more than about 30% of the neck portion 132 by weight.

The overall thickness 171 of the preform 160 is equal to the thickness 172 of the outer layer 162 plus the thickness 174 of the inner layer 164, and is dependent upon the overall size of the resulting container. In one embodiment, the thickness 172 of the outer layer 162 is substantially greater than the thickness 174 of the inner layer 164. The outer layer 162 and inner layer 164, as illustrated, have generally uniform thicknesses. However, the outer layer 162 and inner layer 164 may not have uniform thicknesses. For example, one or both of the layers 162, 164 may have a thickness that varies along the length of the preform 160.

The outer layer 162 comprises a first material and the inner layer 164 preferably comprises another material. For example, the outer layer 162 can comprise foam material and the inner layer 164 can comprise an unfoamed polymer material, such as PET (e.g., virgin or post-consumer/recycled PET), phenoxy, etc. Preferably, a substantial portion of the outer layer 162 comprises a first material and a substantial portion of the inner layer 164 comprises a second material. The first and the second materials can be different or similar to each other.

Figure 12:
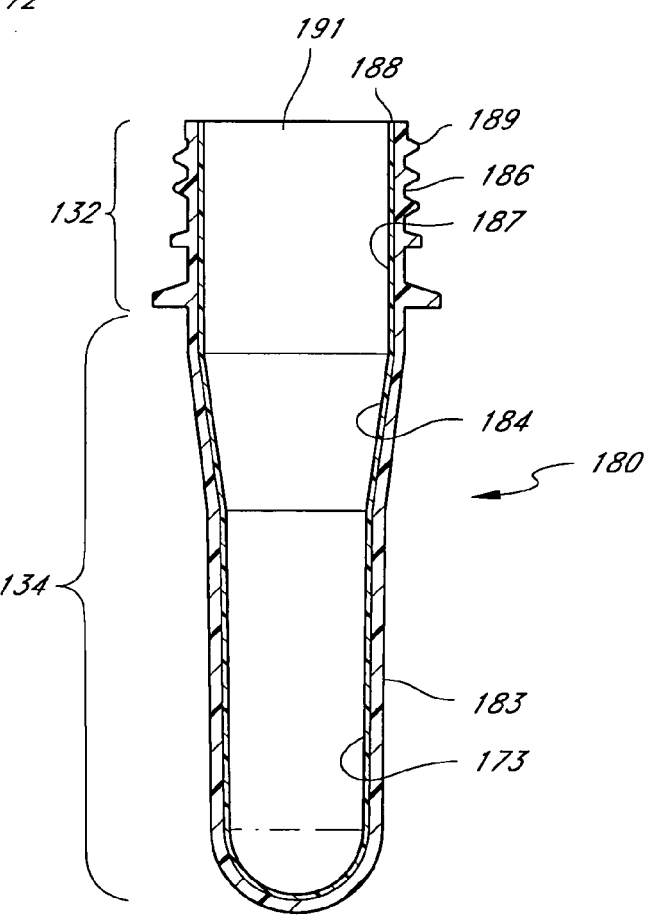
FIG. 12 is a cross-section of a multi-layer preform having an inner layer and an outer layer that define a neck portion.

FIG. 12 is a cross-section view of a multi-layer preform 180. The preform 180 is generally similar to the preform 160, and thus, many aspects of preform 180 will not be described in detail. The preform 180 comprises an inner layer 184 and an outer layer 183. The inner layer 184 defines a substantial portion of the interior surface 173 of the preform 180. The inner layer 184 has an end 188 that is proximate to an opening 191 of the preform 180. In the illustrated embodiment, the outer layer 183 defines an outer surface 186 of the neck portion 132, and the inner layer 184 defines the inner surface 187 of the neck portion 132. Of course, the outer layer 183 can be configured to engage a closure. In the illustrated embodiment, the outer surface 86 defines threads 189 adapted to receive a threaded cap (e.g., a screw cap).

Although not illustrated, preforms 160 and 180 can include more than two layers. For example, the outer layer 162 of the preform 160 can comprise a plurality of layers comprising one or more of the following: lamellar material, foam material, PP, PET, and/or the like. Similarly, the inner layer 164 can comprise a plurality of layers. One of ordinary skill in the art can determine the dimensions and number of layers that form the preform described herein. The layers 183, 184 can be made of similar or different materials as the layers 162, 164 described above.

Optionally, a layer can be coated over at least a portion of the preform to prevent abrasion or wearing, especially if at least a portion of the preform is made of foam material. For example, a coating layer can surround the threads of a neck portion made of foam and can comprise PET, PP, combinations thereof, or other thermoplastic materials.

Figure 13:
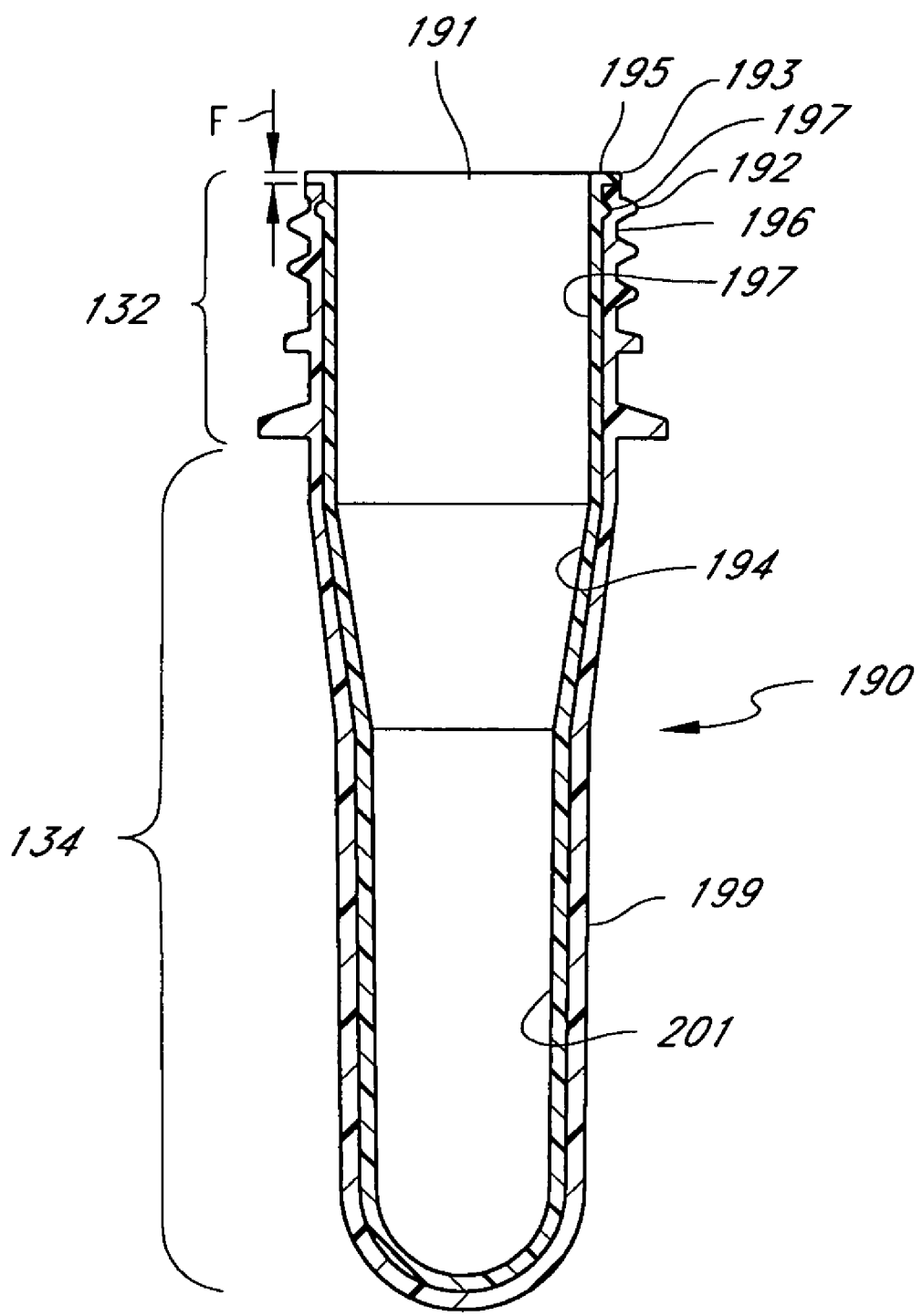
FIG. 13 is a cross-section of a multi-layer preform having an inner layer with a flange.

FIG. 13 is a cross-sectional view of a preform 190. The preform 190 is similar to the preform 180 illustrated in FIG. 12, except as further detailed below.

The preform 190 comprises an inner layer 194 that extends downwardly from the opening 191 and defines the interior of the preform. The inner layer 194 comprises a flange 193. As used herein, the term "flange" is a broad term and is used in accordance with its ordinary meaning and may include, without limitation, one or more of the following: a lip, an elongated portion, rim, projection edge, a protrusion, and combinations thereof. The flange can function as a locking structure. Additionally, the preform may optionally include a plurality of flanges.

The flange 193 defines a portion of an inner surface 201 and at least a portion of an upper surface 195 of the preform. The flange 193 can have a constant or varying thickness F depending on the desired properties of the neck portion 132. In some embodiments, including the illustrated embodiment, the flange 193 is positioned above structure(s) (e.g., threads 192) for receiving a closure. In some embodiments, the flange 193 defines a portion of one or more threads, protrusions, recesses, and/or other structures for engaging a closure.

With continued reference to FIG. 13, the flange 193 extends about at least a portion of the periphery of the opening 191 and defines a layer of material. The flange 193 preferably extends about the entire periphery of the opening 191. Thus, the flange 193 can be a generally annular flange. When a closure is attached to the neck portion 132 of a container made from the preform 190, the upper surface 195 of the flange 193 can form a seal with the closure to inhibit or prevent foodstuffs from escaping from the container. The flange 193 can inhibit or prevent separation between the inner layer 194 and the outer layer 199.

One or more locking structures 197 of FIG. 13 can inhibit relative movement between the inner layer 194 and an outer layer 199. As used herein, the term "locking structure" is a broad term and is used in accordance with its ordinary meaning and may include, without limitation, one or more of the following: protrusions, surface treatments (e.g., roughened surface), prongs, protuberances, barbs, flanges, recesses, projections, textured pattern, or the like, preferably for inhibiting or reducing movement between the layers 194 and 199. The locking structure 197 can be formed by the inner layer 194 and/or the outer layer 199. In the illustrated embodiment, the locking structure 197 is a protrusion extending from and about the outer surface of the inner layer 194. In some embodiments, the locking structure 197 is an annular protrusion extending circumferentially about the outer surface of the inner layer 194. The locking structure 197 can be continuous or discontinuous structure. The inner layer 194 can have one or more locking structures, such as a textured pattern (e.g., a series of grooves, protuberances, and the like).

Additionally, the locking structure 197 can be configured to provide positive or negative draft. For example, the inner layer 194 can comprise a somewhat flexible material (e.g., PET) and a locking structure 197 that can provide positive draft during mold removal. In some embodiments, the outer layer 199 comprises a somewhat rigid material (e.g., olefins) that can provide positive or negative draft during mold removal.

The outer layer 199 is configured to receive the locking structure 197. The locking structure 197 effectively locks the outer layer 199 to the inner layer 194. Although not illustrated, a plurality of locking structures 197 can be defined by the layers 194, 199 and may be disposed within the neck portion 132 and/or the body portion 134 of preform 190. In some embodiments, a tie layer can be used to couple the inner layer 194 to the outer layer 199. In one embodiment, the inner layer 194 and the outer layer 199 are formed of materials that bond or adhere to each other directly. In other embodiments, the inner layer 194 is tied to the outer layer 199, so that the layers 194 and 199 can be easily separated during, e.g., a recycling process. However, an article comprising a tie layer can be recycled in some embodiments.

The upper end of the outer layer 199 is spaced from the upper surface 195 of the preform. A skilled artisan can select the thicknesses of the layers 194, 199 to achieve the desired structural properties, thermal properties, durability, and/or other properties of the preform.

Figure 13A:
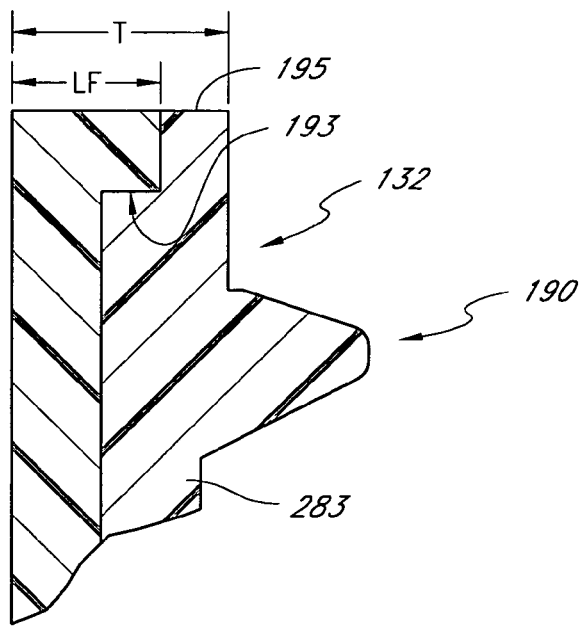
FIGS. 13A and 13B are enlarged cross-sections of portions of multi-layer preforms in accordance with some embodiments.
Figure 13B:
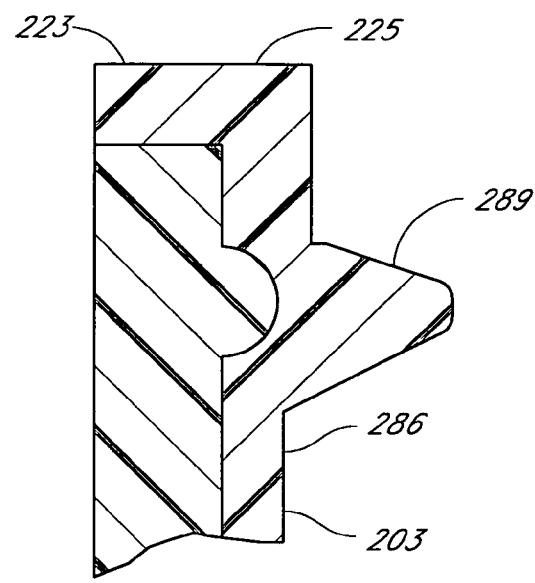

FIGS. 13A and 13B illustrate modified embodiments of a portion of the preform 190 of FIG. 13. The preform 190 of FIG. 13A has a flange 193 that extends along a portion of the upper surface 195 of the preform. In some non-limiting embodiments, the length LF of the flange 193 is less than about 95% of the wall thickness T of the neck portion 132. In one non-limiting embodiment, the length LF of the flange 193 is about 50% to 90% of the wall thickness T of the neck portion. In certain non-limiting embodiments, the length LF of the flange 193 is about 60%, 70%, 75%, or 80%, or ranges encompassing such percentages of the wall thickness T of the neck portion. In another non-limiting embodiment, the length LF of the flange 193 is about 40% to 60% of the wall thickness T of the neck portion. In yet another embodiment, the length LF of the flange 193 is less than about 40% of the wall thickness T of the neck portion.

FIG. 13B illustrates a portion of a preform having an outer layer 203 that defines a flange 223. The flange 223 extends inwardly and defines an upper surface 225. The flange 223 can define the interior surface of the preform, or be spaced therefrom. The flange 223 can have a length similar to or different than the length of the flange 193. The neck portion 132 has threads for receiving a closure. However, the neck portion can have other structures (e.g., recesses, ridges, grooves, etc.) for engaging a closure. The preforms described above can be modified by adding one or more layers to achieve desired properties. For example, a barrier layer can be formed on the body portions of the preforms.

Figure 14:
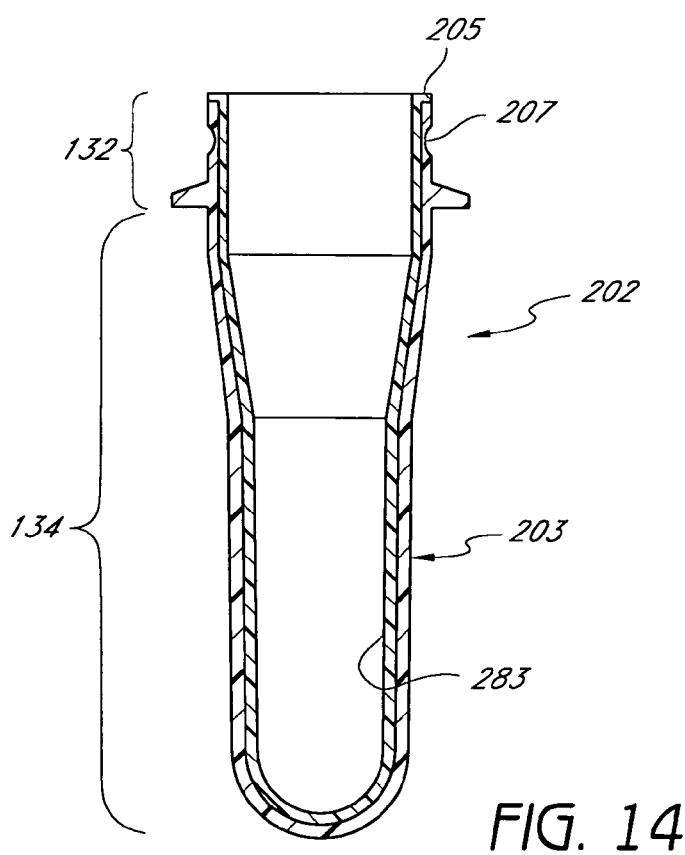
FIG. 14 is a cross-section of a multi-layer preform having an outer layer with a coupling structure.

FIG. 14 illustrates a modified embodiment of a preform 202. The preform 202 has a neck portion 132 that defines a coupling structure 207 configured to receive a closure. As used herein, the term "coupling structure" is a broad term and is used in accordance with its ordinary meaning and may include, without limitation a feature, such as a positive (e.g., a projection, protuberance, and the like) or negative feature (e.g., an indentation, recess, and the like). A coupling structure may be configured to engage a closure to hold the closure in a desired position.

The illustrated coupling structure 207 is in the form of a recess adapted to receive a portion of a closure device. The coupling structure 207 can extend about one or more portions of the preform 202. In other embodiments, the coupling structure 207 extends about the entire periphery or circumference of the preform 202. The coupling structure 207 can have a curved (e.g., semi-circular), v-shaped, u-shaped, or any other suitable cross-sectional profile. Although not illustrated, the structure 207 can be a protrusion, such as an annular protrusion, defined by an outer layer 203. Optionally, the preform 202 can have a plurality of coupling structures 207 so that the closures of various configurations can be attached to a container made from the preform. The distance between an upper surface 205 and the structures 207 and the shape of the structure 207 is determined by the geometry of closure used to seal and close the container made from the preform 202.

Figure 14A:
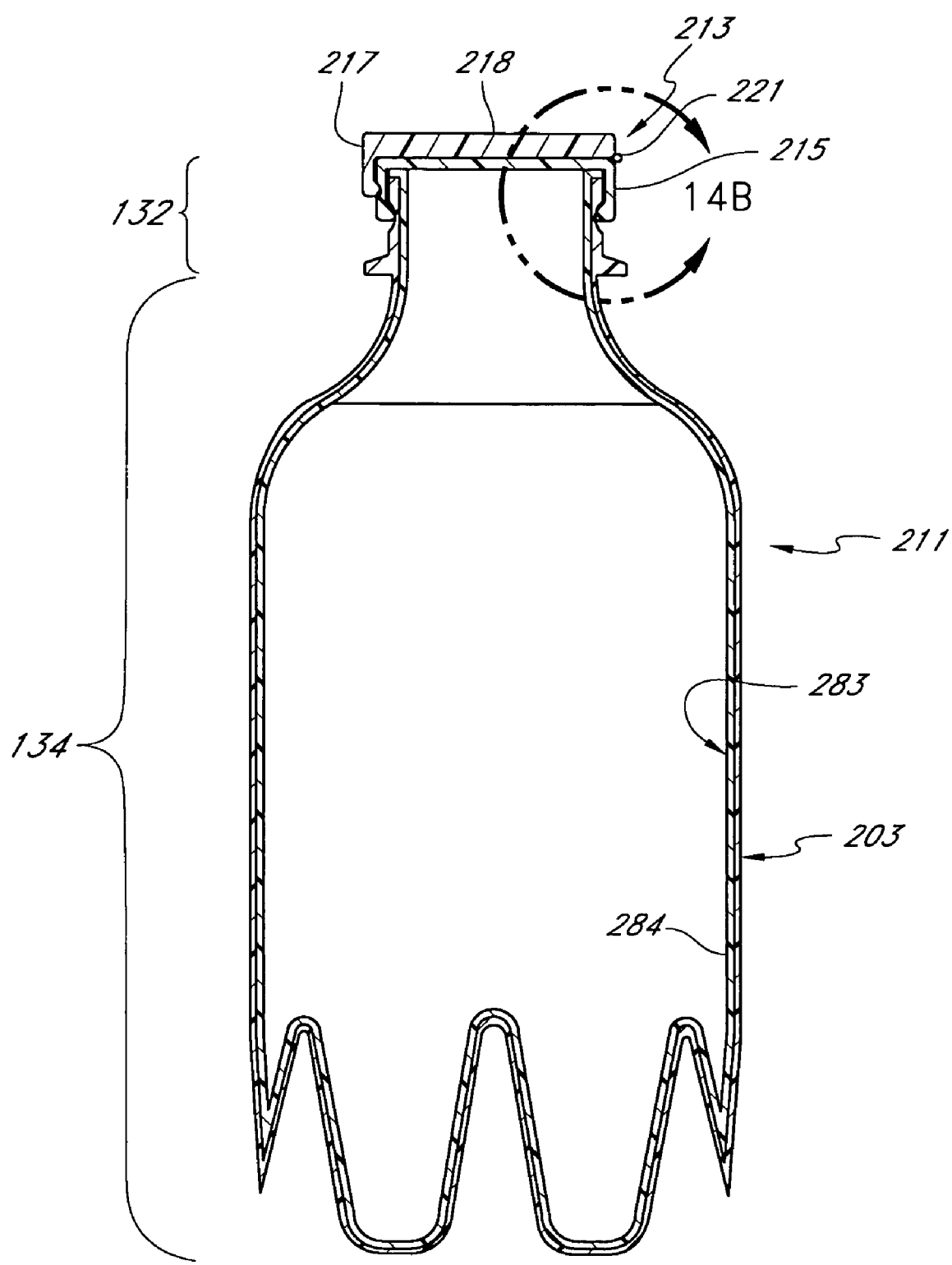
FIG. 14A is a cross-section of a container made from the preform of FIG. 14, a closure is attached to the container.

FIG. 14A illustrates a container 211 produced from a preform 202 of FIG. 14. A closure 213 is attached to the neck portion 132 of the container 111. The closure 213 can be a one-piece or multi-piece closure. The closure 213 can be temporarily or permanently attached to the container 211. The entire closure 213 can be removed from the container 211 when the liquid is consumed. In other embodiments, a portion of the closure 213 can be removed while another portion of the closure 213 remains attached to the container 211 during consumption. The closure 213 can be semi-permanently or permanently attached to the container. If the closure 213 is semi-permanently attached to the container 211, the closure 213 can be pulled off the container 211. In one embodiment, if the closure 213 is permanently attached to the container 211, the closure 213 and container 211 can form a generally unitary body.

As shown in FIG. 14B, the upper surface 205 of the preform and the closure 213 can form a seal 231, preferably forming either a hermetic seal or other seal that inhibits or prevents liquid from escaping between the container 211 and the closure 213. Optionally, the container 211 can have a gasket or removable seal. For example, the container 211 can have a removable seal, such as a membrane adhered to the upper lip of the container, or a portion of the closure 213 that can be removed. The removable seal can have a tab or ring for convenient gripping and removal of the seal. Alternatively, the seal 231 can be formed by a membrane or sheet that can be broken or pieced in order open the container 211. In some embodiments, an outer layer 203 of the container 211 is formed of a generally high strength material or rigid material (e.g., PP), so that the flange 209 can be compressed between the closure 213 and the outer layer 203 to ensure that the integrity of the seal 231 is maintained.

As shown in FIGS. 14A and 14B, the closure 213 has a body 215 and a cover 218. The body 215 can be connected to the cover 218 by a hinge 221 (e.g., a molded material acting as a living hinge or other structure to permit movement). A latch or tang 217 (FIG. 14A) can fasten the cover 218 to the body 215. The latch 217 can be moved to release the cover 218 in order to open the closure 213. Alternatively, the cover 218 and body 215 can be separate pieces so that the cover 218 can be removed from the body 215. When the closure 213 is in the opened position, contents can be delivered out of the container 211, preferably delivered while the body 215 remains attached to the neck finish. After the desired amount of foodstuff has been removed from the container 211, the cover 218 can be returned to the closed position to reseal the container.

The body 215 of the closure 213 can be releasably coupled to the neck portion. For example, the body 215 can be snapped onto the neck portion 132. Alternatively, the body 215 can be permanently coupled to the neck portion 132. The neck portion 132 comprises one or more closure attaching structures 227, so that the closure 213 can be snapped onto and off of the container. The neck portion 132 in the illustrated embodiment has a closure attaching structure 227 in the form of a negative feature, such as a recess or indentation. The body 215 can be permanently coupled to outer layer 203 by a welding or fusing process (e.g., induction welding), an adhesive, frictional interaction, and/or the like. The container 211 can be configured to receive various types of closures, such as BAP® closures produced by Bapco Closures Limited (England) (or similar closures), screw caps, snap closures, and/or the like. A skilled artisan can design the neck finish of the container 211 to receive closures of different configurations.

With continued reference to FIG. 14A, the container 211 is particularly well suited for hot-fill applications. The container 211 can generally maintain its shape during hot-fill processes. After blow molding or hot-filling, final dimensions of the neck portion of the container 211 are preferably substantially identical to the initial dimensions of the preform. Additionally, this results in reduced dimensions variations of the threads on the neck finish. For example, the inner layer 284 can be formed of a material for contacting foodstuffs, such as PET. The outer layer 203 can comprise moldable materials (e.g., PP, foam material, crystalline or semi-crystalline material, lamellar material, homopolymers, copolymers, combinations thereof, and other heat resistant materials described herein) suitable for hot-filling. The outer layer 203 provides dimensional stability to the neck portion 132 even during and/or after hot-filling. The width of the outer layer 203 can be increased or decreased to increase or decrease, respectively, the dimensional stability of the neck portion 132. Preferably, one of the layers forming the neck portion 132 comprises a material having high thermal stability; however, the neck portion 132 can also be made of materials having low temperature stability, especially for non hot-fill applications.

Additionally, the dimensional stability of the outer layer 203 ensures that the closure 213 remains attached to the container 211. For example, the outer layer 203 may comprise a high strength material (e.g., PP) and can maintain its shape thereby preventing the closure 213 from unintentionally decoupling from the container 211.

With reference to FIG. 14C, the container has a neck portion that comprises closure attaching structures for a snap fit. The neck portion in the illustrated embodiment has a closure attaching structure 227 in the form of a positive feature, such as a protrusion, flange, or the like suitable for engaging the closure 213. The closure attaching structure 227 can form an annular protrusion that extends circumferentially about the neck portion. The closure 213 can have a one-piece or multi-piece construction. The illustrated container 211 has an upwardly tapered wall forming the neck finish. The tapered portion of the neck finish can bear against the closure 213 to form a seal.

FIG. 15A illustrates a portion of a preform 220 in accordance with another embodiment. The preform 220 has a support ring 222 and a body portion 224 extending downwardly therefrom. The preform 220 has an opening 226 at its upper end. The neck finish of the preform may or may not have threads. In some embodiments, threads are attached to the neck region 225 of the preform. It is contemplated that the preform 220 can be formed without a support ring. A support ring and/or threads may optionally be formed on the preform 220 in subsequent processes.

FIG. 15B illustrates the preform 220 after closure attaching structures 228 have been attached to the neck region 225. It is contemplated that the threads, structures engaging a snap cap, or other type of mounting or attaching structure can be attached to the neck region 225 before or after the preform 220 has been made into a container. For example, the closure mounting structures 228 can be attached to the preform 220 after the preform has been molded, preferably blow molded into a container.

Preforms can have other portions that are attached or coupled to each other. FIG. 15C illustrates a preform 234 that has at least a portion of the neck finish 240 that is coupled to a body 242 of the preform. The illustrated preform 234 has a portion 238 that is coupled to the upper end 250 of the lower portion 252 of the preform 234. The portion 238 may comprise different materials and/or microstructures than the lower portion 252. In some embodiments, the portion 238 comprises crystalline material. Thus, the preform 230 may be suitable for hot fill applications. The lower portion 252 may be amorphous to facilitate the blow molding process. In some embodiments, the upper portion 238 comprises a different material than the lower portion 252. A skilled artisan can select the material that forms the preform. In some embodiments, the upper end 250 is positioned below or at the support ring. The preforms illustrated in FIGS. 15A to 15C can have monolayer or multilayer walls.

Figure 16:
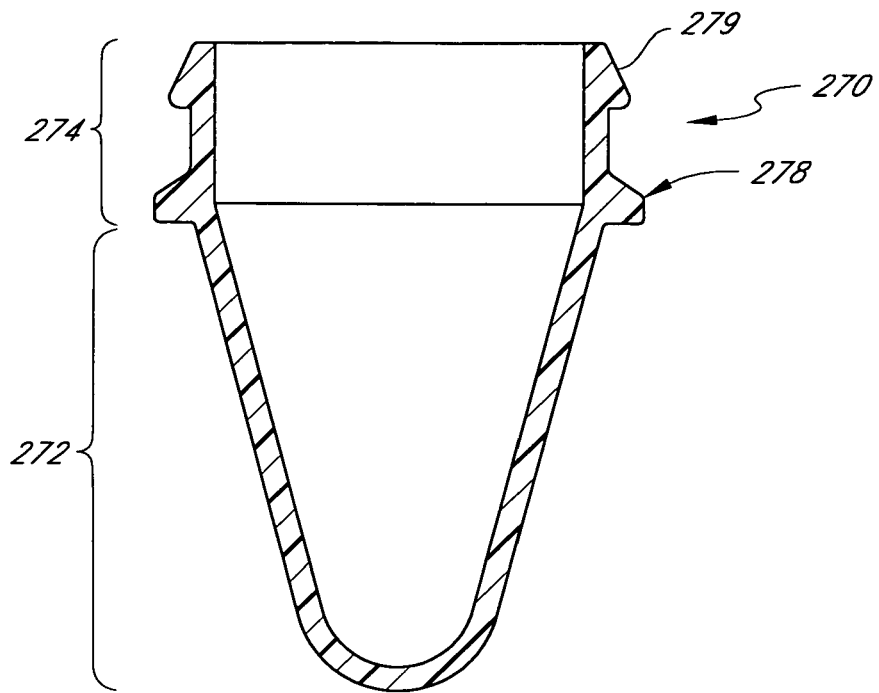
FIG. 16 is a cross-section of a preform in accordance with another embodiment.
Figure 17:
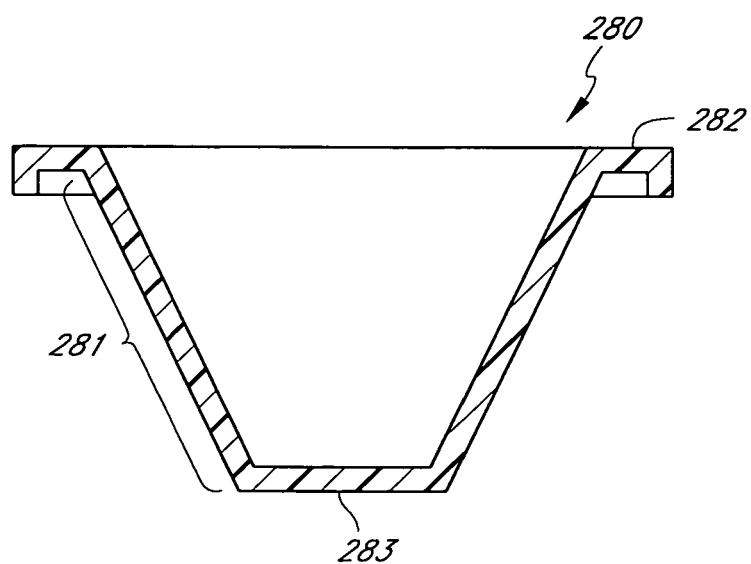
FIG. 17 is a cross-section of a preform in accordance with another embodiment.

The preforms, including the monolayer and multiplayer preforms, described above can have other shapes and configurations. FIG. 16 illustrates a preform 270 having a tapered body portion 272 and a neck finish 274. The preform 270 can be blow molded to form a container in the form of a jar, for example. A jar or other similar container can have a mouth or opening that is larger than the opening of a bottle. The preform 270 has a support ring 278 and one or more closure attaching structures 279, preferably configured to interact with a snap closure or other type of closure. FIG. 17 illustrates an embodiment of a preform with a neck finish without threads. The preform 280 comprises a body portion 281, which has an end cap 283, and a neck finish 282. The preform 280 may be suitable for blow molding into a container. The preforms illustrated in FIGS. 16 and 17 can be monolayer or multilayer preforms (e.g., having layers described above). The preforms described above can be formed without a neck finish.

The preforms, such as those depicted in FIGS. 1-18, can be subjected to a stretch blow-molding process. The blow molding process is described primarily for the monolayer preform 30, although the multi-layer preforms (e.g., preforms 50, 60, 76, 80, 132, 160, 180, 290, and 216) can be processed in a similar manner. The containers described above can be formed by various molding process (including extrusion blow molding), for example.

2. Detailed Description of Closures

As described above, closures can be employed to seal containers. As used herein, the term "closure" is a broad term and is used in accordance with its ordinary meaning and may include, without limitation, a cap (including snap cap, flip cap, bottle cap, threaded bottle cap, pilfer-proof cap), a crown closure, cork (natural or artificial), punctured seal, a lid (e.g., a lid for a cup), multi-piece closure (e.g., BAP® closures produced by Bapco Closures Limited (England) or similar closure), snap closures, and/or the like.

Generally, the closures can have one or more features that provide further advantages. Some closures can have one or more of the following: tamper evident feature, tamper resistant feature, sealing enhancer, compartment for storage, gripping structures to facilitate removal/placement of the closure, non-spill feature, and combinations thereof.

Closures can have a one-piece or multi-piece construction and may be configured for permanently or temporarily coupling to a container. For example, the closure illustrated in FIG. 14A has a multi-piece construction. The closure illustrated in FIG. 18 has a one-piece construction. The terms "closure" and "cap" may be used interchangeably herein. It is contemplated that closures can be used with bottles, boxes (especially boxes used to hold foodstuff, such as juices, for example), cartons, and other packaging or articles. As used herein, the term "bottle cap" is a broad term and is used in accordance with its ordinary meaning and may include, without limitation, a cap suitable for being attached to a bottle, such as a glass or plastic bottle (e.g., bottle typically configured to hold alcoholic beverages or juices) and may or may not have threads. Bottle caps are typically removed by using a bottle opener, as in known in the art. The term "threaded bottle cap" is a broad term and is used in accordance with its ordinary meaning and may include, without limitation, a cap (e.g., a screw cap) suitable for being attached to bottle having threads. In view of the present disclosure, embodiments of closures having threads may be modified to form bottle caps, or other types of closures for containers of different configurations. In some embodiments, closures can threadably engage a container or be attached to a container by various methods, such as sonic welding, induction welding, a multi-step molding process, adhesives, thermoforming, and the like.

Figure 18:
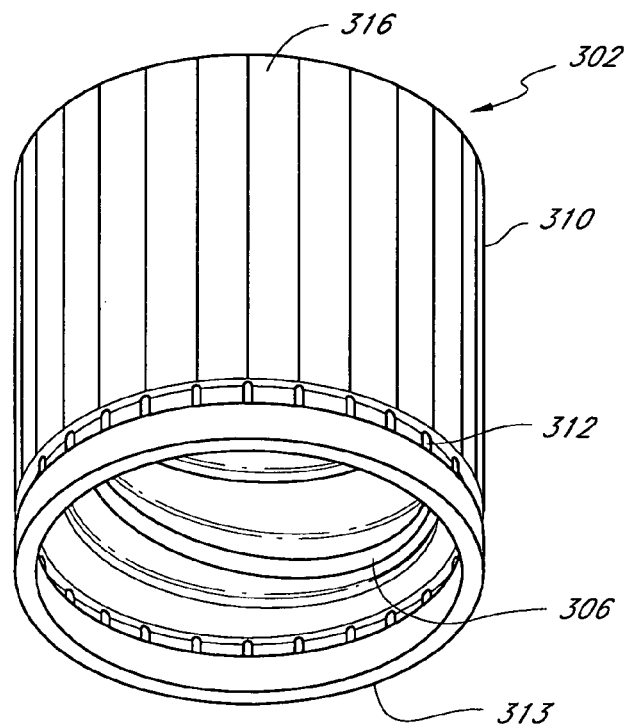
FIG. 18 is a perspective view of a closure suitable for closing a container.

FIG. 18 illustrates one embodiment of a closure 302 that can be coupled to an article, such as the neck portion of a container. In the illustrated embodiment, the closure 302 has internal threads 306 (FIG. 19) that are configured to mate with the threads of a neck portion so that the closure 302 can be removably coupled to a container. The closure 302 can be fastened to the container (e.g., a bottle) to close the opening or mouth of the bottle. The closure 302 includes a main body 310, and an optional tamper evidence structure or anti-tamper structure, such as a band 313 (or skirt) coupled to the body 310 by one or more connectors 312. The connectors 312 can be sized and adapted so that when the closure 302 is removed from a container, the connectors 312 will break, thus separating the body 310 and the band 313 indicating that the closure 302 has been removed from the associated container. Although not illustrated, other types of temper evidence structures can be employed. A surface 316 of the body 310 can have a surface treatment, such as grooves, ridges, texture treatment, and/or the like to facilitate frictional interaction with the closure 302.

Figure 19:
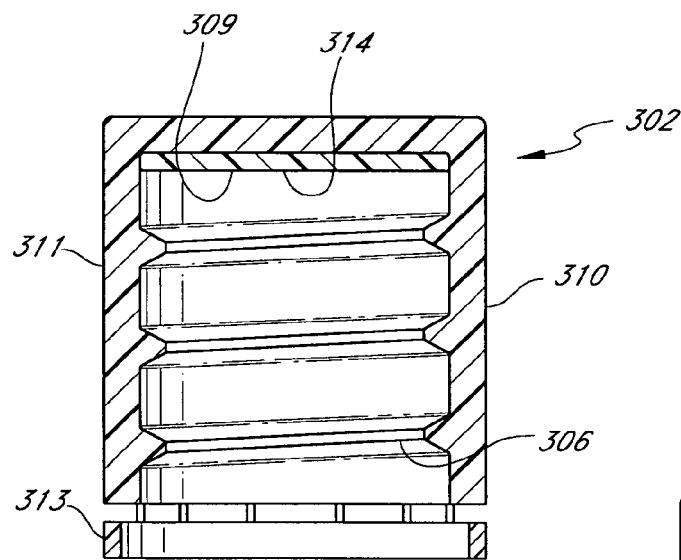
FIG. 19 is a cross-section of a multilayer closure having an inner layer.

With respect to FIG. 19, the closure 302 comprises the body 310 and may or may not have a liner. The illustrated closure 302 comprises an optional inner closure layer 314. The illustrated closure inner layer 314 is in the form of a liner contained within an outer portion 311 of the body 310. The liner 314 can be adapted to be in contact with foodstuff or liquid and may form a seal with the lip that forms the opening of the bottle. Thus, the liner 314 forms a substantial portion, or the entire portion, of a contact area of the closure 304.

The liner 314 can be a barrier liner, such as an active or passive barrier liner. The liner 314 can function as a fluid barrier (e.g., a liquid or gas), flavor barrier, and combinations thereof. For example, the liner 314 can be a gas barrier that inhibits or prevents the passage of oxygen, carbon dioxide, and the like therethrough. In some embodiments, the liner 314 can have scalping capabilities, such as gas scalping (e.g., oxygen scalping).

The liner 314 can be pressed against a lip of a bottle to prevent liquid from escaping from the container that is sealed by the closure 302. In one embodiment, the liner 314 is a gas barrier that prevents or inhibits gas from escaping from the container. In another embodiment, the liner 314 is a flavor barrier that can prevent or limit the change of the taste of the fluid within the container. For example, the liner 314 can be formed of a polymer (e.g., a thermoplastic material) that can act as a flavor barrier to ensure that foodstuff in the container maintains a desirable flavor. Thus, the liner 314 can help to ensure that the body 310 does not impart flavor and/or odor to foodstuff in the container.

Many times, a somewhat flavor imparting material and/or flavor reducing or scalping material (e.g., polyolefins such as polypropylene or polyethylene) is used to form a container or closure, such as a cap of a bottle, due to its physical properties (e.g., durability, toughness, impact resistance, and/or strength). In certain embodiments polypropylene may exhibit one or more physical properties which are preferred to the physical properties of polymers such as PET. Unfortunately, in certain circumstances polypropylene has a tendency to reduce or scalp the flavor of the contents of the bottle or to remove desired flavors or aromatic components from the contents. Thus, a person consuming the food previously in contact with the PP may be able to recognize a change in flavor. Advantageously, the liner 314 can comprise a flavor preserving material so that the food stuff in the container is not generally affected when the foodstuff contacts the liner 314. Preferably, the flavor preserving material is a material approved by the FDA for contacting foodstuff.

In some non-limiting embodiments, the flavor preserving material comprises PET (such as virgin PET), phenoxy type-thermoplastic, and/or the like. The body 310 can be made of a flavor scalping material, such as polypropylene, to provide desired physical properties and the liner 314 comprises PET for an effective flavor barrier to ensure that the contents of container maintain a desirable taste. It is contemplated that the liner 314 can be formed of any material suitable for contacting the food stuff in the container. In some embodiments, the liners 314 can be formed of foam material described herein that may or may not substantially alter the taste of the contents of the container. Additionally, the thickness of the liner 314 can be increased to inhibit gas or other fluids from passing through the liner. Optionally, the liner 314 can be a monolayer or multilayer structure. For example, the liner 314 can comprise an inner layer of PET (i.e., the layer in contact with the container contents) and an outer layer of foam material.

The liner 314 can have a layer suitable for contacting foodstuffs and one or more layers acting as a barrier, similar to the preforms described herein. In some embodiments, for example, the liner 314 can comprise a first layer and a second layer wherein the first layer comprises a foam material and the second layer comprises a barrier material. Thus, a second layer can reduce or inhibit the migration of fluid through the liner 314 and the first layer insulates the closure 302. In some embodiments, the liner 314 comprises a layer of PET and a layer comprising a second material. The PET layer preferably is the lowermost layer so that it forms a seal with the lip of a container. The second material can be EVA or other suitable material for forming a portion of a liner.

In some embodiments, the liner 314 of FIG. 19 can be pre-formed and inserted into the body 310. For example, the body 310 can be shaped like a typical screw cap used to seal a bottle. The liner 314 is formed by cutting out a portion of the sheet, which is described below. The pre-cut liner 314 can then be inserted into the body 310 and positioned as shown in FIG. 19. Alternatively, the liner 314 can be formed within the body 310. For example, the liner 314 can be formed through a molding process, such as over-molding. At least a portion of the liner 314 can be formed by a spray coating process. For example, a monolayer liner can be sprayed and coated with a polymer (e.g., PET, phenoxy type thermoplastic, or other materials described herein) resulting in a multilayer liner.

A further advantage is optionally provided where the liner 314 can be retained in the body 310 or can be attached to the container. The liner 314 can be attached to the body 310 such that the liner 314 remains coupled to the body 310 after the body has been separated from the container. Alternatively, the liner 314 can be coupled to the container so that the body 310 and liner are separable. For example, the liner 314 can be transferred to the body 310 to the opening of a container by a welding process, such as an induction welding process.

A further advantage is optionally provided where at least a portion of the closure 302 is formed of material to provide a comfortable gripping surface so that a user can comfortably grip the closure 302. The body 310 may comprise a material for sufficient rigidity, (e.g., PP), compressibility for a comfortable grip (e.g., foam material), and/or the like. In some embodiments, the outer portion 311 of the body 310 can comprise foam to increase the space occupied by the outer portion 311 and can provide the user with greater leverage for easy opening and closing of the closure 302. For example, the closure 302 can have an internally threaded surface that is configured to threadably mate with an externally threaded surface of the container. The enlarged outer portion 311 can provide increased leverage such that the user can easily rotate the closure 302 onto and off of a container. Advantageously, a similar, or same, amount of material that forms a conventional cap can be used to form the enlarged diameter closure.

In some embodiments, at least a portion of one of the portions 311 and liner 314 can be formed of foam material to achieve a very lightweight closure due to the low density of the foam material. The reduced weight of the closure 302 can desirably reduce the transportation cost of the closure 302. Additionally, a foam material of the closure 302 can reduce the amount of material that is used to form the closure, since the foam material may have a substantial number of voids.

The closures described below can be similar to or different than the closure illustrated in FIG. 19. With respect to FIG. 20, the closure 330 has a body 331 that comprises an inner portion 332 and an outer portion 334. The illustrated wall 335 comprises the portions 332, 334. The inner portion 332 may define at least a portion of the interior of the closure 330 and can optionally define one or more of the threads 336. The inner portion 332 can be formed by an injection molding process, spray coating process, or other process described herein for forming a portion of an article. In some non-limiting embodiments, the inner portion 332 comprises polyolefin (e.g., PET), phenoxy type thermoplastics, and/or other materials described herein. FIGS. 21A to 21E illustrate non-limiting embodiments of closures. FIG. 21A illustrates a closure 340 that has an outer portion 342 and an inner portion 344 that forms at least a portion of the interior of the closure 340. That is, the outer portion 342 and the inner portion 344 each can define a portion (e.g., the threads) of the interior surface of the closure 340. The inner portion 344 is set into the outer portion 342; however, in other embodiments the inner portion 344 is not set into the outer 342. FIG. 21B illustrates a closure 350 that comprises an inner portion 354 comprising a plurality of layers 356, 358. FIG. 21C illustrates a closure 360 comprising a plurality of layers. An outer layer 362 forms the outer surface (including the top and wall) of the closure 360. An intermediate layer 364 can comprise one or more layers. An inner layer 366 defines a threaded contact surface 368.

Figure 21A:
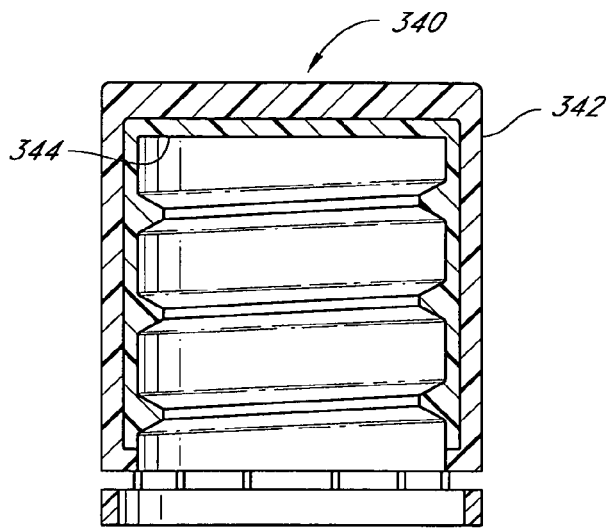
FIGS. 21A-21E are cross-sections of multilayer closures.
Figure 21B:
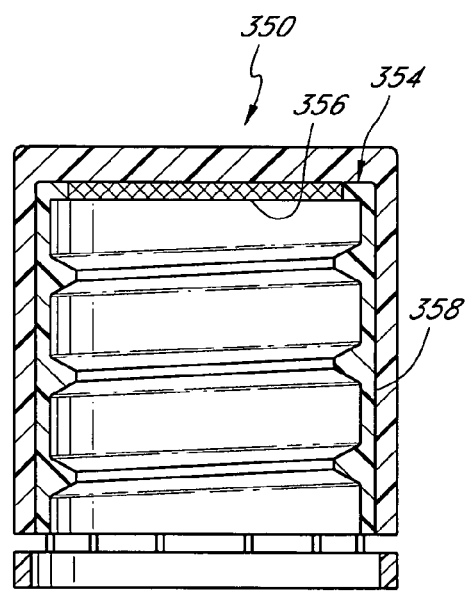
Figure 21C:
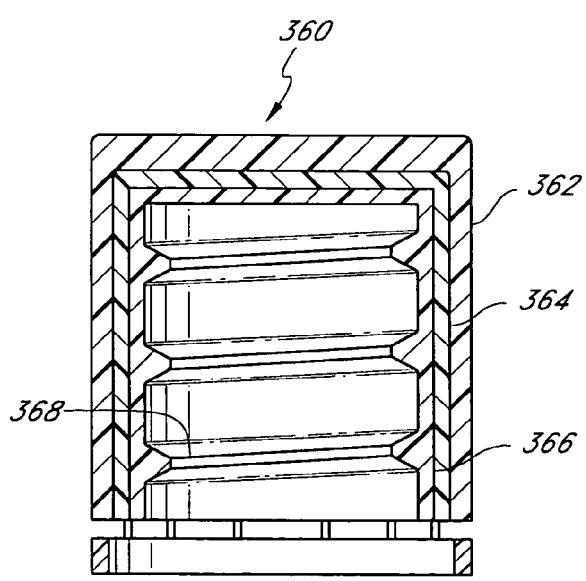
Figure 21D:
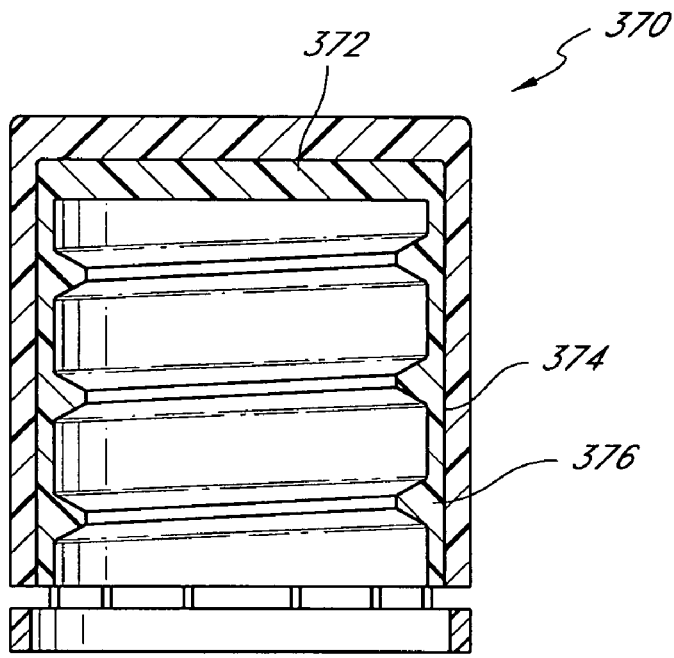

The closures can have portions or layers of varying thicknesses. As shown in FIG. 21D, at least one of the portions or layers of a closure 370 comprises a thickened portion. The illustrated closure 370 has an inner portion 374 with an upper thickened portion 372 that has a thickness greater than the thickness of the wall portion 376.

Figure 20:
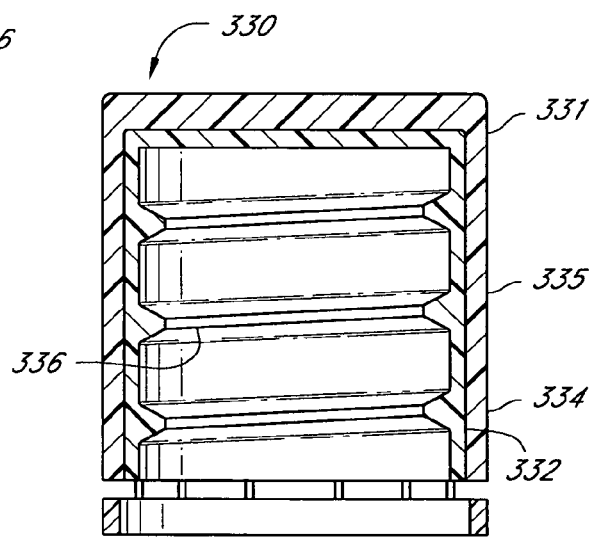
FIG. 20 is a cross-section of a multilayer closure having an inner layer extending along the sides of the closure.
Figure 21E:
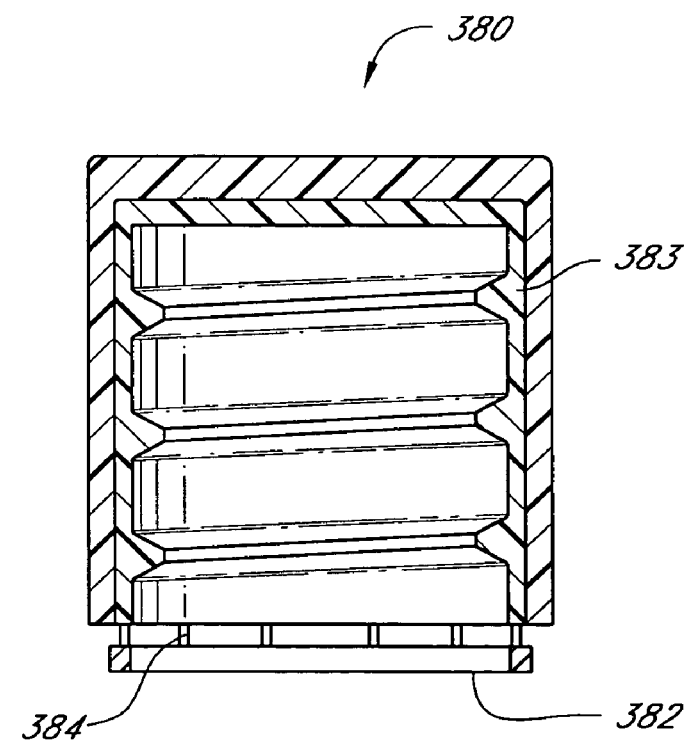

FIG. 21E illustrates a multilayer closure 380 that comprises a band 382 connected to an inner portion 383 of the closure 380 by one or more connectors 384. The closures illustrated in FIGS. 18 to 21E may have any suitable structure(s) or design for coupling to containers. For example, the closures of FIGS. 18 to 21E may have a similar configuration as the closure 213 (FIG. 14A). It is contemplated that the closures of FIGS. 18-21E described herein can be attached to containers by threadable engagement, welding or fusing process (e.g., induction welding), an adhesive, by frictional interaction, or the like. The closures of FIGS. 18-21E are illustrated with bands. However, the closures may not have bands, or they may have other anti-tamper indicators or structures. Although the closures of FIGS. 18-21E are illustrated as screw closures, other types of closures (e.g., closures of a multi-piece construction, such as closures with a lid that opens and closes, a closure with a nipple, and or the like) have similar constructions.

The closures can have one or more compartments configured for storage. The compartments can contain additives that can be added to the contents of the associated container. The additives can affect the characteristics of the container's contents and can be in a solid, gas, and/or liquid state. In some embodiments, the additives can affect one or more of the following: aroma (e.g., additives can comprise scented gases/liquids), flavor, color (e.g., additives can comprise dies, pigments, etc.), nutrient content (e.g., additives can comprise vitamins, protein, carbohydrates, etc.), and combinations thereof. The additives can be delivered from the closure into the contents within the container for subsequent ingestion and preferably enhance the desirability of the contents and the consumption experience. The compartment can release the additives during removal of the closure so that the mixture is fresh. However, the compartment can be opened before or after the closure is removed from the container. In some embodiments, the closure has a compartment that can be broken (e.g., punctured) after the closure has been separated from a container. The compartment can be broken by a puncturing process, tearing, and the like. The compartment can have a structure for releasing its contents. The structure can be a pull plug, snap cap or other suitable structure for releasing the compartment's contents.

The containers can also be closed with a seal that is separate from the closure. The seal can be applied to the container before the closure is attached. A sealing process can be employed to attach the seal to the neck finish of a container after the container has been filled. The seal can be similar to or different than the liners that are attached to the closures. The seals can be hermetic seals (preferably spill proof) that ensure the integrity of the containers' contents. In some embodiments, the seal can comprise foil (preferably comprising metal, such as aluminum foil) and is applied to a container by a welding process, such as induction welding. However, the seal can be attached to a container using other suitable attachment processes, for example an adhesive may be used.

The closures can have an inner surface suitable for engaging closuring mounting structures (e.g., threads, snap cap fittings, and the like). The inner surface can provide a somewhat lubricious surface to facilitate removal of the closure from a container. For example, the closures can have a lubricious or low friction material (e.g. olefin polymers) to engage the material forming the container. If a closure is formed of PET, for example, the closure may stick or lock with a PET container. Thus, the closure (including snap caps, twist caps, and the like) may require a relatively high removal torque. Advantageously, a closure with a lubricious or low friction material can reduce the removal torque in order to facilitate removal of the closure. The lubricious or low friction material preferably provides enough friction such that closure can remain coupled to an associated container while also permitting convenient closure removal. Thus, the lubricious or low friction material can be selected to achieve the desired removal torque.

With reference to FIG. 20, the closure 330 can include an inner portion 332 comprising a lubricious or low friction material (e.g., an olefin or other material having a low coefficient of friction) and an outer portion 334 comprising a polymer, such as an olefin polymer, foam material, PET, and other materials described herein. The closures described herein can comprise lubricious or low friction material that can interface with a container and achieve a desired removal torque. The lubricious or low friction material forming the closure can be selected based on the material forming the container in order to produce the desired frictional interaction. It is contemplated that the molds described herein can be modified with an edge gate to form the inner most layer of the closure for engaging a container.

3. Detailed Description of Mono and Multilayer Profiles and Sheets

Figure 22A:
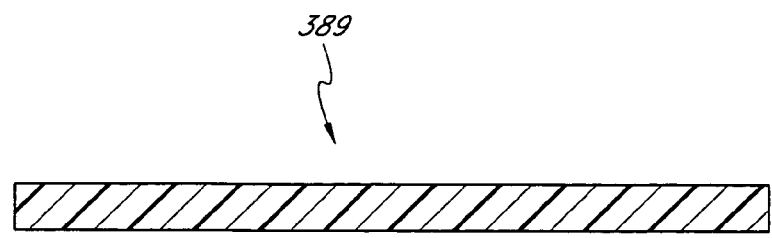
FIGS. 22A-22B are cross-sections of sheets.
Figure 22B:
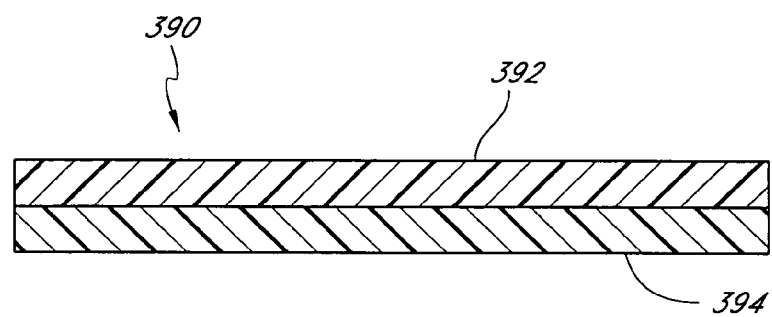

FIGS. 22A and 22B are cross-sectional views of sheets. The sheets can have a somewhat uniform thickness or varying thickness. The sheet of FIG. 22A is a monolayer sheet 389. The sheet of FIG. 22B is a multilayer sheet 390 comprising two layers. The sheets can have any number of layers of any desired thickness based, for example, on the use of the sheets. For example, the sheets 389, 390 can be used to form packaging, such as a label. At least a portion of the sheets 389, 390 may comprise foam material. For example, the sheets 389, 390 may comprise foam material to provide insulation to the packaging to which the label is attached. Optionally, the sheet 390 can comprise one or more tie layers. For example, the sheet 390 may comprise a tie layer between the layers 392, 394.

The sheets can be used in various applications and may be formed into various shapes. For example, the sheets can be cut, molded (e.g., by thermoforming or casting), and/or the like into a desired shape. A skilled artisan can select the desired shape, size, and/or configuration of the sheets based on a desired application.

Figure 23:
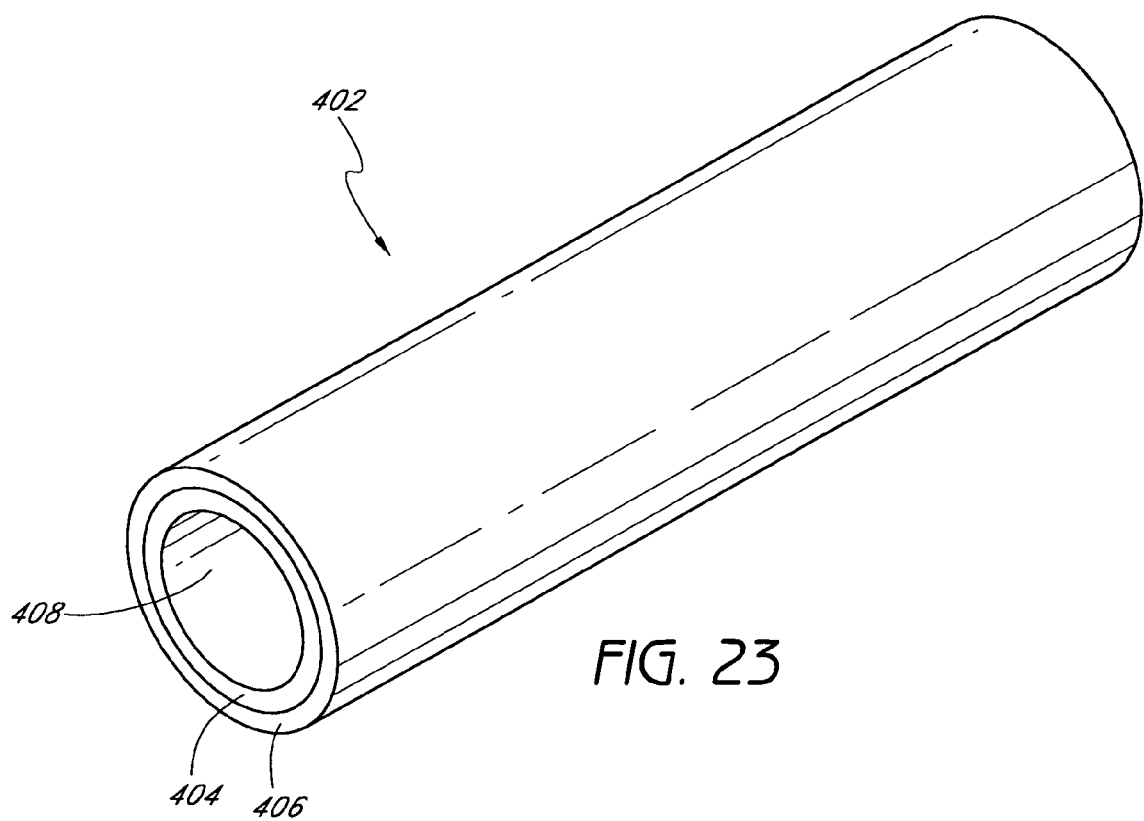
FIG. 23 is a perspective view of one preferred embodiment of a profile.

FIG. 23 illustrates a multilayer profile 402. The profile 402 is in the form of a conduit having a substantially tubular shape. The shape of the profile 402 can be generally circular, elliptical, polygonal (including rounded polygonal), combinations thereof, and the like. The illustrated profile 402 has a generally circular cross sectional profile.

In some embodiments, the profile 402 can be a conduit adapted for delivering fluids, preferably adapted for drinking liquids. The profile 402 can have an inner layer 404 and an outer layer 406. In some embodiments, at least one of the layers 404, 406 can comprise a plurality of layers (e.g., lamellar material).

The profile 402 can be a conduit that comprises a material suitable for contacting foodstuff and one or more additional materials having desirable physical properties (e.g., structural and thermal properties). Advantageously, the inner layer 404 that is in direct contact with the fluid preferably does not substantially change the flavor of the foodstuff in which it contacts. For example, many times fluid transfer lines of beverage dispensing systems have flavor scalping polyolefins. Advantageously, the inner layer 404 preferably does not substantially change the flavor of the fluid passing through a lumen 408 of the profile 402. In some embodiments, the outer layer 406 can provide improved physical characteristics of the profile 402. In another embodiment, the outer layer 406 can provide increased insulation and/or structural properties of the profile 402. For example, in one embodiment the outer layer 406 can provide increased impact resistance. In some embodiments, the outer layer 406 can reduce heat transfer through the walls of the profile 402. In some embodiments, the outer layer 406 can have a high tensile strength so that highly pressurized fluid can be passed through the profile 402. Thus, the inner layer serves as a substantially inert food contact surface while the outer layer(s) serve as an insulator and/or withstand external influences.

Of course, the profile 402 can be employed in various other applications. For example, the profile 402 can be used in hospitals (e.g., as a delivery line for medicinal fluids, manufacturing processes, equipment, fluid systems (e.g., ingestible fluid dispensing systems), and/or the like.

4. Detailed Description of Packaging

Figure 24:
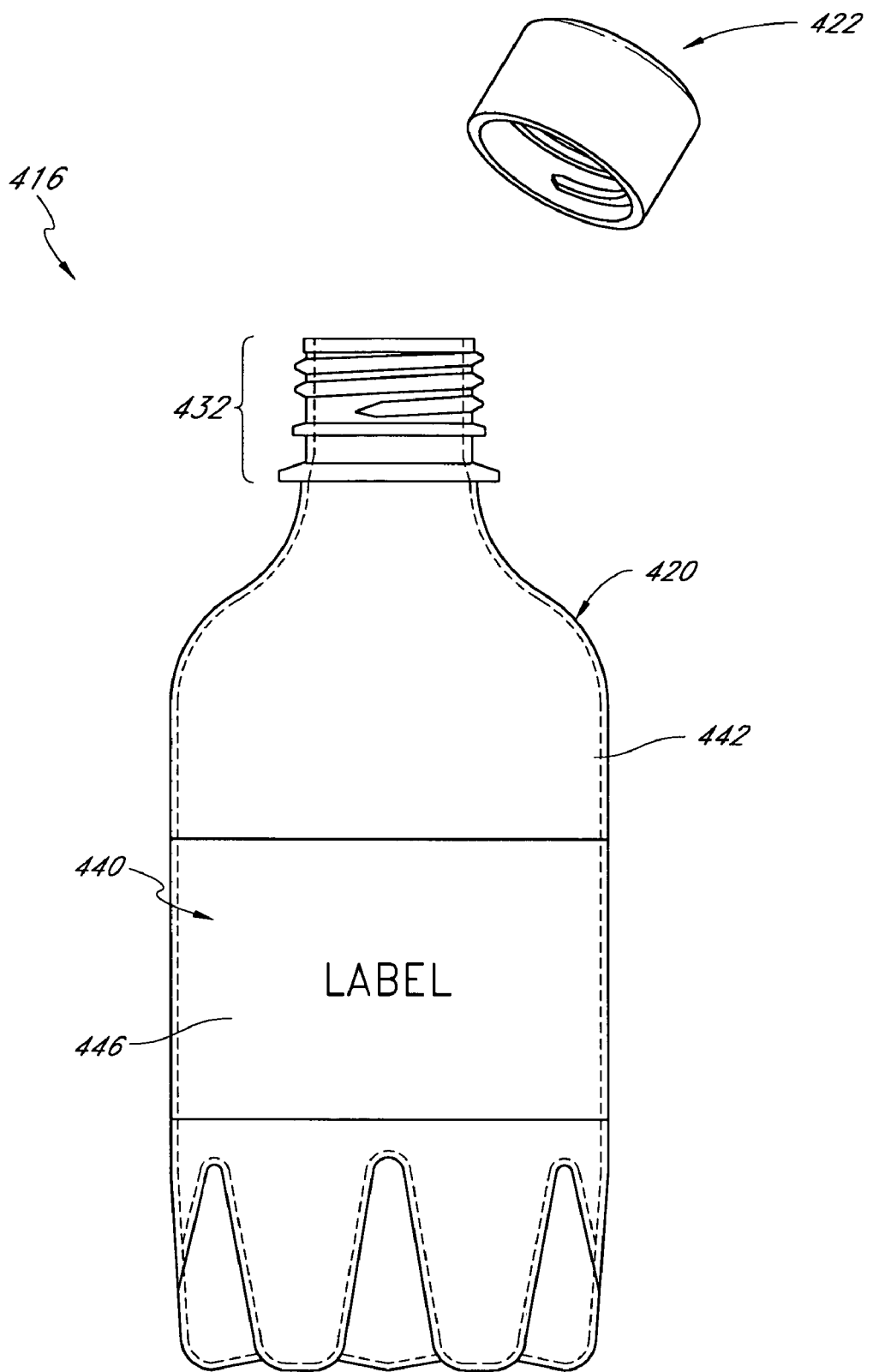
FIG. 24 is a side view of one preferred embodiment of packaging including a container having a label and a closure.

One or more of the articles described herein can be employed alone or in combination in various applications, such as packaging. FIG. 24 illustrates a packaging system 416 comprising a container 420 that can be made from the preforms described herein. A closure 422 can be attached to a neck finish 432 of the container 420 to close the container.

FIG. 24 also illustrates a label 440 attached to the container 420 in the form of a bottle. The label 440 can engage the bottle 420 and can be a monolayer or multilayer. The label 440 can optionally comprise foam material.

The label 440 is preferably coupled to the outer surface 442 of the container 420. The label 440 can be removably attached the outer surface 442. The label 440 can be attached during and/or after the formation of the container 420. In the illustrated embodiment, the label 440 is a generally tubular sleeve that surrounds at least a portion of the bottle 420. The label 440 can have any shape or configuration suitable for being attached to the bottle and displaying information. Although not illustrated, the label 440 can be attached to glass bottles, metal cans, or the like. Further, the label 440 can be attached to other structures or packages. For example, the label 440 can be attached to a box, carton, bottle (plastic bottle, glass bottle, and the like), can, and other items discussed herein. Additionally, the label 440 can be printed upon. Optionally, an outer surface 446 of the label 440 can be treated to achieve a suitable printing surface.

An adhesive can be used to attach the label 440 to an article. In one embodiment, after the label is attached to the article, foam material of the label 440 may be expanded to achieve a thermal barrier, a fluid barrier, a protective layer, and/or desired structural properties. The foam material is preferably expanded by heating the label 440. The material of the label 440 can be foamed before and/or after the label 440 is placed on the container 420. Of course, the foam material of the label 440 can be directly adhered to an article without the use of adhesives.

Figure 25:
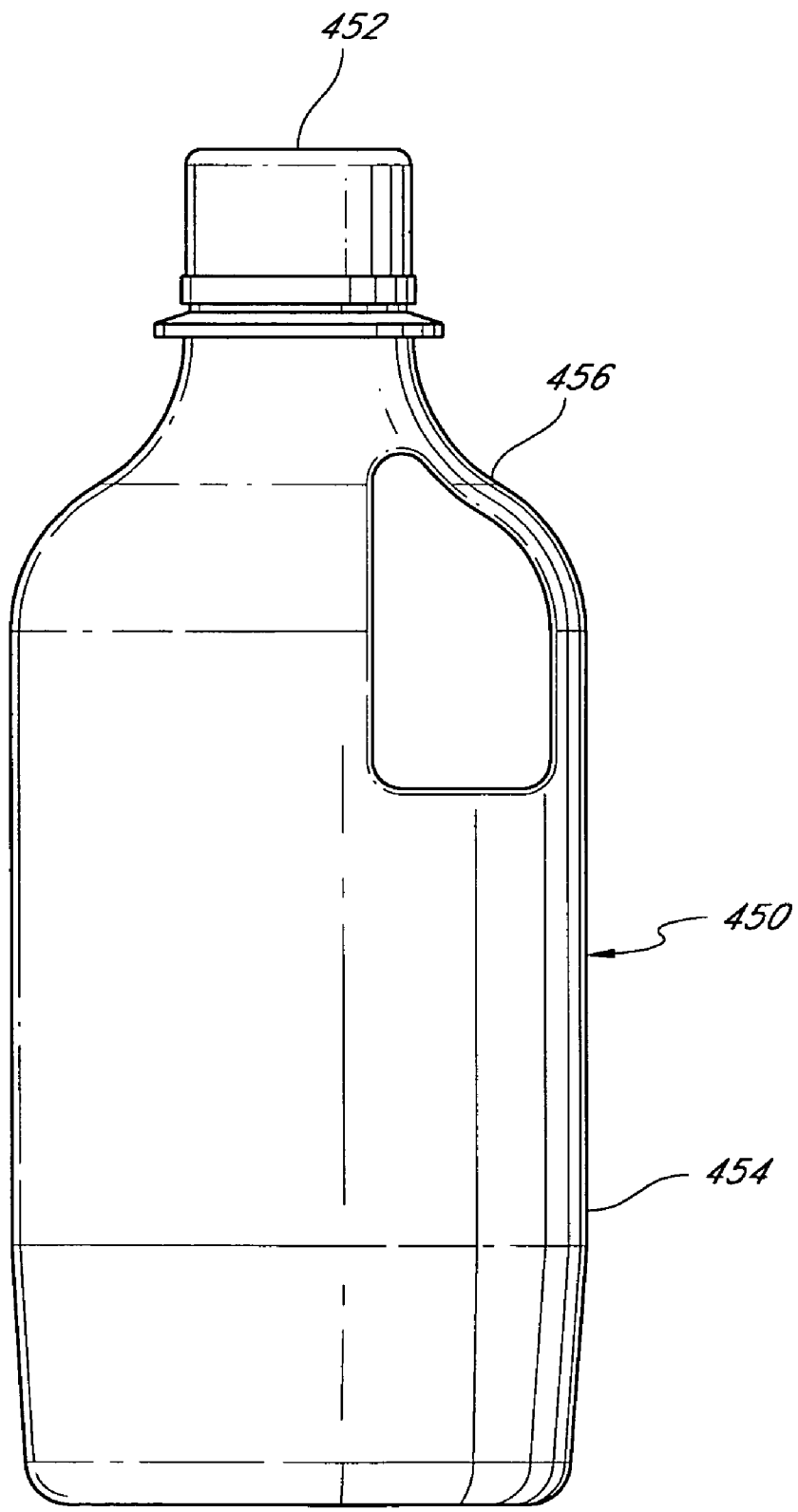
FIG. 25 is side view of a container and a closure in accordance with another embodiment.

FIG. 25 illustrates another embodiment of a container comprising a formable material. The container 450 can be similar or different than the containers described above. In the illustrated embodiment, the container 450 comprises a closure 452, a body 454, and a handle 456 attached to the body 454. The body 454 can be substantially rigid or flexible. The handle 456 is preferably configured and sized to be comfortably gripped by a user. The wall of the body 454 can be a mono-layer or multi-layer wall. The container 450 can have any shape, including a shape similar to typical containers used for holding ingestible liquids. The container 450 can be formed by an extrusion blow-molding process.

Figure 26A:
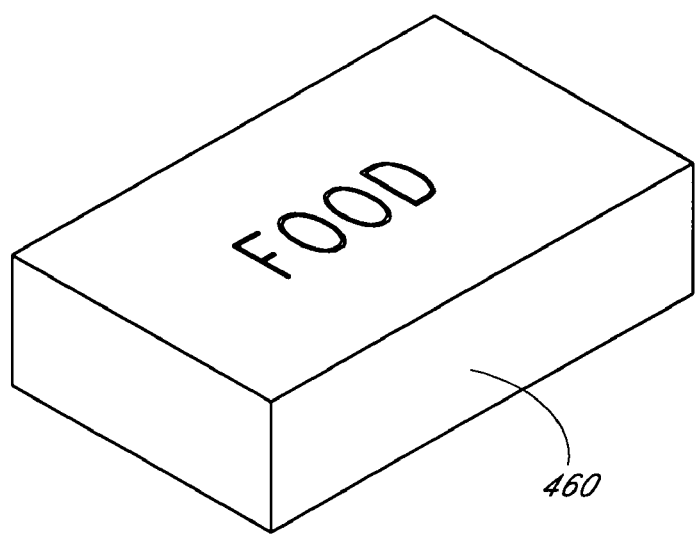
FIG. 26A is perspective view of a container.

With respect to FIG. 26A, container 460 is packaging (e.g., food packaging) that preferably comprises foam material. In one embodiment, a sheet (e.g., the sheets 389 or 390) is used to form at least a portion of the container 460 by, e.g., a thermoforming process. The container 460 can be in the form of a flexible pouch, food container, or any other suitable structure.

For example, in one arrangement the sheets are formed into clamshell packages that are adapted to hold food, such as hamburgers. In another arrangement, the sheets are configured to form boxes (e.g., pizza boxes). In another embodiment, the material and the dimensions of the container 460 can be determined based on the desired structural properties, thermal properties, and/or other characteristics. For example, the container 460 may comprise foam material for effective thermal insulation of the container 460. In another example, the container 460 can have thick walls so that the container 460 is generally rigid.

Figure 26B:
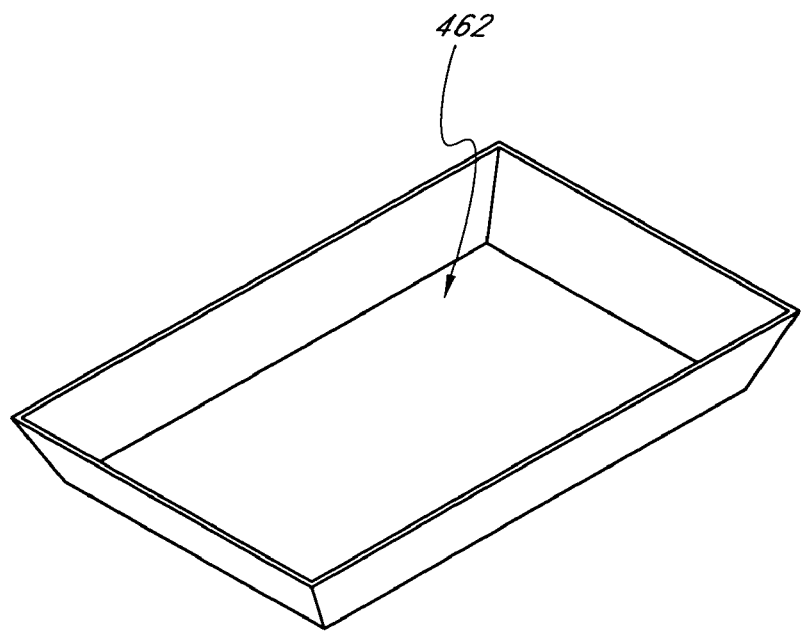
FIG. 26B is a perspective view of a tray.

FIG. 26B illustrates another article comprising formable material. In one embodiment, the article 462 is in the form of a tray that is configured to receive foodstuff. The tray 462 can be formed from a sheet through thermoforming. Optionally, the tray 462 can be adapted to fit within a container or box.

The tray 462 (or other articles described herein) can be configured for thermal processing. In some embodiments, the tray 462 can be used for heating and reheating. The tray 462 can hold foodstuffs so that the foodstuffs can be heated by, for example, a heat lamp, microwave oven, oven, toaster, heated water, and the like. The microstructure of the tray 462 can be adapted based on the type and method of thermal processing. For example, the tray 462 may comprise crystalline material (e.g., crystalline PET) to enhance thermal stability. During the thermoforming process one or more layers of the tray can be heated above a predetermined temperature to cause crystallization of at least a portion of one of the layers. Thus, at least a portion of the tray 462 can be crystallized during the manufacturing process. In some embodiments, the tray 462 can comprise a mono or multilayer sheet. The tray 462 can have a first layer of thermoplastic material and a second layer (e.g., a foam layer). The first layer can comprise crystalline material (e.g., amorphous, partially crystallized, or fully crystallized). The tray 462 can be used to hold food for use in a microwave oven. Of course, other articles, such as containers like pizza boxes, can have a similar configuration.

Articles can also be in the form of a can. The can may comprise polymer materials as disclosed herein. The can may comprise a metal layer and one or more layers of another material. In some embodiments, a metal can (e.g., aluminum can) can be coated with foam material such as a thermoplastic material. At least a portion of the exterior and/or the interior of the can may be coated with foam material.

B. Crystalline Neck Finishes

Plastic bottles and containers, in some embodiments, preferably comprise one or more materials in the neck, neck finish and/or neck cylinder that are at least partially in the crystalline state. Such bottles and preforms can also comprise one or more layers of materials.

In some embodiments, bottles are made by a process which includes the blow-molding of plastic preforms. In some circumstances, it is preferred that the material in the plastic preforms is in an amorphous or semi-crystalline state because materials in this state can be readily blow-molded where fully crystalline materials generally cannot. However, bottles made entirely of amorphous or semi-crystalline material may not have enough dimensional stability during a standard hot-fill process. In these circumstances, a bottle comprising crystalline material would be preferred, as it would hold its shape during hot-fill processes.

In some embodiments, a plastic bottle has the advantages of both a crystalline bottle and an amorphous or semi-crystalline bottle. By making at least part of the uppermost portion of the preform crystalline while keeping the body of the preform amorphous or semi-crystalline (sometimes referred to herein as "non-crystalline"), one can make a preform that will blow-mold easily yet retain necessary dimensions in the crucial neck area during a hot-fill process. Some embodiments have both crystalline and amorphous or semi-crystalline regions. This results in a preform which has sufficient strength to be used in widespread commercial applications.

One or more embodiments described herein generally produce preforms with a crystalline neck, which are typically then blow-molded into beverage containers. The preforms may be monolayer; that is, comprised of a single layer of a base material, or they may be multilayer. The material in such layers may be a single material or it may be a blend of one or more materials. In one embodiment, an article is provided which comprises a neck portion and a body portion. The neck portion and the body portion are a monolithic first layer of material. The body portion is primarily amorphous or semi-crystalline, and the neck portion is primarily crystalline.

Referring to FIG. 1, the preferred preform 30 is depicted. The preform 30 may be made by injection molding as is known in the art or by methods disclosed herein. The preform 30 has the neck portion 32 and a body portion 34, formed monolithically (i.e., as a single, or unitary, structure). Advantageously, in some embodiments, the monolithic arrangement of the preform, when blow-molded into a bottle, provides greater dimensional stability and improved physical properties in comparison to a preform constructed of separate neck and body portions, which are bonded together.

By achieving a crystallized state in the neck portion of the preform during the molding step, the final dimensions are substantially identical to the initial dimensions, unlike when additional heating steps are used. Therefore, dimensional variations are minimized and dimensional stability is achieved. This results in more consistent performance with regard to closures, such as the threads on the neck finish and reduces the scrap rate of the molding process.

While a non-crystalline preform is preferred for blow-molding, a bottle having greater crystalline character is preferred for its dimensional stability during a hot-fill process. Accordingly, a preform constructed according to some embodiments has a generally non-crystalline body portion and a generally crystalline neck portion. To create generally crystalline and generally non-crystalline portions in the same preform, one needs to achieve different levels of heating and/or cooling in the mold in the regions from which crystalline portions will be formed as compared to those in which generally non-crystalline portions will be formed. The different levels of heating and/or cooling may be maintained by thermal isolation of the regions having different temperatures. This thermal isolation between the thread split, core and/or cavity interface can be accomplished utilizing a combination of low and high thermal conduct materials as inserts or separate components at the mating surfaces of these portions.

Some preferred processes accomplish the making of a preform within the preferred cycle times for uncoated preforms of similar size by standard methods currently used in preform production. Further, the preferred processes are enabled by tooling design and process techniques to allow for the simultaneous production of crystalline and amorphous regions in particular locations on the same preform.

In one embodiment, there is provided a mold for making a preform comprising a neck portion having a first mold temperature control system (e.g., cooling/heating channels), a body portion having a second temperature control system, and a core having a third temperature control system, wherein the first temperature control system is independent of the second and third temperature control systems and the neck portion is thermally isolated from the body portion and core.

The cooling of the mold in regions which form preform surfaces for which it is preferred that the material be generally amorphous or semi-crystalline, can be accomplished by chilled fluid circulating through the mold cavity and core. In some embodiments, a mold set-up similar to conventional injection molding applications is used, except that there is an independent fluid circuit or electric heating system for the portions of the mold from which crystalline portions of the preform will be formed. Thermal isolation of the body mold, neck finish mold and core section can be achieved by use of inserts having low thermal conductivity. The neck, neck finish, and/or neck cylinder portions of the mold preferably are maintained at a higher temperature to achieve slower cooling, which promotes crystallinity of the material during cooling.

The above embodiments as well as further embodiments and techniques regarding preforms that have both crystalline and amorphous or semi-crystalline regions are described in U.S. Pat. No. 6,217,818 to Collette et al; U.S. Pat. No. 6,428,737 to Collette et al.; U.S. Patent Publication No. 2003/0031814A1 to Hutchinson et al.; and PCT Publication No. WO 98/46410 to Koch et al.

C. Detailed Description of Some Preferred Materials

1. General Description of Preferred Materials

Furthermore, the articles described herein may be described specifically in relation to a particular material, such as polyethylene terephthalate (PET) or polypropylene (PP), but preferred methods are applicable to many other thermoplastics, including those of the of the polyester and polyolefin types. Other suitable materials include, but are not limited to, foam materials, various polymers and thermosets, thermoplastic materials such as polyesters, polyolefins, including polypropylene and polyethylene, polycarbonate, polyamides, including nylons (e.g. Nylon 6, Nylon 66, MXD6), polystyrenes, epoxies, acrylics, copolymers, blends, grafted polymers, and/or modified polymers (monomers or portion thereof having another group as a side group, e.g. olefin-modified polyesters). These materials may be used alone or in conjunction with each other. More specific material examples include, but are not limited to, ethylene vinyl alcohol copolymer ("EVOH"), ethylene vinyl acetate ("EVA"), ethylene acrylic acid ("EAA"), linear low density polyethylene ("LLDPE"), polyethylene 2,6- and 1,5-naphthalate (PEN), polyethylene terephthalate glycol (PETG), poly(cyclohexylene-dimethylene terephthalate), polystryrene, cycloolefin, copolymer, poly-4-methylpentene-1, poly(methyl methacrylate), acrylonitrile, polyvinyl chloride, polyvinylidine chloride, styrene acrylonitrile, acrylonitrile-butadiene-styrene, polyacetal, polybutylene terephthalate, ionomer, polysulfone, polytetra-fluoroethylene, polytetramethylene 1,2-dioxybenzoate and copolymers of ethylene terephthalate and ethylene isophthalate.

As used herein, the term "polyethylene terephthalate glycol" (PETG) refers to a copolymer of PET wherein an additional comonomer, cyclohexane di-methanol (CHDM), is added in significant amounts (e.g. approximately 40% or more by weight) to the PET mixture. In one embodiment, preferred PETG material is essentially amorphous. Suitable PETG materials may be purchased from various sources. One suitable source is Voridian, a division of Eastman Chemical Company. Other PET copolymers include CHDM at lower levels such that the resulting material remains crystallizable or semi-crystalline. One example of PET copolymer containing low levels of CHDM is Voridian 9921 resin.

In some embodiments polymers that have been grafted or modified may be used. In one embodiment polypropylene or other polymers may be grafted or modified with polar groups including, but not limited to, maleic anhydride, glycidyl methacrylate, acryl methacrylate and/or similar compounds to improve adhesion. In other embodiments polypropylene also refers to clarified polypropylene. As used herein, the term "clarified polypropylene" is a broad term and is used in accordance with its ordinary meaning and may include, without limitation, a polypropylene that includes nucleation inhibitors and/or clarifying additives. Clarified polypropylene is a generally transparent material as compared to the homopolymer or block copolymer of polypropylene. The inclusion of nucleation inhibitors helps prevent and/or reduce crystallinity, which contributes to the haziness of polypropylene, within the polypropylene. Clarified polypropylene may be purchased from various sources such as Dow Chemical Co. Alternatively, nucleation inhibitors may be added to polypropylene. One suitable source of nucleation inhibitor additives is Schulman.

Optionally, the materials may comprise microstructures such as microlayers, microspheres, and combinations thereof. In certain embodiments preferred materials may be virgin, pre-consumer, post-consumer, regrind, recycled, and/or combinations thereof.

As used herein, "PET" includes, but is not limited to, modified PET as well as PET blended with other materials. One example of a modified PET is "high IPA PET" or IPA-modified PET, which refer to PET in which the IPA content is preferably more than about 2% by weight, including about 2-10% IPA by weight, also including about 5-10% IPA by weight. PET can be virgin, pre or post-consumer, recycled, or regrind PET, PET copolymers and combinations thereof.

In embodiments of preferred methods and processes one or more layers may comprise barrier layers, UV protection layers, oxygen scavenging layers, oxygen barrier layers, carbon dioxide scavenging layers, carbon dioxide barrier layers, and other layers as needed for the particular application. As used herein, the terms "barrier material," "barrier resin," and the like are broad terms and are used in their ordinary sense and refer, without limitation, to materials which, when used in preferred methods and processes, have a lower permeability to oxygen and carbon dioxide than the one or more of the layers. As used herein, the terms "UV protection" and the like are broad terms and are used in their ordinary sense and refer, without limitation, to materials which have a higher UV absorption rate than one or more layers of the article. As used herein, the terms "oxygen scavenging" and the like are broad terms and are used in their ordinary sense and refer, without limitation, to materials which have a higher oxygen absorption rate than one or more layers of the article. As used herein, the terms "oxygen barrier" and the like are broad terms and are used in their ordinary sense and refer, without limitation, to materials which are passive or active in nature and slow the transmission of oxygen into and/or out of an article. As used herein, the terms "carbon dioxide scavenging" and the like are broad terms and are used in their ordinary sense and refer, without limitation, to materials which have a higher carbon dioxide absorption rate than one or more layers of the article. As used herein, the terms "carbon dioxide barrier" and the like are broad terms and are used in their ordinary sense and refer, without limitation, to materials which are passive or active in nature and slow the transmission of carbon dioxide into and/or out of an article. Without wishing to be bound to any theory, applicants believe that in applications wherein a carbonated product, e.g. a soft-drink beverage, contained in an article is over-carbonated, the inclusion of a carbon dioxide scavenger in one or more layers of the article allows the excess carbonation to saturate the layer which contains the carbon dioxide scavenger. Therefore, as carbon dioxide escapes to the atmosphere from the article it first leaves the article layer rather than the product contained therein. As used herein, the terms "crosslink," "crosslinked," and the like are broad terms and are used in their ordinary sense and refer, without limitation, to materials and coatings which vary in degree from a very small degree of crosslinking up to and including fully cross linked materials such as a thermoset epoxy. The degree of crosslinking can be adjusted to provide the appropriate degree of chemical or mechanical abuse resistance for the particular circumstances. As used herein, the term "tie material" is a broad term and is used in its ordinary sense and refers, without limitation, to a gas, liquid, or suspension comprising a material that aids in binding two materials together physically and/or chemically, including but not limited to adhesives, surface modification agents, reactive materials, and the like.

2. Preferred Materials

In a preferred embodiment materials comprise thermoplastic materials. A further preferred embodiment includes "Phenoxy-Type Thermoplastics." Phenoxy-Type Thermoplastics, as that term is used herein, include a wide variety of materials including those discussed in WO 99/20462. In one embodiment, materials comprise thermoplastic epoxy resins (TPEs), a subset of Phenoxy-Type Thermoplastics. A further subset of Phenoxy-Type Thermoplastics, and thermoplastic materials, are preferred hydroxy-phenoxyether polymers, of which polyhydroxyaminoether copolymers (PHAE) is a further preferred material. See for example, U.S. Pat. Nos. 6,455,116; 6,180,715; 6,011,111; 5,834,078; 5,814,373; 5,464,924; and 5,275,853; see also PCT Application Nos. WO 99/48962; WO 99/12995; WO 98/29491; and WO 98/14498. In some embodiments, PHAEs are TPEs.

Preferably, the Phenoxy-Type Thermoplastics used in preferred embodiments comprise one of the following types:

(1) hydroxy-functional poly(amide ethers) having repeating units represented by any one of the Formulae Ia, Ib or Ic:

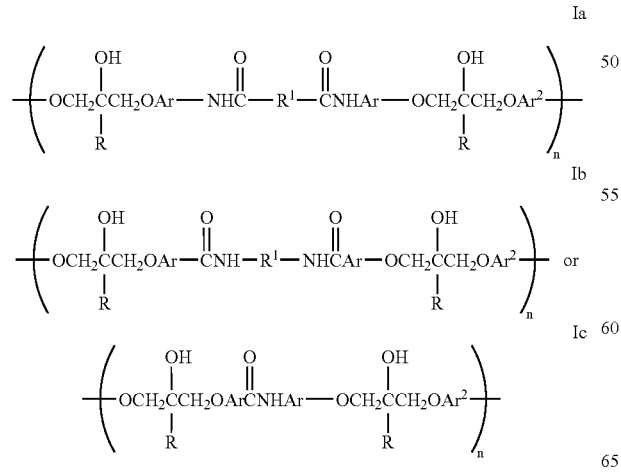

(2) poly(hydroxy amide ethers) having repeating units represented independently by any one of the Formulae IIa, IIb or IIc:

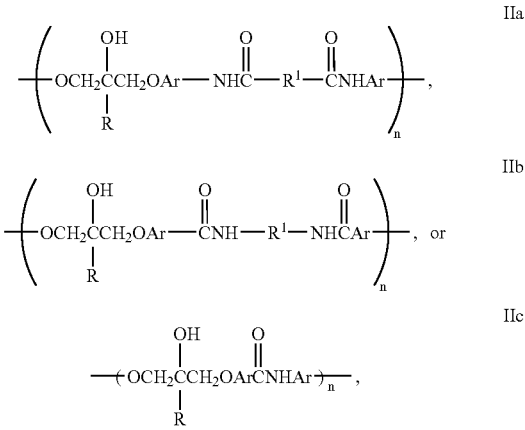

(3) amide- and hydroxymethyl-functionalized polyethers having repeating units represented by Formula III:

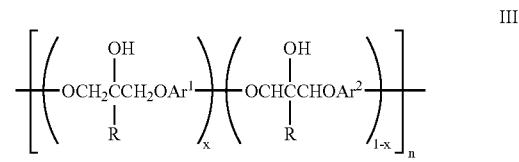

(4) hydroxy-functional polyethers having repeating units represented by Formula IV:

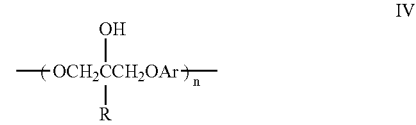

(5) hydroxy-functional poly(ether sulfonamides) having repeating units represented by Formulae Va or Vb:

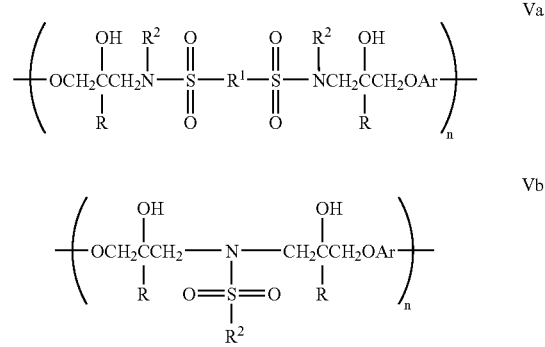

(6) poly(hydroxy ester ethers) having repeating units represented by Formula VI:

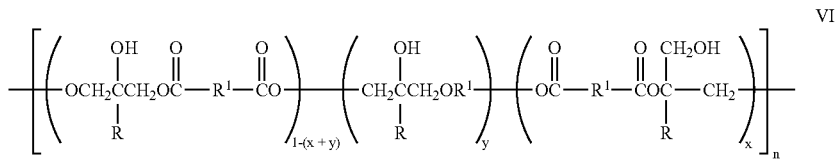

(7) hydroxy-phenoxyether polymers having repeating units represented by Formula VII:

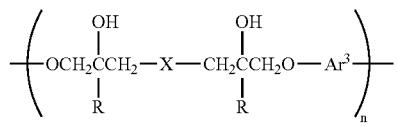

and (8) poly(hydroxyamino ethers) having repeating units represented by Formula VIII:

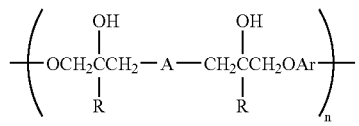

wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar_1$ is a divalent aromatic moiety or combination of divalent aromatic moieties bearing amide or hydroxymethyl groups; each $Ar_2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R_1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R_2$ is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and $Ar_3$ is a "cardo" moiety represented by any one of the Formulae:

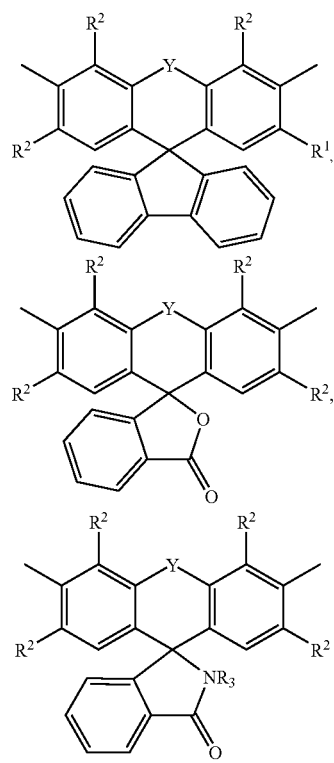

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0; and y is 0 to 0.5.

The term "predominantly hydrocarbylene" means a divalent radical that is predominantly hydrocarbon, but which optionally contains a small quantity of a heteroatomic moiety such as oxygen, sulfur, imino, sulfonyl, sulfoxyl, and the like.

The hydroxy-functional poly(amide ethers) represented by Formula I are preferably prepared by contacting an N,N'-bis(hydroxyphenylamido)alkane or arene with a diglycidyl ether as described in U.S. Pat. Nos. 5,089,588 and 5,143,998.

The poly(hydroxy amide ethers) represented by Formula II are prepared by contacting a bis(hydroxyphenylamido)alkane or arene, or a combination of 2 or more of these compounds, such as N,N'-bis(3-hydroxyphenyl)adipamide or N,N'-bis(3-hydroxyphenyl)glutaramide, with an epihalohydrin as described in U.S. Pat. No. 5,134,218.

The amide- and hydroxymethyl-functionalized polyethers represented by Formula III can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075.

The hydroxy-functional polyethers represented by Formula IV can be prepared, for example, by allowing a diglycidyl ether or combination of diglycidyl ethers to react with a dihydric phenol or a combination of dihydric phenols using the process described in U.S. Pat. No. 5,164,472. Alternatively, the hydroxy-functional polyethers are obtained by allowing a dihydric phenol or combination of dihydric phenols to react with an epihalohydrin by the process described by Reinking, Barnabeo and Hale in the Journal of Applied Polymer Science, Vol. 7, p. 2135 (1963).

The hydroxy-functional poly(ether sulfonamides) represented by Formula V are prepared, for example, by polymerizing an N,N'-dialkyl or N,N'-diaryldisulfonamide with a diglycidyl ether as described in U.S. Pat. No. 5,149,768.

The poly(hydroxy ester ethers) represented by Formula VI are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820.

The hydroxy-phenoxyether polymers represented by Formula VII are prepared, for example, by contacting at least one dinucleophilic monomer with at least one diglycidyl ether of a cardo bisphenol, such as 9,9-bis(4-hydroxyphenyl)fluorene, phenolphthalein, or phenolphthalimidine or a substituted cardo bisphenol, such as a substituted bis(hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. Pat. No. 5,184,373.

The poly(hydroxyamino ethers) ("PHAE" or polyetheramines) represented by Formula VIII are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These compounds are described in U.S. Pat. No. 5,275,853. For example, polyhydroxyaminoether copolymers can be made from resorcinol diglycidyl ether, hydroquinone diglycidyl ether, bisphenol A diglycidyl ether, or mixtures thereof.

The hydroxy-phenoxyether polymers are the condensation reaction products of a dihydric polynuclear phenol, such as bisphenol A, and an epihalohydrin and have the repeating units represented by Formula IV wherein Ar is an isopropylidene diphenylene moiety. The process for preparing these is described in U.S. Pat. No. 3,305,528, incorporated herein by reference in its entirety. One preferred non-limiting hydroxyphenoxyether polymer, PAPHEN 25068-38-6, is commercially available from Phenoxy Associates, Inc. Other preferred phenoxy resins are available from InChem® (Rock Hill, S.C.), these materials include, but are not limited to, the INCHEMREZ™ PKHH and PKHW product lines.

Generally, preferred phenoxy-type materials form stable aqueous based solutions or dispersions. Preferably, the properties of the solutions/dispersions are not adversely affected by contact with water. Preferred materials range from about 10% solids to about 50% solids, including about 15%, 20%, 25%, 30%, 35%, 40% and 45%, and ranges encompassing such percentages. Preferably, the material used dissolves or disperses in polar solvents. These polar solvents include, but are not limited to, water, alcohols, and glycol ethers. See, for example, U.S. Pat. Nos. 6,455,116, 6,180,715, and 5,834,078 which describe some preferred phenoxy-type solutions and/or dispersions.

One preferred phenoxy-type material is a polyhydroxyaminoether copolymer (PHAE), represented by Formula VIII, dispersion or solution. The dispersion or solution, when applied to a container or preform, greatly reduces the permeation rate of a variety of gases through the container walls in a predictable and well known manner. One dispersion or latex made thereof comprises 10-30 percent solids. A PHAE solution/dispersion may be prepared by stirring or otherwise agitating the PHAE in a solution of water with an organic acid, preferably acetic or phosphoric acid, but also including lactic, malic, citric, or glycolic acid and/or mixtures thereof. These PHAE solution/dispersions also include organic acid salts produced by the reaction of the polyhydroxyaminoethers with these acids.

In other preferred embodiments, phenoxy-type thermoplastics are mixed or blended with other materials using methods known to those of skill in the art. In some embodiments a compatibilizer may be added to the blend. When compatibilizers are used, preferably one or more properties of the blends are improved, such properties including, but not limited to, color, haze, and adhesion between a layer comprising a blend and other layers. One preferred blend comprises one or more phenoxy-type thermoplastics and one or more polyolefins. A preferred polyolefin comprises polypropylene. In one embodiment polypropylene or other polyolefins may be grafted or modified with a polar molecule or monomer, including, but not limited to, maleic anhydride, glycidyl methacrylate, acryl methacrylate and/or similar compounds to increase compatibility.

The following PHAE solutions or dispersions are examples of suitable phenoxy-type solutions or dispersions which may be used if one or more layers of resin are applied as a liquid such as by dip, flow, or spray coating, such as described in WO 04/004929 and U.S. Pat. No. 6,676,883. One suitable material is BLOX® experimental barrier resin, for example XU-19061.00 made with phosphoric acid manufactured by Dow Chemical Corporation. This particular PHAE dispersion is said to have the following typical characteristics: 30% percent solids, a specific gravity of 1.30, a pH of 4, a viscosity of 24 centipoise (Brookfield, 60 rpm, LVI, 22° C.), and a particle size of between 1,400 and 1,800 angstroms. Other suitable materials include BLOX® 588-29 resins based on resorcinol have also provided superior results as a barrier material. This particular dispersion is said to have the following typical characteristics: 30% percent solids, a specific gravity of 1.2, a pH of 4.0, a viscosity of 20 centipoise (Brookfield, 60 rpm, LVI, 22° C.), and a particle size of between 1500 and 2000 angstroms. Other variations of the polyhydroxyaminoether chemistry may prove useful such as crystalline versions based on hydroquinone diglycidylethers. Other suitable materials include polyhydroxyaminoether solutions/dispersions by Imperial Chemical Industries ("ICI," Ohio, USA) available under the name OXYBLOK. In one embodiment, PHAE solutions or dispersions can be crosslinked partially (semi-cross linked), fully, or to the exact desired degree as appropriate for the application by adding an appropriate cross linker material. The benefits of cross linking include, but are not limited to, one or more of the following: improved chemical resistance, improved abrasion resistance, low blushing, low surface tension. Examples of cross linker materials include, but are not limited to, formaldehyde, acetaldehyde or other members of the aldehyde family of materials. Suitable cross linkers can also enable changes to the $T_g$ of the material, which can facilitate formation of specific containers. Other suitable materials include BLOX® 5000 resin dispersion intermediate, BLOX® XUR 588-29, BLOX® 0000 and 4000 series resins. The solvents used to dissolve these materials include, but are not limited to, polar solvents such as alcohols, water, glycol ethers or blends thereof. Other suitable materials include, but are not limited to, BLOX® R1.

In one embodiment, preferred phenoxy-type thermoplastics are soluble in aqueous acid. A polymer solution/dispersion may be prepared by stirring or otherwise agitating the thermoplastic epoxy in a solution of water with an organic acid, preferably acetic or phosphoric acid, but also including lactic, malic, citric, or glycolic acid and/or mixtures thereof. In a preferred embodiment, the acid concentration in the polymer solution is preferably in the range of about 5%-20%, including about 5%-10% by weight based on total weight. In other preferred embodiments, the acid concentration may be below about 5% or above about 20%; and may vary depending on factors such as the type of polymer and its molecular weight. In other preferred embodiments, the acid concentration ranges from about 2.5 to about 5% by weight. The amount of dissolved polymer in a preferred embodiment ranges from about 0.1% to about 40%. A uniform and free flowing polymer solution is preferred. In one embodiment a 10% polymer solution is prepared by dissolving the polymer in a 10% acetic acid solution at 90° C. Then while still hot the solution is diluted with 20% distilled water to give an 8% polymer solution. At higher concentrations of polymer, the polymer solution tends to be more viscous.

Examples of preferred copolyester materials and a process for their preparation is described in U.S. Pat. No. 4,578,295 to Jabarin. They are generally prepared by heating a mixture of at least one reactant selected from isophthalic acid, terephthalic acid and their $C_1$ to $C_4$ alkyl esters with 1,3 bis(2-hydroxyethoxy)benzene and ethylene glycol. Optionally, the mixture may further comprise one or more ester-forming dihydroxy hydrocarbon and/or bis(4-β-hydroxyethoxyphenyl)sulfone. Especially preferred copolyester materials are available from Mitsui Petrochemical Ind. Ltd. (Japan) as B-010, B-030 and others of this family.

Examples of preferred polyamide materials include MXD-6 from Mitsubishi Gas Chemical (Japan). Other preferred polyamide materials include Nylon 6, and Nylon 66. Other preferred polyamide materials are blends of polyamide and polyester, including those comprising about 1-20% polyester by weight, more preferably about 1-10% polyester by weight, where the polyester is preferably PET or a modified PET. In another embodiment, preferred polyamide materials are blends of polyamide and polyester, including those comprising about 1-20% polyamide by weight, more preferably about 1-10% polyamide by weight, where the polyester is preferably PET or a modified PET. The blends may be ordinary blends or they may be compatibilized with an antioxidant or other material. Examples of such materials include those described in U.S. Patent Publication No. 2004/0013833, filed Mar. 21, 2003, which is hereby incorporated by reference in its entirety. Other preferred polyesters include, but are not limited to, PEN and PET/PEN copolymers.

3. Preferred Foam Materials

As used herein, the term "foam material" is a broad term and is used in accordance with its ordinary meaning and may include, without limitation, a foaming agent, a mixture of foaming agent and a binder or carrier material, an expandable cellular material, and/or a material having voids. The terms "foam material" and "expandable material" are used interchangeably herein. Preferred foam materials may exhibit one or more physical characteristics that improve the thermal and/or structural characteristics of articles (e.g., containers) and may enable the preferred embodiments to be able to withstand processing and physical stresses typically experienced by containers. In one embodiment, the foam material provides structural support to the container. In another embodiment, the foam material forms a protective layer that can reduce damage to the container during processing. For example, the foam material can provide abrasion resistance which can reduce damage to the container during transport. In one embodiment, a protective layer of foam may increase the shock or impact resistance of the container and thus prevent or reduce breakage of the container. Furthermore, in another embodiment foam can provide a comfortable gripping surface and/or enhance the aesthetics or appeal of the container.

In one embodiment, foam material comprises a foaming or blowing agent and a carrier material. In one preferred embodiment, the foaming agent comprises expandable structures (e.g., microspheres) that can be expanded and cooperate with the carrier material to produce foam. For example, the foaming agent can be thermoplastic microspheres, such as EXPANCEL® microspheres sold by Akzo Nobel. In one embodiment, microspheres can be thermoplastic hollow spheres comprising thermoplastic shells that encapsulate gas. Preferably, when the microspheres are heated, the thermoplastic shell softens and the gas increases its pressure causing the expansion of the microspheres from an initial position to an expanded position. The expanded microspheres and at least a portion of the carrier material can form the foam portion of the articles described herein. The foam material can form a layer that comprises a single material (e.g., a generally homogenous mixture of the foaming agent and the carrier material), a mix or blend of materials, a matrix formed of two or more materials, two or more layers, or a plurality of microlayers (lamellae) preferably including at least two different materials. Alternatively, the microspheres can be any other suitable controllably expandable material. For example, the microspheres can be structures comprising materials that can produce gas within or from the structures. In one embodiment, the microspheres are hollow structures containing chemicals which produce or contain gas wherein an increase in gas pressure causes the structures to expand and/or burst. In another embodiment, the microspheres are structures made from and/or containing one or more materials which decompose or react to produce gas thereby expanding and/or bursting the microspheres. Optionally, the microsphere may be generally solid structures. Optionally, the microspheres can be shells filled with solids, liquids, and/or gases. The microspheres can have any configuration and shape suitable for forming foam. For example, the microspheres can be generally spherical. Optionally, the microspheres can be elongated or oblique spheroids. Optionally, the microspheres can comprise any gas or blends of gases suitable for expanding the microspheres. In one embodiment, the gas can comprise an inert gas, such as nitrogen. In one embodiment, the gas is generally non-flammable. However, in certain embodiments non-inert gas and/or flammable gas can fill the shells of the microspheres. In some embodiments, the foam material may comprise foaming or blowing agents as are known in the art. Additionally, the foam material may be mostly or entirely foaming agent.

Although some preferred embodiments contain microspheres that generally do not break or burst, other embodiments comprise microspheres that may break, burst, fracture, and/or the like. Optionally, a portion of the microspheres may break while the remaining portion of the microspheres do not break. In some embodiments up to about 0.5%, 1%, 2%, 3%, 4%, 5%, 10%, 20%, 30%, 40%, 50%, 60% 70%, 80%, 90% by weight of microspheres, and ranges encompassing these amounts, break. In one embodiment, for example, a substantial portion of the microspheres may burst and/or fracture when they are expanded. Additionally, various blends and mixtures of microspheres can be used to form foam material.

The microspheres can be formed of any material suitable for causing expansion. In one embodiment, the microspheres can have a shell comprising a polymer, resin, thermoplastic, thermoset, or the like as described herein. The microsphere shell may comprise a single material or a blend of two or more different materials. For example, the microspheres can have an outer shell comprising ethylene vinyl acetate ("EVA"), polyethylene terephthalate ("PET"), polyamides (e.g. Nylon 6 and Nylon 66) polyethylene terephthalate glycol (PETG), PEN, PET copolymers, and combinations thereof. In one embodiment a PET copolymer comprises CHDM comonomer at a level between what is commonly called PETG and PET. In another embodiment, comonomers such as DEG and IPA are added to PET to form miscrosphere shells. The appropriate combination of material type, size, and inner gas can be selected to achieve the desired expansion of the microspheres. In one embodiment, the microspheres comprise shells formed of a high temperature material (e.g., PETG or similar material) that is capable of expanding when subject to high temperatures, preferably without causing the microspheres to burst. If the microspheres have a shell made of low temperature material (e.g., as EVA), the microspheres may break when subjected to high temperatures that are suitable for processing certain carrier materials (e.g., PET or polypropylene having a high melt point). In some circumstances, for example, EXPANCEL® microspheres may be break when processed at relatively high temperatures. Advantageously, mid or high temperature microspheres can be used with a carrier material having a relatively high melt point to produce controllably, expandable foam material without breaking the microspheres. For example, microspheres can comprise a mid temperature material (e.g., PETG) or a high temperature material (e.g., acrylonitrile) and may be suitable for relatively high temperature applications. Thus, a blowing agent for foaming polymers can be selected based on the processing temperatures employed.

The foam material can be a matrix comprising a carrier material, preferably a material that can be mixed with a blowing agent (e.g., microspheres) to form an expandable material. The carrier material can be a thermoplastic, thermoset, or polymeric material, such as ethylene acrylic acid ("EAA"), ethylene vinyl acetate ("EVA"), linear low density polyethylene ("LLDPE"), polyethylene terephthalate glycol (PETG), poly(hydroxyamino ethers) ("PHAE"), PET, polyethylene, polypropylene, polystyrene ("PS"), pulp (e.g., wood or paper pulp of fibers, or pulp mixed with one or more polymers), mixtures thereof, and the like. However, other materials suitable for carrying the foaming agent can be used to achieve one or more of the desired thermal, structural, optical, and/or other characteristics of the foam. In some embodiments, the carrier material has properties (e.g., a high melt index) for easier and rapid expansion of the microspheres, thus reducing cycle time thereby resulting in increased production.

In preferred embodiments, the formable material may comprise two or more components including a plurality of components each having different processing windows and/or physical properties. The components can be combined such that the formable material has one or more desired characteristics. The proportion of components can be varied to produce a desired processing window and/or physical properties. For example, the first material may have a processing window that is similar to or different than the processing window of the second material. The processing window may be based on, for example, pressure, temperature, viscosity, or the like. Thus, components of the formable material can be mixed to achieve a desired, for example, pressure or temperature range for shaping the material.

In one embodiment, the combination of a first material and a second material may result in a material having a processing window that is more desirable than the processing window of the second material. For example, the first material may be suitable for processing over a wide range of temperatures, and the second material may be suitable for processing over a narrow range of temperatures. A material having a portion formed of the first material and another portion formed of the second material may be suitable for processing over a range of temperatures that is wider than the narrow range of processing temperatures of the second material. In one embodiment, the processing window of a multi-component material is similar to the processing window of the first material. In one embodiment, the formable material comprises a multilayer sheet or tube comprising a layer comprising PET and a layer comprising polypropylene. The material formed from both PET and polypropylene can be processed (e.g., extruded) within a wide temperature range similar to the processing temperature range suitable for PET. The processing window may be for one or more parameters, such as pressure, temperature, viscosity, and/or the like.

Optionally, the amount of each component of the material can be varied to achieve the desired processing window. Optionally, the materials can be combined to produce a formable material suitable for processing over a desired range of pressure, temperature, viscosity, and/or the like. For example, the proportion of the material having a more desirable processing window can be increased and the proportion of material having a less undesirable processing window can be decreased to result in a material having a processing window that is very similar to or is substantially the same as the processing window of the first material. Of course, if the more desired processing window is between a first processing window of a first material and the second processing window of a second material, the proportion of the first and the second material can be chosen to achieve a desired processing window of the formable material.

Optionally, a plurality of materials each having similar or different processing windows can be combined to obtain a desired processing window for the resultant material.

In one embodiment, the rheological characteristics of a formable material can be altered by varying one or more of its components having different rheological characteristics. For example, a substrate (e.g., PP) may have a high melt strength and is amenable to extrusion. PP can be combined with another material, such as PET which has a low melt strength making it difficult to extrude, to form a material suitable for extrusion processes. For example, a layer of PP or other strong material may support a layer of PET during co-extrusion (e.g., horizontal or vertical co-extrusion). Thus, formable material formed of PET and polypropylene can be processed, e.g., extruded, in a temperature range generally suitable for PP and not generally suitable for PET.

In some embodiments, the composition of the formable material may be selected to affect one or more properties of the articles. For example, the thermal properties, structural properties, barrier properties, optical properties, rheology properties, favorable flavor properties, and/or other properties or characteristics disclosed herein can be obtained by using formable materials described herein.

4. Additives to Enhance Materials

An advantage of preferred methods disclosed herein are their flexibility allowing for the use of multiple functional additives. Additives known by those of ordinary skill in the art for their ability to provide enhanced $CO_2$ barriers, $O_2$ barriers, UV protection, scuff resistance, blush resistance, impact resistance and/or chemical resistance may be used.

Preferred additives may be prepared by methods known to those of skill in the art. For example, the additives may be mixed directly with a particular material, they may be dissolved/dispersed separately and then added to a particular material, or they may be combined with a particular material to addition of the solvent that forms the material solution/dispersion. In addition, in some embodiments, preferred additives may be used alone as a single layer.

In preferred embodiments, the barrier properties of a layer may be enhanced by the addition of different additives. Additives are preferably present in an amount up to about 40% of the material, also including up to about 30%, 20%, 10%, 5%, 2% and 1% by weight of the material. In other embodiments, additives are preferably present in an amount less than or equal to 1% by weight, preferred ranges of materials include, but are not limited to, about 0.01% to about 1%, about 0.01% to about 0.1%, and about 0.1% to about 1% by weight. Further, in some embodiments additives are preferably stable in aqueous conditions. For example, derivatives of resorcinol (m-dihydroxybenzene) may be used in conjunction with various preferred materials as blends or as additives or monomers in the formation of the material. The higher the resorcinol content the greater the barrier properties of the material. For example, resorcinol diglycidyl ether can be used in PHAE and hydroxyethyl ether resorcinol can be used in PET and other polyesters and Copolyester Barrier Materials.

Another additive that may be used are "nanoparticles" or "nanoparticulate material." For convenience the term nanoparticles will be used herein to refer to both nanoparticles and nanoparticulate material. These nanoparticles are tiny, micron or sub-micron size (diameter), particles of materials which enhance the barrier properties of a material by creating a more tortuous path for migrating gas molecules, e.g. oxygen or carbon dioxide, to take as they permeate a material. In preferred embodiments nanoparticulate material is present in amounts ranging from 0.05 to 1% by weight, including 0.1%, 0.5% by weight and ranges encompassing these amounts.

One preferred type of nanoparticulate material is a microparticular clay based product available from Southern Clay Products. One preferred line of products available from Southern Clay products is Cloisite® nanoparticles. In one embodiment preferred nanoparticles comprise monmorillonite modified with a quaternary ammonium salt. In other embodiments nanoparticles comprise monmorillonite modified with a ternary ammonium salt. In other embodiments nanoparticles comprise natural monmorillonite. In further embodiments, nanoparticles comprise organoclays as described in U.S. Pat. No. 5,780,376, the entire disclosure of which is hereby incorporated by reference and forms part of the disclosure of this application. Other suitable organic and inorganic microparticular clay based products may also be used. Both man-made and natural products are also suitable.

Another type of preferred nanoparticulate material comprises a composite material of a metal. For example, one suitable composite is a water based dispersion of aluminum oxide in nanoparticulate form available from BYK Chemie (Germany). It is believed that this type of nanoparticular material may provide one or more of the following advantages: increased abrasion resistance, increased scratch resistance, increased $T_g$, and thermal stability.

Another type of preferred nanoparticulate material comprises a polymer-silicate composite. In preferred embodiments the silicate comprises montmorillonite. Suitable polymer-silicate nanoparticulate material are available from Nanocor and RTP Company.

In preferred embodiments, the UV protection properties of the material may be enhanced by the addition of different additives. In a preferred embodiment, the UV protection material used provides UV protection up to about 350 nm or less, preferably about 370 nm or less, more preferably about 400 nm or less. The UV protection material may be used as an additive with layers providing additional functionality or applied separately as a single layer. Preferably additives providing enhanced UV protection are present in the material from about 0.05 to 20% by weight, but also including about 0.1%, 0.5%, 1%, 2%, 3%, 5%, 10%, and 15% by weight, and ranges encompassing these amounts. Preferably the UV protection material is added in a form that is compatible with the other materials. For example, a preferred UV protection material is Milliken UV390A ClearShield®. UV390A is an oily liquid for which mixing is aided by first blending the liquid with water, preferably in roughly equal parts by volume. This blend is then added to the material solution, for example, BLOX® 599-29, and agitated. The resulting solution contains about 10% UV390A and provides UV protection up to 390 nm when applied to a PET preform. As previously described, in another embodiment the UV390A solution is applied as a single layer. In other embodiments, a preferred UV protection material comprises a polymer grafted or modified with a UV absorber that is added as a concentrate. Other preferred UV protection materials include, but are not limited to, benzotriazoles, phenothiazines, and azaphenothiazines. UV protection materials may be added during the melt phase process prior to use, e.g. prior to injection molding or extrusion, or added directly to a coating material that is in the form of a solution or dispersion. Suitable UV protection materials are available from Milliken, Ciba and Clariant.

In preferred embodiments, $CO_2$ scavenging properties can be added to the materials. In one preferred embodiment such properties are achieved by including an active amine which will react with $CO_2$ forming a high gas barrier salt. This salt will then act as a passive $CO_2$ barrier. The active amine may be an additive or it may be one or more moieties in the thermoplastic resin material of one or more layers.

In preferred embodiments, $O_2$ scavenging properties can be added to preferred materials by including $O_2$ scavengers such as anthroquinone and others known in the art. In another embodiment, one suitable $O_2$ scavenger is AMOSORB® $O_2$ scavenger available from BP Amoco Corporation and ColorMatrix Corporation which is disclosed in U.S. Pat. No. 6,083,585 to Cahill et al., the disclosure of which is hereby incorporated in its entirety. In one embodiment, $O_2$ scavenging properties are added to preferred phenoxy-type materials, or other materials, by including $O_2$ scavengers in the phenoxy-type material, with different activating mechanisms. Preferred $O_2$ scavengers can act either spontaneously, gradually or with delayed action until initiated by a specific trigger. In some embodiments the $O_2$ scavengers are activated via exposure to either UV or water (e.g., present in the contents of the container), or a combination of both. The $O_2$ scavenger is preferably present in an amount of from about 0.1 to about 20 percent by weight, more preferably in an amount of from about 0.5 to about 10 percent by weight, and, most preferably, in an amount of from about 1 to about 5 percent by weight, based on the total weight of the coating layer.

In another preferred embodiment, a top coat or layer is applied to provide chemical resistance to harsher chemicals than what is provided by the outer layer. In certain embodiments, preferably these top coats or layers are aqueous based or non-aqueous based polyesters or acrylics which are optionally partially or fully cross linked. A preferred aqueous based polyester is polyethylene terephthalate, however other polyesters may also be used. In certain embodiments, the process of applying the top coat or layer is that disclosed in U.S. Patent Pub. No. 2004/0071885, entitled Dip, Spray, And Flow Coating Process For Forming Coated Articles, the entire disclosure of which is hereby incorporated by reference in its entirety.

A preferred aqueous based polyester resin is described in U.S. Pat. No. 4,977,191 (Salsman), incorporated herein by reference. More specifically, U.S. Pat. No. 4,977,191 describes an aqueous based polyester resin, comprising a reaction product of 20-50% by weight of waste terephthalate polymer, 10-40% by weight of at least one glycol an 5-25% by weight of at least one oxyalkylated polyol.

Another preferred aqueous based polymer is a sulfonated aqueous based polyester resin composition as described in U.S. Pat. No. 5,281,630 (Salsman), herein incorporated by reference. Specifically, U.S. Pat. No. 5,281,630 describes an aqueous suspension of a sulfonated water-soluble or water dispersible polyester resin comprising a reaction product of 20-50% by weight terephthalate polymer, 10-40% by weight at least one glycol and 5-25% by weight of at least one oxyalkylated polyol to produce a prepolymer resin having hydroxyalkyl functionality where the prepolymer resin is further reacted with about 0.10 mole to about 0.50 mole of alpha, beta-ethylenically unsaturated dicarboxylic acid per 100 g of prepolymer resin and a thus produced resin, terminated by a residue of an alpha, beta-ethylenically unsaturated dicarboxylic acid, is reacted with about 0.5 mole to about 1.5 mole of a sulfite per mole of alpha, beta-ethylenically unsaturated dicarboxylic acid residue to produce a sulfonated-terminated resin.

Yet another preferred aqueous based polymer is the coating described in U.S. Pat. No. 5,726,277 (Salsman), incorporated herein by reference. Specifically, U.S. Pat. No. 5,726,277 describes coating compositions comprising a reaction product of at least 50% by weight of waste terephthalate polymer and a mixture of glycols including an oxyalkylated polyol in the presence of a glycolysis catalyst wherein the reaction product is further reacted with a difunctional, organic acid and wherein the weight ratio of acid to glycols in is the range of 6:1 to 1:2.

While the above examples are provided as preferred aqueous based polymer coating compositions, other aqueous based polymers are suitable for use in the products and methods describe herein. By way of example only, and not meant to be limiting, further suitable aqueous based compositions are described in U.S. Pat. No. 4,104,222 (Date, et al.), incorporated herein by reference. U.S. Pat. No. 4,104,222 describes a dispersion of a linear polyester resin obtained by mixing a linear polyester resin with a higher alcohol/ethylene oxide addition type surface-active agent, melting the mixture and dispersing the resulting melt by pouring it into an aqueous solution of an alkali under stirring Specifically, this dispersion is obtained by mixing a linear polyester resin with a surface-active agent of the higher alcohol/ethylene oxide addition type, melting the mixture, and dispersing the resulting melt by pouring it into an aqueous solution of an alkanolamine under stirring at a temperature of 70-95° C., said alkanolamine being selected from the group consisting of monoethanolamine, diethanolamine, triethanolamine, monomethylethanolamine, monoethylethanolamine, diethylethanolamine, propanolamine, butanolamine, pentanolamine, N-phenylethanolamine, and an alkanolamine of glycerin, said alkanolamine being present in the aqueous solution in an amount of 0.2 to 5 weight percent, said surface-active agent of the higher alcohol/ethylene oxide addition type being an ethylene oxide addition product of a higher alcohol having an alkyl group of at least 8 carbon atoms, an alkyl-substituted phenol or a sorbitan monoacylate and wherein said surface-active agent has an HLB value of at least 12.

Likewise, by example, U.S. Pat. No. 4,528,321 (Allen) discloses a dispersion in a water immiscible liquid of water soluble or water swellable polymer particles and which has been made by reverse phase polymerization in the water immiscible liquid and which includes a non-ionic compound selected from $C_{4-12}$ alkylene glycol monoethers, their $C_{1-4}$ alkanoates, $C_{6-12}$ polyakylene glycol monoethers and their $C_{1-4}$ alkanoates.

The materials of certain embodiments may be cross-linked to enhance thermal stability for various applications, for example hot fill applications. In one embodiment, inner layers may comprise low-cross linking materials while outer layers may comprise high crosslinking materials or other suitable combinations. For example, an inner coating on a PET surface may utilize non or low cross-linked material, such as the BLOX® 588-29, and the outer coat may utilize another material, such as EXP 12468-4B from ICI, capable of cross linking to ensure maximum adhesion to the PET. Suitable additives capable of cross linking may be added to one or more layers. Suitable cross linkers can be chosen depending upon the chemistry and functionality of the resin or material to which they are added. For example, amine cross linkers may be useful for crosslinking resins comprising epoxide groups. Preferably cross linking additives, if present, are present in an amount of about 1% to 10% by weight of the coating solution/dispersion, preferably about 1% to 5%, more preferably about 0.01% to 0.1% by weight, also including 2%, 3%, 4%, 6%, 7%, 8%, and 9% by weight. Optionally, a thermoplastic epoxy (TPE) can be used with one or more crosslinking agents. In some embodiments, agents (e.g. carbon black) may also be coated onto or incorporated into the TPE material. The TPE material can form part of the articles disclosed herein. It is contemplated that carbon black or similar additives can be employed in other polymers to enhance material properties.

The materials of certain embodiments may optionally comprise a curing enhancer. As used herein, the term "curing enhancer" is a broad term and is used in its ordinary meaning and includes, without limitation, chemical cross-linking catalyst, thermal enhancer, and the like. As used herein, the term "thermal enhancer" is a broad term and is used in its ordinary meaning and includes, without limitation, transition metals, transition metal compounds, radiation absorbing additives (e.g., carbon black). Suitable transition metals include, but are not limited to, cobalt, rhodium, and copper. Suitable transition metal compounds include, but are not limited to, metal carboxylates. Preferred carboxylates include, but are not limited to, neodecanoate, octoate, and acetate. Thermal enhancers may be used alone or in combination with one or more other thermal enhancers.

The thermal enhancer can be added to a material and may significantly increase the temperature of the material during a curing process, as compared to the material without the thermal enhancer. For example, in some embodiments, the thermal enhancer (e.g., carbon black) can be added to a polymer so that the temperature of the polymer subjected to a curing process (e.g., IR radiation) is significantly greater than the polymer without the thermal enhancer subject to the same or similar curing process. The increased temperature of the polymer caused by the thermal enhancer can increase the rate of curing and therefore increase production rates. In some embodiments, the thermal enhancer generally has a higher temperature than at least one of the layers of an article when the thermal enhancer and the article are heated with a heating device (e.g., infrared heating device).

In some embodiments, the thermal enhancer is present in an amount of about 5 to 800 ppm, preferably about 20 to about 150 ppm, preferably about 50 to 125 ppm, preferably about 75 to 100 ppm, also including about 10, 20, 30, 40, 50, 75, 100, 125, 150, 175, 200, 300, 400, 500, 600, and 700 ppm and ranges encompassing these amounts. The amount of thermal enhancer may be calculated based on the weight of layer which comprises the thermal enhancer or the total weight of all layers comprising the article.

In some embodiments, a preferred thermal enhancer comprises carbon black. In one embodiment, carbon black can be applied as a component of a coating material in order to enhance the curing of the coating material. When used as a component of a coating material, carbon black is added to one or more of the coating materials before, during, and/or after the coating material is applied (e.g., impregnated, coated, etc.) to the article. Preferably carbon black is added to the coating material and agitated to ensure thorough mixing. The thermal enhancer may comprise additional materials to achieve the desire material properties of the article.

In another embodiment wherein carbon black is used in an injection molding process, the carbon black may be added to the polymer blend in the melt phase process.

In some embodiments, the polymer comprises about 5 to 800 ppm, preferably about 20 to about 150 ppm, preferably about 50 to 125 ppm, preferably about 75 to 100 ppm, also including about 10, 20, 30, 40, 50, 75, 100, 125, 150, 175, 200, 300, 400, 500, 600, and 700 ppm thermal enhancer and ranges encompassing these amounts. In a further embodiment, the coating material is cured using radiation, such as infrared (IR) heating. In preferred embodiments, the IR heating provides a more effective coating than curing using other methods. Other thermal and curing enhancers and methods of using same are disclosed in U.S. patent application Ser. No. 10/983,150, filed Nov. 5, 2004, entitled "Catalyzed Process for Forming Coated Articles," the disclosure of which is hereby incorporated by reference it its entirety.

In some embodiments the addition of anti-foam/bubble agents is desirable. In some embodiments utilizing solutions or dispersion the solutions or dispersions form foam and/or bubbles which can interfere with preferred processes. One way to avoid this interference, is to add anti-foam/bubble agents to the solution/dispersion. Suitable anti-foam agents include, but are not limited to, nonionic surfactants, alkylene oxide based materials, siloxane based materials, and ionic surfactants. Preferably anti-foam agents, if present, are present in an amount of about 0.01% to about 0.3% of the solution/dispersion, preferably about 0.01% to about 0.2%, but also including about 0.02%, 0.03%, 0.04%, 0.05%, 0.06%, 0.07%, 0.08%, 0.09%, 0.1%, 0.25%, and ranges encompassing these amounts.

In another embodiment foaming agents may be added to the coating materials in order to foam the coating layer. In a further embodiment a reaction product of a foaming agent is used. Useful foaming agents include, but are not limited to azobisformamide, azobisisobutyronitrile, diazoaminobenzene, N,N-dimethyl-N,N-dinitroso terephthalamide, N,N-dinitrosopentamethylene-tetramine, benzenesulfonyl-hydrazide, benzene-1,3-disulfonyl hydrazide, diphenylsulfon-3-3, disulfonyl hydrazide, 4,4'-oxybis benzene sulfonyl hydrazide, p-toluene sulfonyl semicarbizide, barium azodicarboxylate, butylamine nitrile, nitroureas, trihydrazino triazine, phenyl-methyl-urethane, p-sulfonhydrazide, peroxides, ammonium bicarbonate, and sodium bicarbonate. As presently contemplated, commercially available foaming agents include, but are not limited to, EXPANCEL®, CELOGEN®, HYDROCEROL®, MIKROFINE®, CEL-SPAN®, and PLASTRON® FOAM.

The foaming agent is preferably present in the coating material in an amount from about 1 up to about 20 percent by weight, more preferably from about 1 to about 10 percent by weight, and, most preferably, from about 1 to about 5 percent by weight, based on the weight of the coating layer. Newer foaming technologies known to those of skill in the art using compressed gas could also be used as an alternate means to generate foam in place of conventional blowing agents listed above.

The tie-layer is preferably a polymer having functional groups, such as anhydrides and epoxies that react with the carboxyl and/or hydroxyl groups on the PET polymer chains. Useful tie-layer materials include, but are not limited to, DuPont BYNEL®, Mitsui ADMER®, Eastman's EPOLINE, Arkema's LOTADER and ExxonMobil's EVELOY®.

D. Methods and Systems for Making Lamellar Material

A multi component layer or article can also be made from a lamellar meltstream that preferably comprises at least two components. A lamellar meltstream, as that term is used herein, includes without limitation, a meltstream comprising at least two layers in which the layers in the meltstream are generally parallel. Although a lamellar meltstream may have as few as two layers, a lamellar meltstream may comprise, and preferably comprises, a plurality of thin layers. Where the lamellar meltstream is made from two materials, the meltstream is preferably comprised of generally alternating thin layers of the two materials. The materials used to form the lamellar meltstream are preferably polymers, such as thermoplastics, including polyester, polyolefin, phenoxy-type materials and other materials as described herein. The layer materials may also include blends of two or more materials. The layer materials may also incorporate additives such as nanoparticles, oxygen scavengers, UV absorbers, compatibilizers, and the like. In one embodiment, the lamellar meltstream comprises recycled polyester such as recycled PET and a barrier material.

Figure 27:
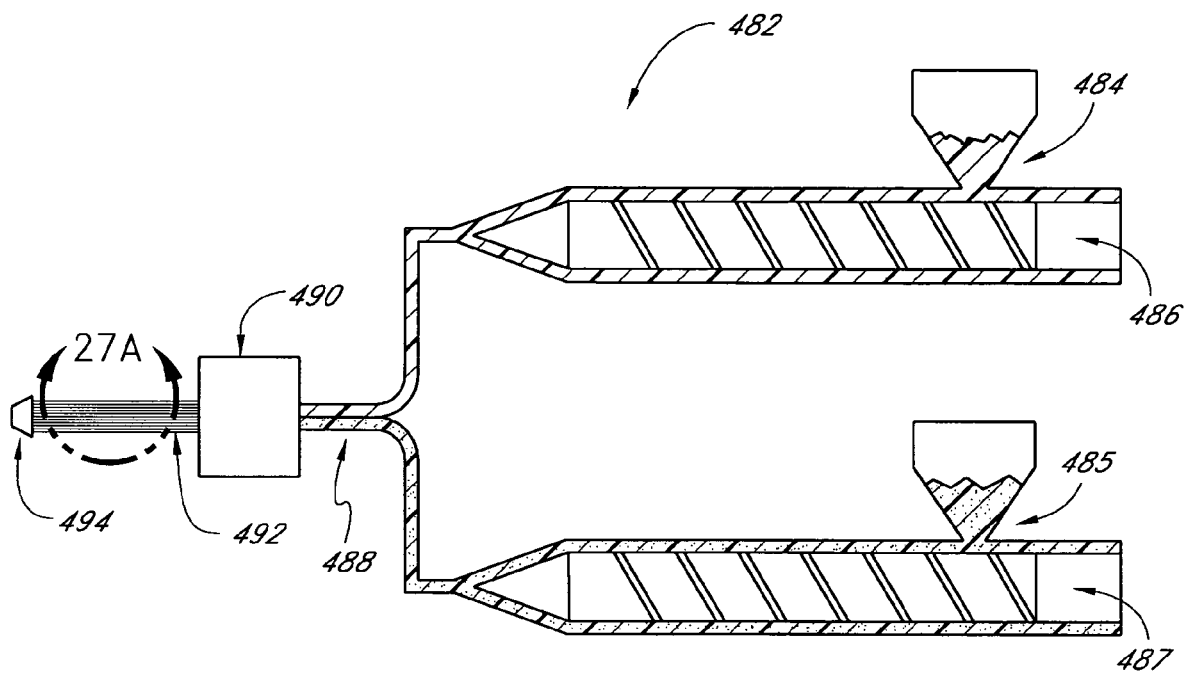
FIG. 27 is a schematic view of an embodiment of a lamellar meltstream generation system.
Figure 27A:
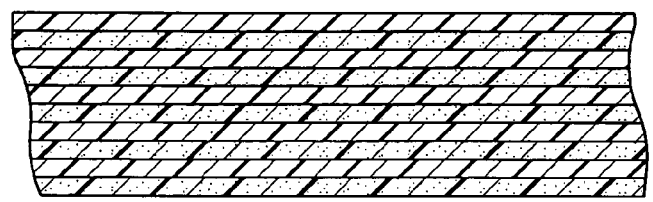
FIG. 27A is a cross-section of lamellar material made from the lamellar meltstream generation system of FIG. 27.

One method of forming a lamellar meltstream uses a system similar to that disclosed in several patents to Schrenk, U.S. Pat. Nos. 5,202,074, 5,540,878, and 5,628,950, the disclosures of which are hereby incorporated in their entireties by reference, although the use of that method as well as other methods for obtaining lamellar meltstreams are presently contemplated. Referring to FIG. 27, a schematic of an embodiment of a lamellar meltstream generation system 482 is shown. The system in FIG. 27 illustrates one embodiment of a two material system, but it will be understood that a system for three or more materials will operate in a similar fashion. The two materials which are to form the layers are placed in separate hoppers or inlets 484 and 485, which feed two separate extruders, 486 and 487 respectively. In a preferred embodiment, the extruders 486 and 487 are screw-type extruders that can apply a combination of heat and pressure to turn raw materials into a melt. The materials are extruded at rates and thicknesses to provide the desired relative amounts of each material and the meltstreams of the extruders combined to form a two layer meltstream 488 comprised of a layer from each cylinder preferably arranged so that one layer lies on top of the other layer The two layer meltstream 488 output from combined cylinders is then preferably applied to a layer multiplication system 490. In the illustrated layer multiplication system 490, the two layer meltstream 488 is multiplied into a multi-layer meltstream 492, which has 10 layers in the illustrated embodiment as shown in FIG. 27A. The illustration in FIG. 27A is schematic and somewhat idealistic in that although the layers of the lamellar material on average are preferably generally parallel to each other, the lamellar material may include layers that are not parallel to each other and/or layers may be generally parallel at some points and not parallel at others.

Layer multiplication may be done by any of a number of ways. In one embodiment, one first divides a section of meltstream into two pieces perpendicular to the interface of the two layers. Then the two pieces are flattened so that each of the two pieces is about as long as the original section before it was halved in the first step, but only half as thick as the original section. Then the two pieces are recombined into one piece having similar dimensions as the original section, but having four layers, by stacking one piece on top of the other piece so that the sublayers of the two materials are parallel to each other (i.e. stacking in a direction perpendicular to the layers of the meltstream). These steps of dividing, flattening, and recombining the meltstream may be done several times to create more thinner layers. The meltstream may be multiplied by performing the dividing, flattening and recombining a number of times to produce a single melt stream consisting of a plurality of sublayers of the component materials. In this two material embodiment, the composition of the layers will alternate between the two materials. Other methods of layer generation include performing steps similar to those outlined above, but flattening the meltstream prior to dividing or following recombination. Alternatively, in any of these embodiments one may fold the meltstream back onto itself rather than dividing it into sections. Combinations of dividing and folding may also be used, but it is noted that folding and dividing will achieve slightly different results because folding will cause one layer to be doubled back upon itself. The output from the layer multiplication system passes out an opening 494 such as a nozzle or valve, and is used to form an article or a multi-component layer in an article, such as by injecting or placing the lamellar meltstream into a mold.

In the illustrated two-material embodiment, the composition of the layers generally alternates between the two materials. However, in other embodiments any suitable number of materials can be combined into a component meltstream and then fed to layer multiplication system 490 which can produce a lamellar meltstream with any desired number and/or size of repeating blocks or stacks of materials. For example, in one embodiment, the system 482 comprises three extruders that simultaneously deliver material to the layer multiplication system 490. The layer multiplication system 490 can form a stack of layers formed of the three materials.

When a lamellar meltstream includes one or more materials which provide gas barrier properties, it is preferred that the lamellar meltstream be used in a manner which orients it such that the layers of the meltstream are generally parallel to one or more broad surfaces of the article. For example, in a preform or container, the layers are preferably generally parallel to the length of the wall section or body portion. Although parallel is preferred, other orientations may be used and are within the scope of this disclosure. For example, one or more portions of the wall of a container can have layers that are parallel to each other and the surface of the wall while one or more other portions have layers that are not parallel to each other. The desired tortuous path through the wall of a container is determined by the orientation and configuration of the layers of which form the container. For example, layers that are generally parallel to each other and the wall section can increase substantially the length of the path through the wall to be traversed by a gas molecule. Alternatively, layers that are generally parallel to each other and transverse to the wall result in a shorter or reduced tortuous fluid path through the wall and would thus have lower barrier properties than the same meltstream oriented in a parallel fashion.

The articles, such as containers and preforms disclosed herein can be formed using a lamellar meltstream output from a system such as the one illustrated. In some embodiments, the lamellar melt comprises materials that have generally similar melt temperatures, $T_m$, for convenient processing and molding. However, the lamellar melt may comprise materials that have substantially different $T_m$s. For example, the lamellar material can comprise materials which have $T_m$s within a range of about 500° F. (about 260° C.). The materials of the lamellar material can be selected based on the material's thermal properties, structural properties, barrier properties, rheology properties, processing properties, and/or other properties. The lamellar melt can be formed and cooled, preferably before one or more of its components substantially degrade. A skilled artisan can select materials to form the lamellar material to achieve the desired material stability suitable for the processing characteristics and chosen end use.

E. Methods and Apparatuses for Making Preferred Articles

The monolayer and multilayer articles (including packaging such as closures, preforms, containers, bottles) can be formed by a molding process (e.g., injection molding including co-injection molding). One method of producing multi-layered articles is referred to herein generally as overmolding, and sometimes as inject-over-inject ("IOI"). The name refers to a procedure which uses injection molding to inject one or more layers of material over an existing layer, which preferably was itself made by injection molding. The terms "overinjecting" and "overmolding" are used herein to describe the coating process whereby a layer of material is injected over an existing layer or preform.

One overmolding method for making preforms involves using an injection molding machine in conjunction with a mold comprising a mandrel or core and a cavity. A first layer of a preform is molded between the mandrel and a first cavity of the mold by injecting a molten polymer (i.e. polymer melt) into the void space in the mold. The first layer remains on the mandrel when the mandrel is pulled out of the cavity, moved, and inserted into a second mold cavity. A second layer of a material is then injected over the existing first preform layer. The mandrel and accompanying preform are then removed from the second cavity and the preform is removed from the mandrel.

In some embodiments, the overinjecting process is performed while the underlying layer has not yet fully cooled. The underlying layer may have retained inherent heat from an injection molding process that formed the underlying layer. In some embodiments, the underlying layer can be at room temperature or any other temperature suitable for overmolding. For example, articles at room temperature can be overmolded with one or more layers of material. These articles may have been stored for an extended period of time before being overmolded.

Overinjecting may be used to place one or more layers of material(s) such as those comprising PP, expandable/foam material, PET (including recycled PET, virgin PET), lamellar material, barrier materials, combinations thereof, and/or other materials described herein over a substrate (i.e., the underlying layer). In some non-limiting embodiments, the substrate is in the form of a preform, preferably having an interior surface for contacting foodstuff. In some embodiments, the substrate preform comprises PET (such as virgin PET), phenoxy type thermoplastic, combinations thereof, and/or the like.

Articles may comprises one or more layers or portions having one or more of the following advantageous characteristics: an insulating layer, a barrier layer, a foodstuff contacting layer, a non-flavor scalping layer, a high strength layer, a compliant layer, a tie layer, a gas scavenging layer, a layer or portion suitable for hot-fill applications, a layer having a melt strength suitable for extrusion. In some embodiments, monolayer or multi-layer material comprises one or more of the following materials: PET (including recycled and/or virgin PET), PETG, foam, polypropylene, phenoxy type thermoplastics, polyolefins, phenoxy-polyolefin thermoplastic blends, and/or combinations thereof. For the sake of convenience, articles are described primarily with respect to preforms, containers, and closures.

In some embodiments, articles can comprise foam material. Foam material can be prepared by combining a foaming agent and a carrier material. In one embodiment, the carrier material and the foaming agent are co-extruded for a preferably generally homogenous mixture of foam material. The amount of carrier material and the foaming agent can be varied depending on the desired amount of one or more of the following: expansion properties, structural properties, thermal properties, feed pressure, and the like. In some non-limiting embodiments, the expandable/foam material comprises less than about 10% by weight, also including less than about 9%, 8%, 7%, 6%, 5%, 4%, 3%, 2%, or 1% by weight, of the foaming agent. In some non-limiting embodiments, the expandable/foam material comprises about 1-6% by weight of the foaming agent. In another non-limiting embodiment, the expandable/foam material comprises about 3-6% by weight of the foaming agent. In another non-limiting embodiment, the expandable/foam material comprises about 2-8% by weight of the foaming agent. It is contemplated that the expandable/foam material may comprise any suitable amount of foaming agent including those above and below the particular percentages recited above, depending on the desired properties of the foam material.

In some embodiments, carrier material (e.g., polypropylene pellets) and a foaming agent in the form of microspheres, preferably EXPANCEL® microspheres or similar material, are fed into a hopper. The carrier material and the microspheres are heated to melt the carrier material for effective mixing of the materials. When the mixture is heated, the microspheres may expand or become enlarged. Preferably, the temperature of the mixture is in a temperature range to not cause full expansion or bursting of a substantial portion of the microspheres. For example, if the temperature of the mixture reaches a sufficiently high temperature, the gas within the microspheres may expand such that microspheres break or collapse. The melted foam material can be co-extruded and is preferably rapidly quenched to limit the amount of expansion of the microspheres.

When the foam material is heated for processing (e.g., extruding, injecting, etc.), the microspheres according to one embodiment may partially expand from their initial generally unexpanded position. When such microspheres are partially expanded, they retain the ability to undergo further expansion to increase the size of the microspheres. Preferably, the pressure and temperature are such that the microspheres are not fully expanded during extrusion in order to allow further expansion of the microspheres during blow molding, for example. Additionally, the pressure of the foam material can be increased to reduce, or substantially prevent, the expansion of the microspheres. Thus, the pressure and the temperature of the foam material can be varied to obtain the desired amount of expansion of the microspheres. Partially expanded microspheres can undergo further expansion when they are reheated (e.g., during the blow molding cycle) as described herein.

It is contemplated that articles described herein can be prepared or modified by any suitable method, including but not limited to (1) dip or flow coating, (2) spray coating, (3) flame spraying, (4) fluidized bed dipping, (5) electrostatic powder spray, (6) overmolding (e.g., inject-over-inject), and/or (7) injection molding (including co-injection). For example, preferred methods and apparatuses for performing the methods are disclosed in U.S. Pat. No. 6,352,426 and U.S. Publication No. 2004-0071885 which are incorporated by reference in their entirety and form part of the disclosure of this application. It is also contemplated that these methods and apparatuses can be used to form other articles described herein. The preforms disclosed herein can be blow molded using methods and apparatus disclosed in the references (e.g., U.S. Pat. No. 6,352,426) incorporated by reference into the present application.

1. Methods and Apparatus for Preparing an Article Comprising Foam

Figure 28:
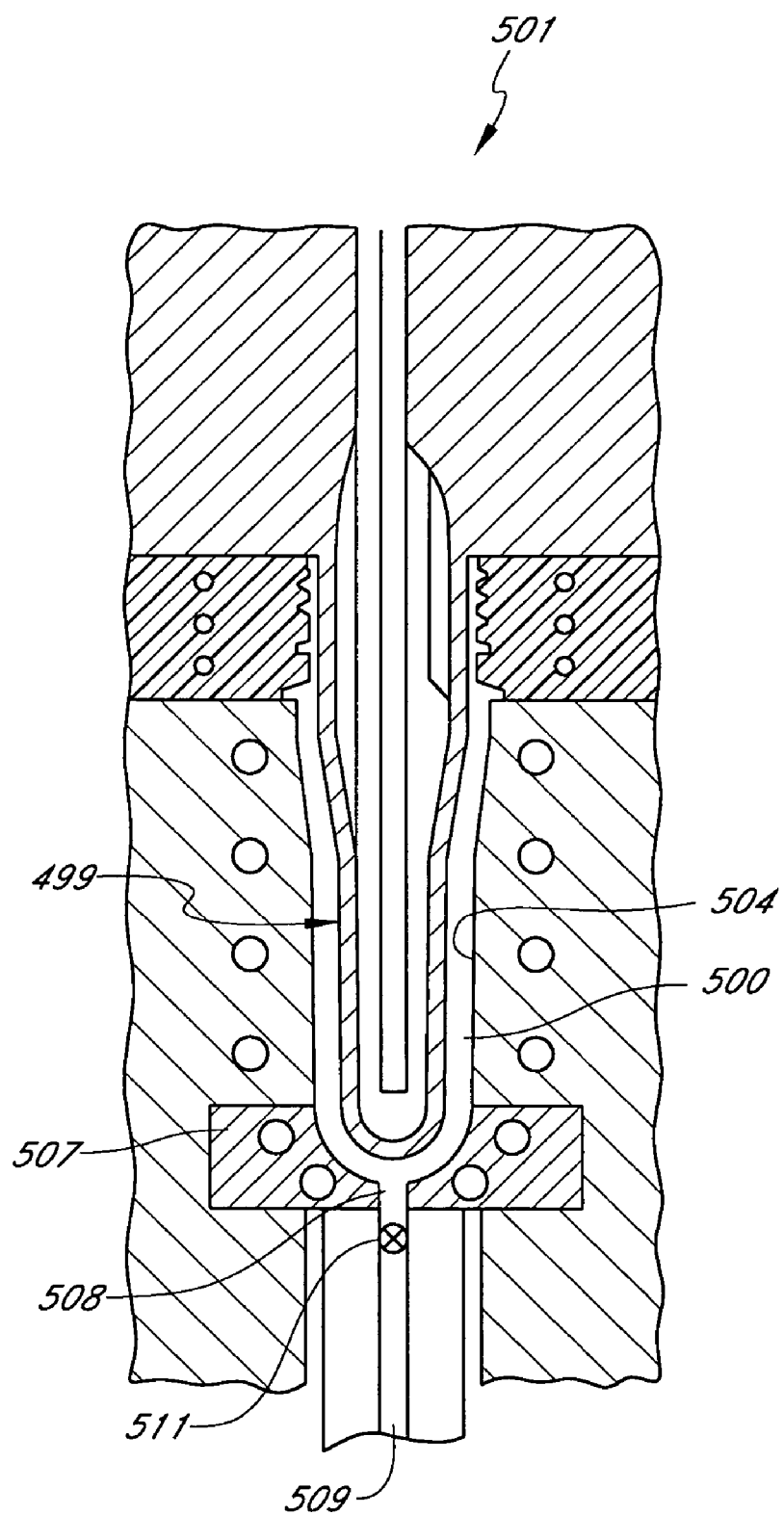
FIG. 28 is a cross-section of a mold of a type that may be used to make the preform of FIG. 1.

A article, such as the preform 30 can be formed through injecting molding by utilizing an injection mold. FIG. 28 illustrates a mold 501 which has a cavity 500 defined by the core 499 and the mold cavity section 504. The mold 501 can form an article that comprises expandable/foam material. In some embodiments, including the illustrated embodiment, the foam material is passed along a line 509 and passes through a gate 508 and into the cavity 500. The foam material can fill the cavity 500 to form the preform 30. The foam material within the cavity 500 can be rapidly cooled or quenched to limit expansion of the foaming agent and can reduce cycle times to increase production. The mold can have a gate or needle valve 511 to prevent backflow of the expanding foam.

The back pressure of the melt may not be high enough to cause the foaming agent in the form of microspheres to break. However, the back pressure should prevent the microspheres from over expanding in order to allow for blow molding the preform into the desired shape and/or to allow for further expansion of the microspheres. The temperature of the melt can be varied depending on the back pressure of the melt. For example, a melt at a high temperature can cause the microspheres to expand. To inhibit or prevent the expansion of the microspheres, the back pressure can be increased to account for the increased pressure within each of the microspheres. However, if the pressure of the melt is too high, the microspheres may break or collapse. Thus, the pressure of the melt is preferably maintained in a range so that a substantial portion of the microspheres do not fully expand or break. In other embodiments, however, some or all of the spheres may break upon full expansion to form the foam (e.g., open celled foam).

In some embodiments, the melt may undergo at least partial expansion before it is injected into the mold cavity 500. For example, after a shot of melt is injected into the cavity 500, the screw of the extruder can be retracted to accumulate melt for the next shot. After recovery, the screw can be decompressed to reduce the pressure of the melt to achieve controllable expansion of the microspheres in the melt. In one embodiment, the melt is not under pressure so that the microspheres can freely expand. However, pressure can be applied to the melt to selectively control the expansion of the microspheres. Accordingly, the microspheres in the melt can be partially or fully expanded before the melt is injected into the cavity 500. Preferably, the microspheres are in a state of expansion such that the microspheres can undergo further expansion during, e.g., the preheat process for blow molding. The melt having microspheres may be injected into the cavity 500 to form a preform having expanded microspheres. The preform having expanded microspheres can then be formed into the container having generally evenly distributed microspheres.

The cavity 500 can be heated to result in a generally even distribution of the microspheres of the preform. The heat can cause generally uniform expansion of the foam material. In some embodiments, the melt may comprises polypropylene and microspheres and is injected into the cavity 500, which can be at a temperature of about 100° F. (37.8° C.) to about 250° F. (121.1° C.). The heated cavity 500 can ensure that the microspheres are generally evenly distributed throughout the preform. In another embodiment, the cavity 500 can be maintained at a temperature of about 150° F. (65.6° C.) to about 225° F. (107.2° C.). In yet another embodiment, the cavity 500 can be maintained at a temperature of less than about 200° F. (93.3° C.). The cavity 500 can be cooled at any suitable time to achieve the desired distribution of the microspheres. In another embodiment, the melt comprises polyethylene and microspheres. The cavity 500 can be at a temperature of about 75° F. (23.9° C.) to about 125° F. (51.7° C.) to form a preform, preferably generally evenly distributed microspheres. The preform may have evenly distributed microspheres can then be molded into a container which, in turn, has evenly distributed microspheres. The temperatures noted above are dependent upon the particular materials used. In view of the present disclosure, a skilled artisan can select material(s), processing parameters, and design to the mold to produce various types of articles.

The speed of the melt passing through the line 509 and the cavity 500 can cause frictional heat and thus cause expansion of the microspheres in addition to the heat of the melt. The illustrated mold of FIG. 28 has high heat transfer material 507 that can rapidly cool the melt passing through the cavity 500 to retard the expansion of the microspheres. The high heat transfer material 507 can form a portion or the entire mold cavity section 504. Thus, operating parameters (e.g., the flow speed, pressure, temperature, mixture ratios, viscosity, and the like) can be varied depending on the shape, size, and other characteristics of the mold.

In some embodiments, the preform in the cavity 500 can be rapidly cooled or quenched to retard, or even to stop, the expansion of the microspheres. This allows that the microspheres, which may be partially expanded, to form a tight structure that can be expanded during blow molding. After the preform is sufficiently cooled, it can be conveniently handled without further expansion of the microspheres. In one embodiment, the cavity 500 is maintained at a temperature suitable for controlling the expansion rate of the microspheres during the molding process. In one non-limiting embodiment, the cavity 500 is maintained at a temperature of about 40° F. (4.4° C.) to about 180° F. (82.2° C.) to reduce or stop the expansion of the microspheres. The temperature of the cavity 500 can be selected based on, e.g., the molding materials, the size and configuration of the preform, the size of the space filled by the foam material, and/or processing parameters. The processing temperature of the material can be chosen or determined by a skilled artisan given the composition of foam (carrier material, foaming agent, microspheres), degree of expansion desired, and/or other parameters.

a. Preparing Articles by Blow Molding Process

Articles comprising form can be produced by blow-molding processes. An article in the form of the preform 30 can be stretch blow-molded to form a container, such as the container 37 (FIG. 4), and preferably cause expansion of the microspheres. The preform 30 can be subjected to a stretch blow-molding process in the mold illustrated in FIG. 3. The preform 30 comprising expandable material is placed in the mold 28 having a cavity corresponding to the desired container shape. The preform 30 is then heated and expanded by stretching the preform 30 to fill the cavity within the mold 28, thus creating a container. The stretching can be accomplished by, e.g., forcing air into the interior portion of the preform 30. The blow molding operation normally is restricted to the body portion 34.

Before the preform 30 is stretched, the preform 30 is preferably preheated to the blow temperature range for the blow molding process. If the temperature of the preform 30 reaches the expansion temperature range, the microspheres of the preform 30 may expand. The expansion temperature range can be achieved before, during, or after the stretching of the preform 30. Preferably, the microspheres of the preform 30 are heated to their expansion temperature range to cause at least partial expansion of the microspheres before the preform 30 is blow molded.

After the temperature of the preform 30 is raised to the blow temperature range, air is passed into the interior portion of the preform 30 to expand the preform into the desired shape of the container 37. The expansion temperature range is preferably generally similar to the blow temperature range such that the microspheres can expand during the heating or reheating for blow molding. The expandable material is expanded as the air forces the preform to stretch and mold to the desired shape. In another embodiment, the preform 30 can be blow molded into the desired shape and then the temperature of the container 37 can reach the expansion temperature range so as to cause expansion of the foam material of the container 37. To increase the rate of expansion of the microspheres, the temperature during the blow molding cycle can be increased and/or the blow pressure can be reduced. To decrease the rate of expansion of the microspheres, the temperature during the blow molding cycle can be decreased and/or the blow pressure can be increased. Thus, the preform can be heated/chilled and the pressure can be set as desired.

With reference to FIG. 3, the walls 33 of the mold 28 can be temperature controlled to achieve the desired expansion of the foam material of the preform 30/container 37. In one embodiment, the mold 28 has a temperature control system to control the temperature of the walls 33. The temperature control system can have heating/cooling channels or any suitable system for effectively controlling the temperature of the walls 33.

In some embodiments, for example, the walls 33 are heated to cause expansion of the microspheres of the container 37. After the preform 30 is blow molded to form the container 37, the heated walls 33 continue the expansion of the microspheres in the wall of the container 37, thereby reducing the density of the wall. In this manner, the microspheres in the walls of the container 37 can be expanded or enlarged to provide a more effective thermal barrier due to the highly expanded microspheres.

The walls 33 of the mold 28 can be cooled to retard, or prevent, the expansion or further expansion of the microspheres. The walls 33 may be heated during one or more portions and cooled during one or more portions of the production cycle. The walls 33 can be heated during a heat cycle to promote expansion of the microspheres as discussed above. After the microspheres have expanded as desired, the mold walls 33 are preferably cooled to decrease, or preferably stop, the further expansion of the microspheres. Thus, the walls 33 can be heated during a first portion and cooled during a second portion of the blow-molding process. However, the walls 33 can be heated and/or cooled at any suitable time during the blow-molding process. For example, in another embodiment the walls 33 of the mold 28 are cooled during the stretching of the preform 30 from its initial position to the desired container shape. The preform 30 can be heated, blown, and stretched until the wall of the preform contacts the chilled walls 33. Preferably, the expandable material forming the preform 30 undergoes localized expansion as the preform is stretched. When the preform 30 thermally communicates with the walls 33, heat is transferred from the stretched preform 30 to the mold 28 to cool the wall 84 of the shaped preform. As the preform 30 is cooled, the expansion of the microspheres can be reduced or stopped. The pressure within the mold 28 can be increased to decrease the rate of expansion of the microspheres. The pressure within the mold 28 can be decreased to increase the rate of expansion of the microspheres.

The walls 33 of the mold 28 can have a surface treatment or structures for achieving a desired foaming reaction during the blow molding process which may result in a textured surface of the container 37. For example, the surface of the walls 33 can be rough or gritty so that when the outer surface of container 37 contacts the wall 33 during blow molding, the outer surface of the container 37 will have a textured foam surface. The textured surface of the wall 33 can promote further expansion of the microspheres after at least a portion of the container contacts the wall 33 of the mold 28. However, the surface of the wall 33 can have any treatment to achieve a suitable outer surface texture of the container 82. In another embodiment, for example, the wall 33 of the mold 28 can have a reduced friction finish, such as a vapor honed finish, for easy release of the container 37 from the mold 28. The reduced friction finish can be a substantially smooth surface to facilitate release of the container. The mold 28 can be used to produce multilayer containers, such as the container 82 of FIG. 6.

2. Preferred Methods and Apparatuses for Preparing Preforms

Articles having mono or multilayers can be formed through injection molding processes, such as by co-injection, overmolding, and the like. It is contemplated that combinations of injection molding can be performed to produce different configurations of articles.

a. Preferred Methods and Apparatuses For Co-Injection Molding

FIG. 28 illustrates the mold 501 that can be used to inject or co-inject to form monolayer or multilayer, respectively, articles. Multilayer preforms can be formed by a co-injection procedure in which a plurality of materials are co-injected into the cavity 500. In some embodiments, a first material and a second material are co-injected into the cavity 500 to form a multilayer preform. In the embodiment illustrated in FIG. 11, a first material that forms the inner layer 164 and a second material that forms the outer layer 162 can be co-injected through the gate 508. To terminate the inner layer 164 along the interior surface of the preform 160, the flow of the first material forming the inner layer 164 can be stopped before the melt stream comprising the first material proceeds throughout the entire cavity 500. Thus, one or more materials can be delivered through the gate 508 at different flow rates, simultaneously or at different times, in various amounts, and the like to form a desired article.

The preform 160 can have a thin inner layer 164 relative to the outer layer 162. This is especially advantageous if the material forming the inner layer 164 is substantially more expensive than the material forming the outer layer 162. For example, some types of phenoxy type thermoplastics may be more expensive than readily available materials, such as PET, so that the amount of phenoxy type thermoplastics can be used in minimal amounts to reduce the material cost of the preform 160.

Figure 12A:
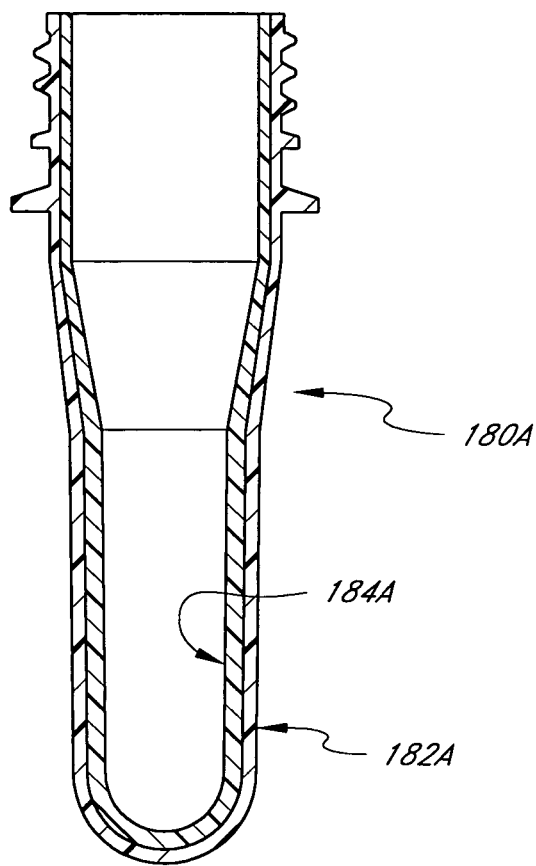
FIG. 12A is a cross-section of a multi-layer preform having an inner layer and an outer layer that define a neck portion.
Figure 12B:
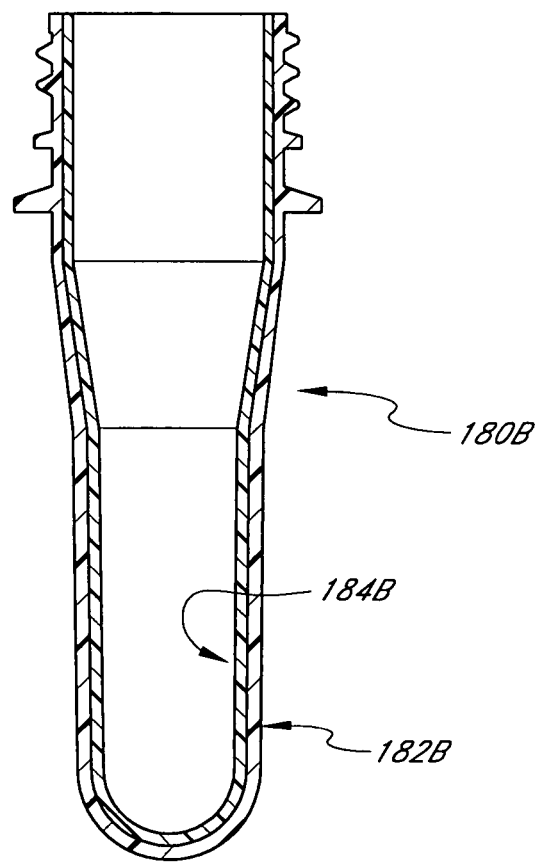
FIG. 12B is a cross-section of a multi-layer preform having an inner layer and an outer layer that define a neck portion.

The preform 180 of FIG. 12 also can be formed through a co-injection process using the mold 501. A skilled artisan will readily recognize that the layers of the preforms 160, 180 can be varied to achieve the desired properties of the preform. FIGS. 12A and 12B illustrate alternative embodiments of multilayer preforms. FIG. 12B illustrates a preform 180B that comprises an inner layer 184B and/or outer layer 182B that may have a varying thickness. The illustrated layers 182B, 184B comprise a thickened portion in the body portion of the preform. The inner layer 184B has a slightly thickened body portion relative to the neck finish. The thickness of the outer layer 182B is generally greater than the thickness of the inner layer 184B. Although not illustrated, the preform 190 of FIG. 13 also can have the inner layer 194 and the outer layer 199 of varying thicknesses.

It is contemplated that the preforms of FIGS. 11-14 can be overmolded with a material (e.g., barrier material), preferably to form a layer that extends from the support ring along the body portion of the preform. U.S. Pat. No. 6,312,641 is hereby incorporated by reference in its entirety and describes methods, systems and articles formed by one or more molding processes. In view of the present disclosure, various combinations of systems can be used to produce a wide variety of articles by employing a co-injection processes.

b. First Preferred Method and Apparatus for Overmolding

Figure 29:
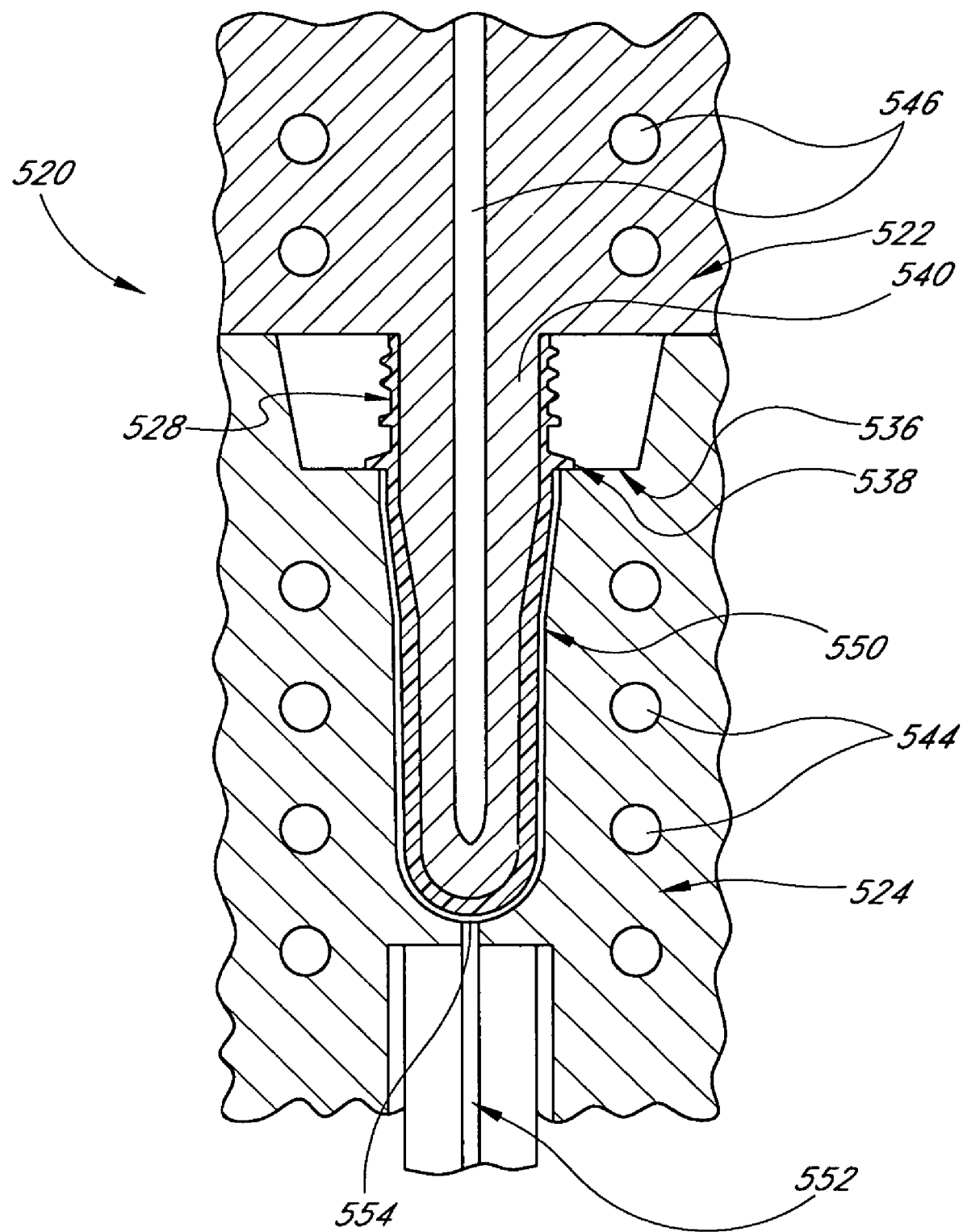
FIG. 29 is a cross-section of a mold that may be used to make an outer layer of the preform of FIG. 5.

Articles having multiple layers can be formed through injection molding process, such as by an overmolding process. FIG. 29 illustrates an example of a mold 520 for overmolding. The mold 520 has a core half 522 and a cavity half 524 illustrated in the closed position prior to overinjecting. The cavity half 524 comprises a cavity in which the uncoated article in the form of a substrate (e.g., the preform 528) is placed. The overmolding process is can be used to deposit one or more layers on the substrate.

The preform 528 can be a mono or multilayer preform. The illustrated preform is a monolayer preform that may comprise one or more of the following: PET (e.g., virgin PET and/or recycled PET), polyester, PP, phenoxy type thermoplastics, thermoplastics and/or the like. The preform 528 can also be similar to the preforms disclosed in the applications or patents incorporated by reference into the present application.

A support ring 538 of the preform 528 can rest on a ledge 536 and is held in place by the core half 522, which exerts pressure on the support ring 538, thus sealing the neck portion off from the body portion of the substrate preform. The core half 522 of the mold comprises a core 540. The core 540 selectively heats/cools the interior of the preform 528, while channels 544 can heat/cool the cavity half 524. For example, the cooling is done by fluid circulating through channels 546 in the core half 522 of the mold 520.

As the preform 528 sits in the mold cavity, the body portion of the preform is substantially centered within the cavity and is preferably completely surrounded by a void space or cavity 550. The preform, thus positioned, acts as an interior die mandrel in the subsequent injection procedure. The melt of the overmolding material is then introduced into the mold cavity 550 from an injector via gate 554 and flows around the preform 528, preferably surrounding at least the body portion of the preform 528. Following overinjection, the overmolded layer will take the approximate size and shape of the cavity 550.

The coating material may be heated to form a melt of a viscosity compatible with use in an injection molding apparatus. The temperature for this, the inject temperature, will differ among materials, as melting ranges in polymers and viscosities of melts may vary due to the history, chemical character, molecular weight, degree of branching and other characteristics of a material.

The mold 520 can be used to form the coated preforms disclosed herein such as the preform 50. The preform 50 of FIG. 5 can have one of the layers 52, 54 comprising substantially PET, phenoxy type thermoplastics (including phenoxy and polyoletin-phenoxyblends), polypropylene, lamellar material, and/or other thermoplastics. In some embodiments, the other of the layers 52, 54 of the preform 50 can comprise another material, such as foam. The expandable/foam material can comprise a carrier material (e.g., PP, PET, and/or ethylene acrylic acid) that mixed with a foaming agent (e.g., microspheres, such as EXPANCEL® microspheres) for producing a foam material. For example, the inner layer 54 can comprise PET and the outer layer 52 can comprise expandable/foam material. The substrate preform can comprise PET. Foam material can be delivered through a line 552 and the gate 554 into the cavity 550. The injected expandable/foam material is then cooled for subsequent removal. In view of the present disclosure, a skilled artisan can select material(s) based on the material(s)' properties and desired articles made therefrom.

i. Preparing Multilayer Articles by Blow Molding

Multilayer articles can be blow molded in a similar manner as monolayer articles, except as described in further detail below. For the sake of convenience, blow molding of multilayer articles will be described with respect to the preform 50. Of course, other multilayer preforms can be blow molded in a similar manner, especially multilayer preforms comprising foam material.

The preform 50 is placed in a mold (e.g., the mold 28 of FIG. 3) having a cavity corresponding to the desired container shape. The preform 50 is then heated and expanded by forcing air into the interior of the preform to stretch the preform so that it fills the cavity, thus creating a multilayer container. Optionally, the preform 50 can be stretched with a stretch rod or other means of stretching the preform.

In some embodiments, the preform 50 comprises material having similar or different processing windows. The preform may comprise an inner layer 54 comprising PET and an outer layer 52 comprising another material, such as PP (including foamed and non-foamed PP). The outer layer 52 can be made of mostly or entirely of PP. Advantageously, the inner layer 54 and the outer layer 52 can be blow molded within a processing window that is dramatically wider than the processing window of preforms made entirely of PP. Advantageously, the processing window may be widened irrespective of the thicknesses of the inner layer 54 and outer layer 52. Optionally, a layer 85 can be used to enhance adhesion between the inner layer 54 and the outer layer 52. In one embodiment, a coupling agent or crafting (e.g., adhesive) forms the layer 85 and provides adhesion between the inner layer 54 and the outer layer 52.

In some embodiments, the layer 52 can be expandable material formed through overmolding by using injection molding to inject at least one layer of expandable material over an existing preform (e.g., a preform comprising PET, phenoxy type thermoplastics, etc.). The inner layer 54 and the carrier material of the foam layer 52 may have a similar $T_g$ so that both layers 52, 54 can be processed within their preferred blowing temperature ranges. As discussed above, the expansion temperature range may be the temperature range that causes expansion of the microspheres. The expansion temperature range can be varied by changing the pressure applied to the expandable material. Preferably, the expansion temperature range is similar or within the blowing temperature range of the layers 52, 54. During the blow molding process the temperature of the preform can be within the expansion temperature range to cause at least partial expansion of the microspheres. Thus, the foaming agent of the foam layer 52 can expand (1) during the reheat of the preform for blow molding, (2) during the stretching of the preform to the shape of the container, (3) after the container is generally formed, and/or (4) combinations of (1), (2), and/or (3).

In some embodiments, a multi-layer preform can be blow-molded into a container that has an inner layer suitable for engaging with liquid within the container. For example, a preform or container can have an inner layer or coating (e.g., as a plasma layer of silicon oxide, certain types of phenoxy, and the like) which is suitable for use in contact with drinking liquids, foodstuff, or the like. This layer can be applied to the container (e.g., a container 37 or container 83) at any suitable time during the production of the containers. For example, the plasma layer can be applied to the preform or to the shaped container.

c. Second Preferred Method and Apparatus for Overmolding

Figure 30:
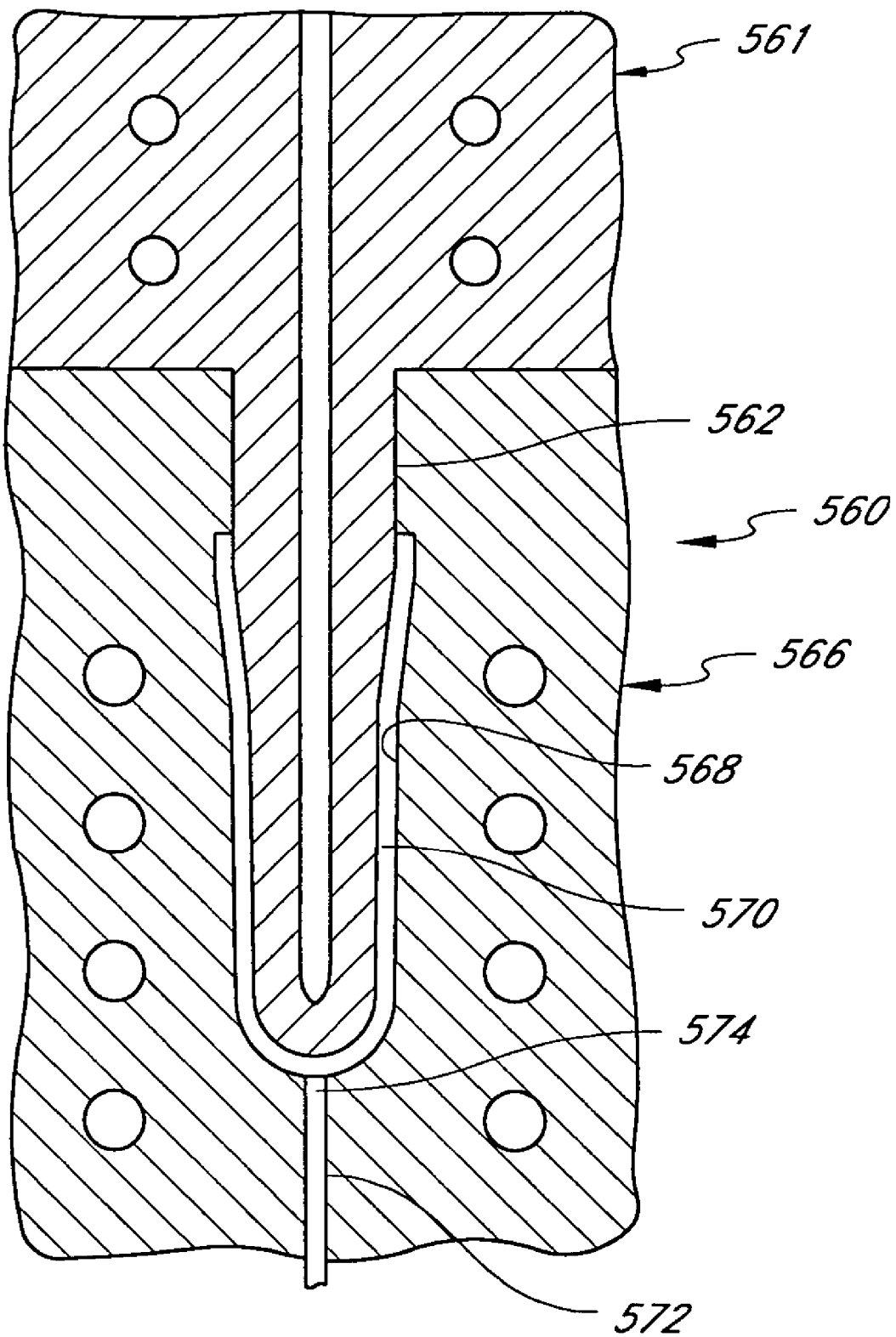
FIG. 30 is a cross-section of a mold of a type that may be used to make an inner layer of the preform of FIG. 11.

The methods and apparatus described herein can be modified to make other preforms disclosed herein. For example, FIG. 30 illustrates a mold that can be used to form an underlying layer of a substrate preform, prior to injecting material. The preform may or may not have a neck finish. For example, the preform can be a neckless preform. A mold 560 has a core section 561 and a cavity section 566 having a cavity section surface 568. The mold 560 comprises a cavity 570 defined by a core 562 of the core section 561 and the cavity section 566. A line 572 can feed melt through a gate 574 and into the cavity 570.

The cavity 570 has a shape corresponding to the desired shape of a portion of a preform. In the illustrated embodiment, the cavity 570 is configured and sized to mold the inner layer 164 of the preform 160 of FIG. 11. However, the cavity 570 can be sized and configured for forming any desired article. For example, the cavity 570 can have a shape corresponding to the shape of an inner layer, such as the inner layers of any of the preforms described above. Melt can be injected into the cavity 570 in the manner described above to form a molded article. The molded article can be removed from the cavity section 566 and then inserted into another cavity section (e.g., a cavity section 580 of FIG. 31) for an overmolding process.

Figure 31:
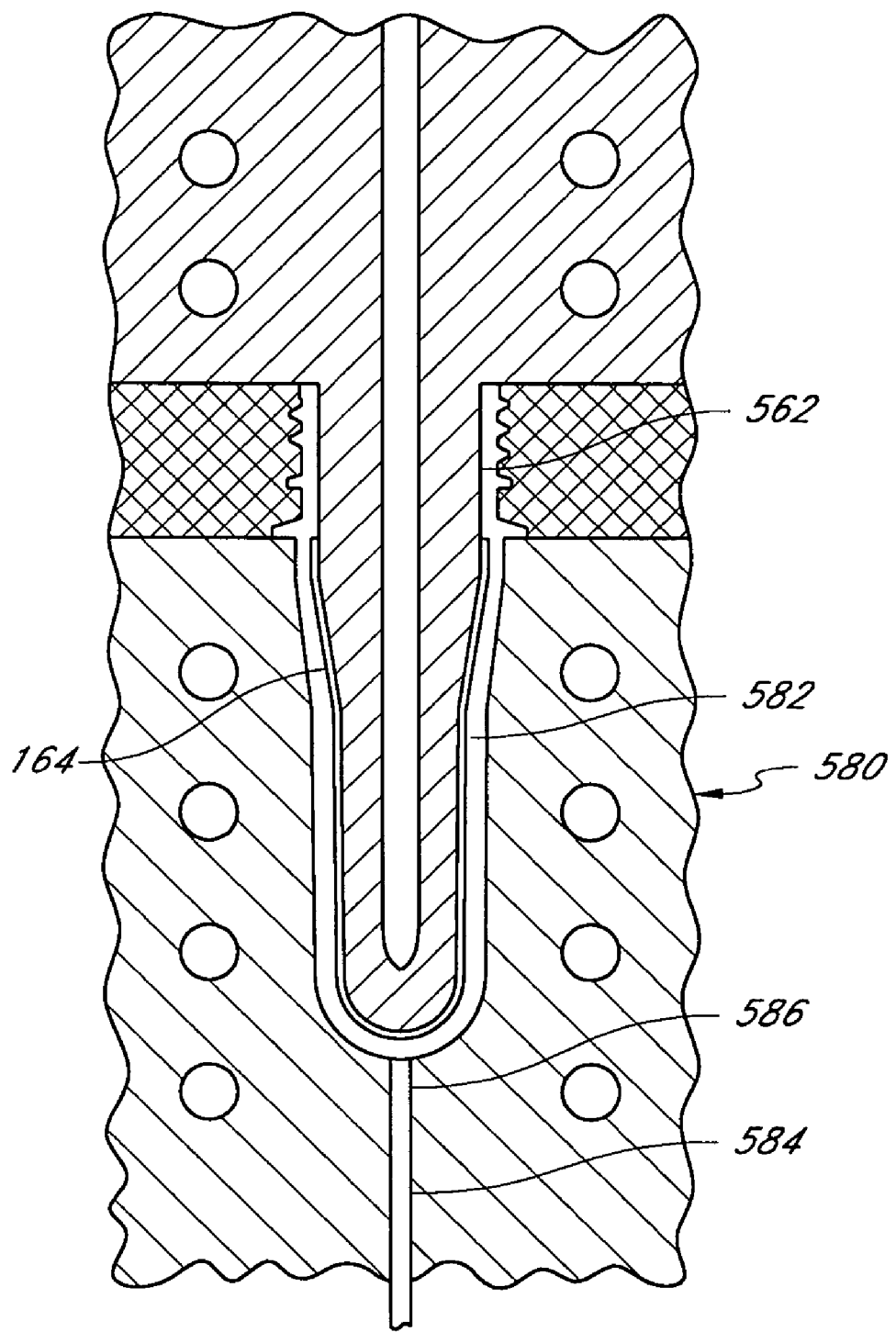
FIG. 31 is a cross-section of a mold of a type that may be used to make an outer layer of the preform of FIG. 11.

The overmolding is carried out by using an injection molding process using equipment similar to that used to form the inner layer 164. As shown in FIG. 31, after the layer 164 is formed in the mold 560 of FIG. 30 the core 562 can be inserted into the cavity section 580. The layer 164 and the cavity section 580 can define a void or cavity 582 corresponding to the shape of the outer layer 162 of the preform 160 of FIG. 11. Generally, the melt is passed along a line 584 and passes through a gate 586 and into the cavity 582. The melt can fill the cavity 582 to form the outer layer 162. After the preform 160 has cooled a sufficient amount, it can be removed from the mold cavity 582. Following overinjection, the overmolded outer layer 162 will take the approximate size and shape of the cavity 582.

To carry out the overmolding procedure, one preferably heats the initial layer 164 which is to be overmolded preferably to a temperature above its $T_g$. In the case of PET, that temperature is preferably about 100 to 200° C., more preferably about 180° C. to about 225° C. If a temperature at or above the temperature of crystallization for PET is used, which is about 120° C., care should be taken when cooling the PET in the preform. The cooling should be sufficient to minimize crystallization of the PET in the preform, especially in the body portion, so that the PET is in the preferred amorphous and/or semi-crystalline state. Alternatively, the initial inner layer 164 may be very recently injection molded and not fully cooled, as to be at an elevated temperature as is sometimes preferred for the overmolding process.

The overmolding material is heated to form a melt of a viscosity compatible with use in an injection molding apparatus. For the some materials such as foam and PP, the inject temperature is preferably in the range of about 375° F. to 550° F.

After the overmolding process, the multilayer preform is preferably cooled at least to the point where it can be displaced from the mold or handled without being damaged, and removed from the mold where further cooling may take place. If the body portion of the preform has been heated to a temperature near or above the temperature of crystallization for the material forming the body portion, the cooling should be fairly rapid and sufficient to ensure that the material is primarily in the semi-crystalline state when the preform is fully cooled. As a result of this process, a strong and effective bonding takes place between the initial layer 164 and the subsequently applied outer layer 162 material. The neck finish may have a greater proportion of crystalline material for increased dimensional stability, especially during subsequent process (e.g., blow molding, hot filling, and the like). In view of the present disclosure, a skilled artisan can select the type and design of the molds to make mono and multilayer articles described herein. The molds and processes for other preform embodiments, including those from above, in view of the disclosure herein. Additional details of molding processes (e.g., by an inject-over-inject molding process) can be found in U.S. Pat. No. 6,352,426 incorporated by reference herein.

3. Methods and Apparatus for Preparing a Closure

Figure 32:
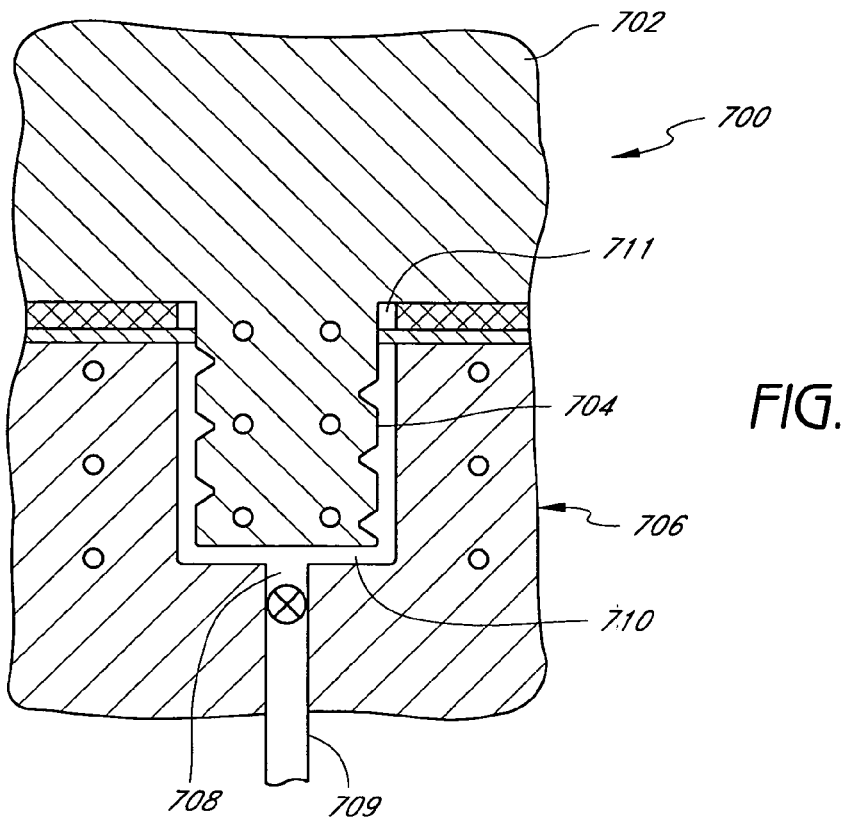
FIG. 32 is a cross-section of a mold of a type that may be used to make a closure.

A closure, such as the closures illustrated in FIGS. 18-21E can be formed by utilizing an injection mold. The molds of FIGS. 31 and 32 are generally similar to the molds illustrated in FIGS. 28 to 31, except as further detailed below.

FIG. 31 illustrates a mold 700 that is configured to form at least a portion of a closure. The mold 700 is defined by a core section 702 having a core 704 and a cavity section 706. In one embodiment, the material (e.g., PET including virgin and/or recycled PET, PP, phenoxy type thermoplastic, expandable/foam material, PP, and/or other suitable material(s)) is passed along a line 709 and passes through a gate 708 and into a cavity 710, which is defined by the core 704 and the cavity section 706. The material can fill the cavity 710 to form at least a portion of a closure. The illustrated cavity 710 is sized and configured in the shape of the inner layer of a body of a closure. However, the cavity 710 can be configured to form the entire closure. The cavity 710 also optionally includes a portion 711 for forming a band and connectors between the body and band of the closure.

Figure 33:
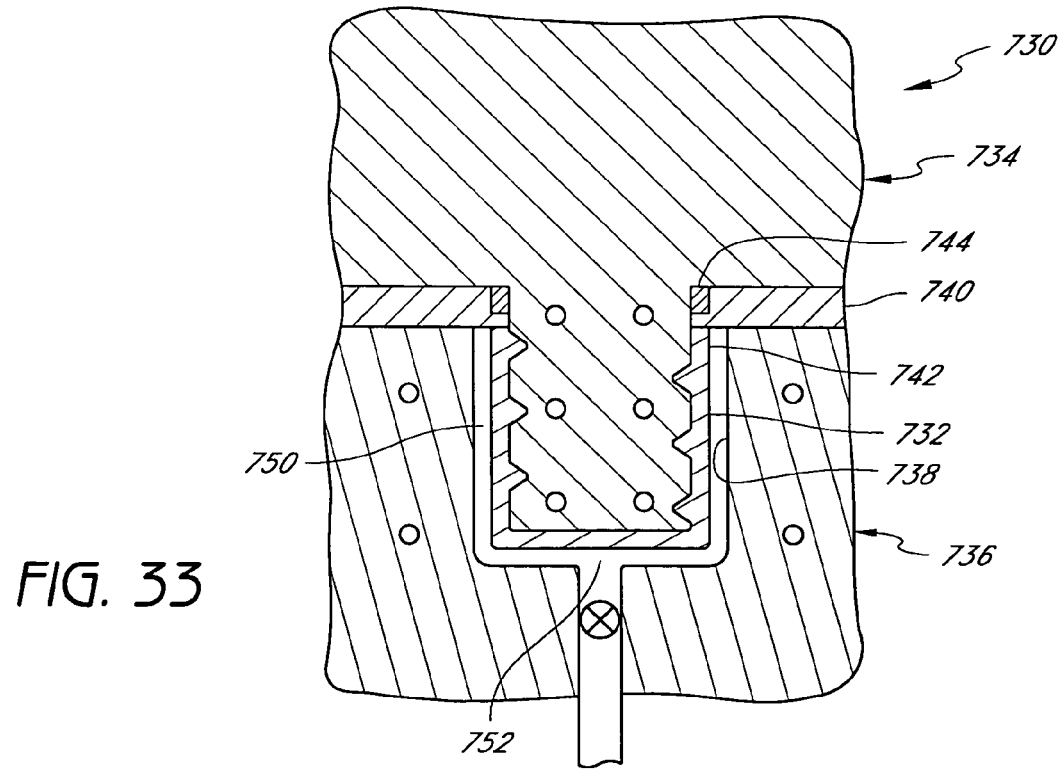
FIG. 33 is a cross-section of a mold of a type that may be used to make an outer layer of the closure of FIG. 20.

The closures described above having multi-layers can be formed through an overmolding process. FIG. 33 illustrates a mold 730 for overmolding. The underlying layer or substrate 732 formed by the mold 700 (FIG. 32) can be positioned in the mold 730 (FIG. 33). The mold 730 has a core section 734 and a cavity section 736 illustrated in the closed position prior to overinjecting. A split ring 740 can engage a portion of the body 742 and a band 744 of the substrate 732. The cavity section 736 comprises a cavity 738 in which the uncoated substrate 732 is placed.

The illustrated substrate 732 is a monolayer portion of a closure; however, the substrate 732 can be a multilayer substrate. In some non-limiting embodiments, the substrate 732 can comprise one or more of the following: PET (e.g., virgin PET and/or recycled PET), polyester, PP, phenoxy, thermoplastics (including phenoxy type thermoplastics, lamellar materials, combinations thereof, and/or the like. The substrate 732 can also be a standard closure that is used to close bottles. A skilled artisan can select the size and configuration of the substrate 732 based on the desired end use of the closure.

As the substrate 732 sits in the mold cavity, the body 742 of the substrate 732 is preferably centered within the cavity and is completely surrounded by a void space 750. The substrate 732, thus positioned, acts as an interior die in the subsequent injection procedure. The melt of the overmolding material is then introduced into the mold cavity from the injector via gate 752 and flows around the substrate 732, preferably surrounding at least the body portion of the substrate 732. Following overinjection, the overmolded layer will take the approximate size and shape of the void space 750.

The mold 730 can be used to form the coated or multilayer closures disclosed herein. In some non-limiting embodiments, the closures of FIGS. 18-21E and 24 can have one or more layers comprising substantially PET, phenoxy type thermoplastics, polypropylene, foam material, and/or other thermoplastics. Optionally, at least one of the layers of the closure can comprise a expandable/foam material. In some embodiments, the closure 302 (FIG. 19) can have the layer 314 of a first material (e.g., PET) and an outer layer of PP (e.g., foamed or non-foamed PP).

The methods and apparatuses disclosed in the references incorporated by reference into the present application can be modified to produce closures. For example, the molding machines, apparatuses, and methods disclosed in U.S. Pat. No. 6,352,426 (see, e.g., FIGS. 10-15, 17-24) can modified to produce closures. For example, the molds can comprise high heat transfer material, cooling channels, tie layer systems, gas insertion systems, and/or the like.

F. Methods and Apparatuses for Depositing Material on a Substrate

Systems for making articles can have one or more apparatuses or systems for depositing a plurality of materials. The molds described above can have one or more delivery systems for depositing material on a substrate, such as an article in the form of a preform, closure, and the like. The deposited material can form at least portion of a tie layer or other layer (e.g., barrier layer). For the sake of convenience, the delivery systems described herein are primarily discussed with respect to molding apparatuses, such as injection molding machines for producing preforms. However, delivery systems can be used to delivery other materials (e.g., barrier materials, plastics including thermoplastics, foam material, and the like) onto substrates in the form of closures, containers (e.g., bottles), sheet, tubes, etc.

Figure 34:
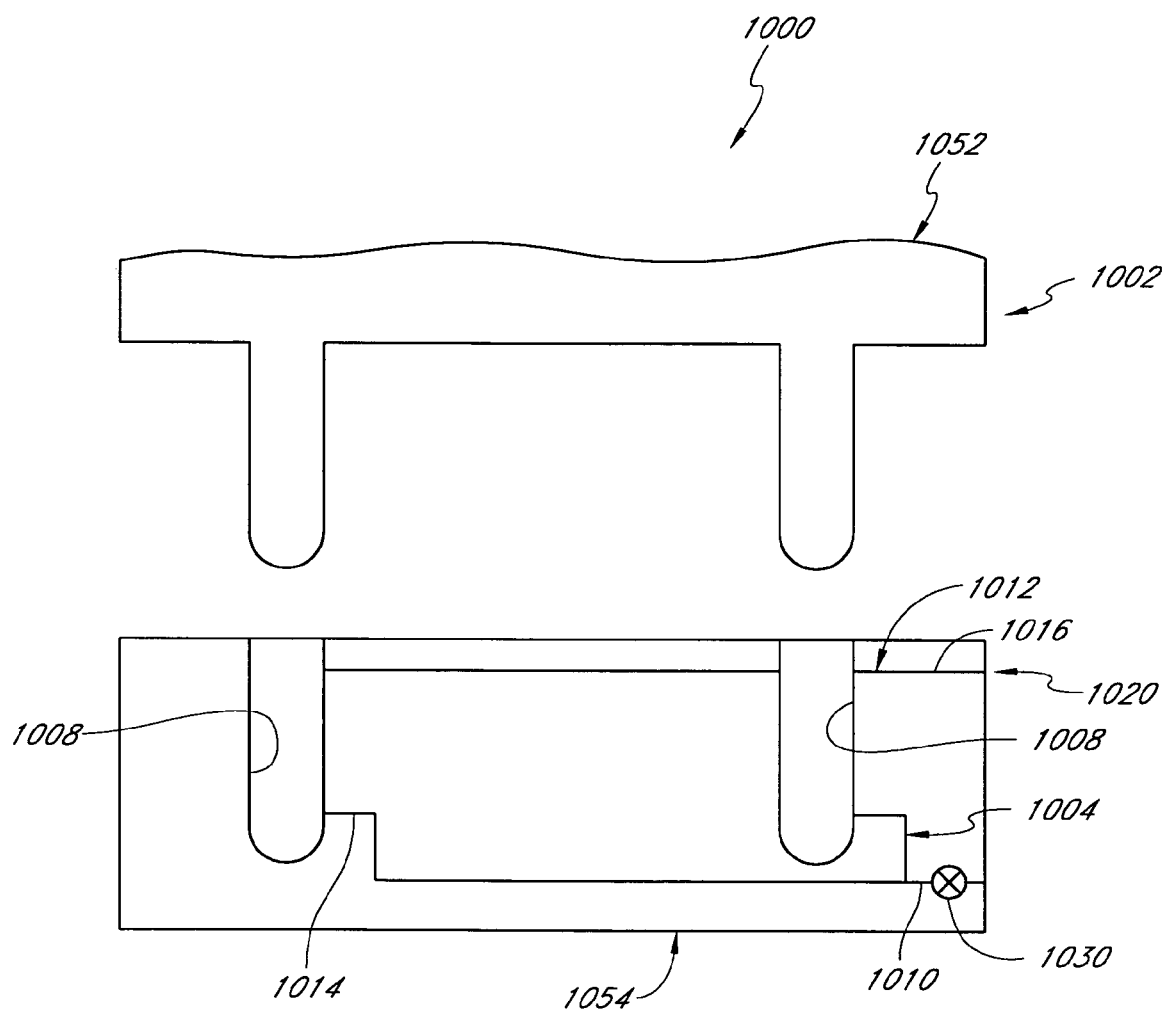
FIG. 34 is a mold system configured to make multi-layer preforms having tie layers.

With reference to FIG. 34, a delivery system 1004 of molding system 1008 can be used in different types of molding systems, such as injection molding system or compression molding system, for example. Molding apparatuses may have a delivery system 1004 for enhancing adhesion between materials and/or to aid in the release of the molded article.

FIG. 33 illustrates a molding system 1000 for producing mono and/or multilayer preforms. The molding system 1000 has the delivery system 1004 and a mold 1002 that is similar to the mold 501 illustrated in FIG. 28, except as further detailed below.

Figure 35:
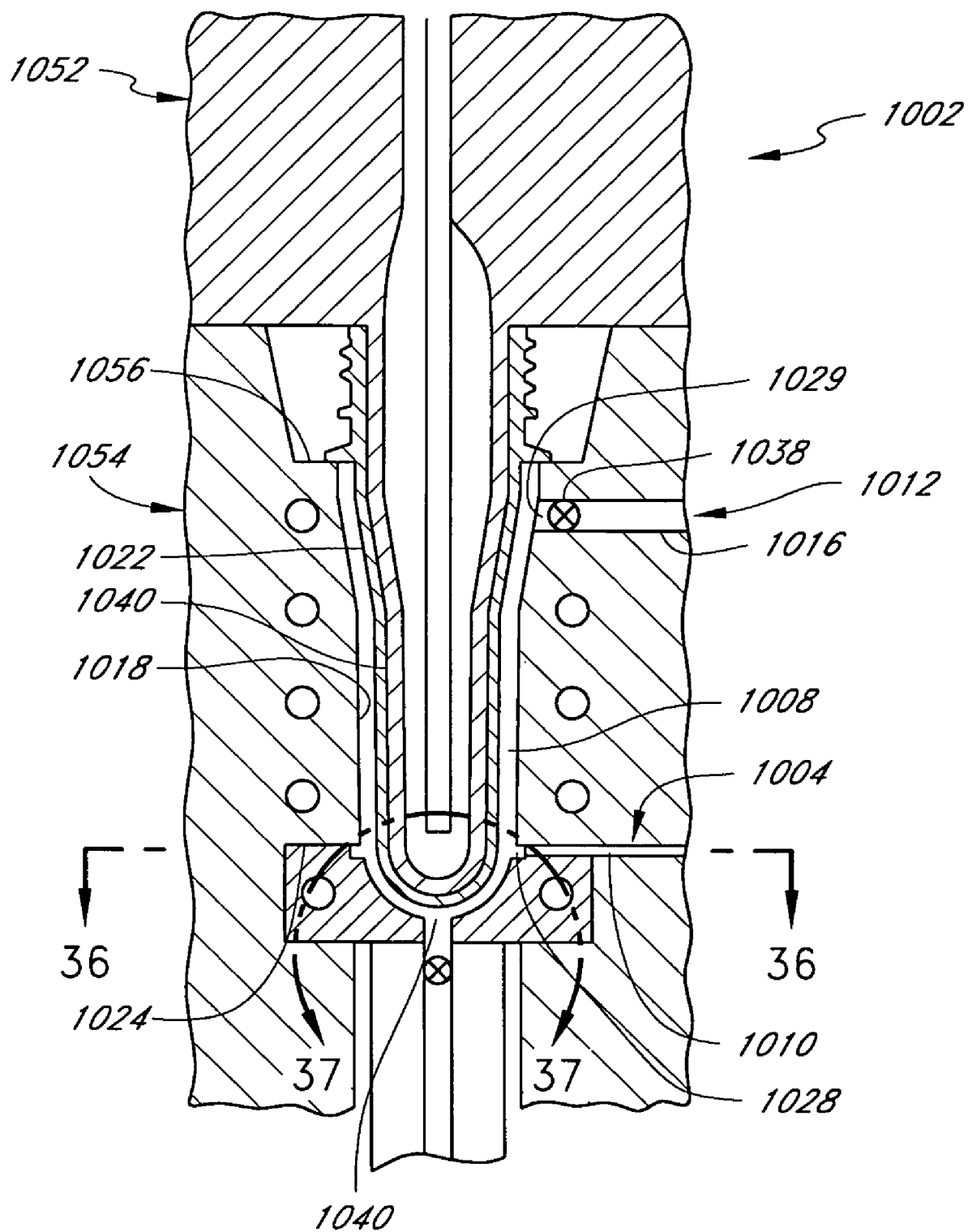
FIG. 35 is a cross-section a mold of the mold system of FIG. 34.

The mold 1002 of FIGS. 34 and 35 is adapted for an overmolding process. The illustrated mold 1002 is configured to overmold a plurality of preforms and comprises a core section 1052 and the cavity section 1054 that cooperate to define a cavity 1008 when the mold 1002 is in the illustrated closed position of FIG. 35.

With respect to FIGS. 34 and 35, the mold 1002 comprises the fluid delivery system 1004 for inserting material, preferably tie material, into the cavity 1008. The fluid delivery system 1004 has a feed line 1010 that receives fluid, preferably pressurized fluid, from a fluid source. An exhaust system 1012 comprises an exhaust line 1016 that is connected to the mold cavity 1008 and a vent 1020 (FIG. 33). The fluid delivery system 1004 injects fluid, preferably tie fluid, through the feed line 1010 and into the cavity 1008 to coat at least a portion of a substrate 1022 (FIG. 35). The illustrated substrate 1022 is in the form of a preform. The preform is then overmolded with a layer of material. The tie fluid preferably forms a tie layer that adheres an overmolded layer to the substrate preform 1022.

The fluid can be removed from the cavity 1008 by passing the fluid through the exhaust line 1016 and out of the vent 1020 (FIG. 34). In some embodiments, a flow or pressurization device (e.g., a pump) can be disposed at some point along the exhaust line 1016 to create a low pressure or vacuum (i.e., suction) to promote the flow of the tie fluid. The suction can be applied with pressurized or non-pressurized tie fluid. The pressurized tie fluid provided by the feed line 1010 and the vacuum can result in selectively controlled flow rates within the cavity 1008. In some embodiments, the tie fluid is delivered into the cavity 1008 and then a vacuum is drawn to remove unused tie fluid. However, the exhaust system 1012 may not have device for creating a vacuum. For example, the exhaust system 1012 may be vented to the atmosphere directly, or through a scrubber to remove any potentially ecologically harmful materials such as VOCs.

The delivery system 1004 can be used to deliver material, preferably coating material, into the mold 1002. In some embodiments, the material is a non tie coating material. As used herein, the term "coating material" is a broad term and is used in accordance with its ordinary meaning and may include, without limitation, tie fluid or material, polymer melt, adhesives, and the like which form a layer on all or part of the surface of the article or layer in the mold. The coating material can provide desired properties to a substrate. In some preferred embodiments, the coating material being adapted to form a structural layer (e.g., a tie layer, polymer layer, barrier layer) on a surface.

As used herein, the term "tie fluid" is a broad term and is used in accordance with its ordinary meaning and may include, without limitation, a fluid that can be deposited on the preform to form a tie, adhesive, or crafting layer and may promote adhesion between materials. For example, the tie fluid can be chemical substance that may promote adhesion between thermoplastic polymers, foams, plastics, other materials described herein, and combinations thereof. The tie fluid can comprise one or more anhydride polymers (e.g., maleic anhydride), acrylate group containing polymers, epoxy group containing polymers, acids, bases, organic solvents, chemical etchants, adhesives, cross-linking agents, and/or other substances for promoting adhesion, phenoxy, and/or phenoxy/polyolefin blends. The tie fluid can comprise one or more of the following: a mist, gas, plasma, particles, liquid, and/or combinations thereof. The tie fluid can be selected based on the materials contacted by the tie fluid. In some embodiments, the tie fluid forms a tie layer adapted or configured to adhere a foam layer to a PET layer. In some embodiments, the tie fluid forms a tie layer which causes a PP layer to adhere more strongly to a PET layer. Additives (e.g., chemicals, microparticles, binders, or the like) can be added to the tie fluid to enhance adhesion characteristics of the tie fluid. Thus, the tie fluid can form a tie layer, such as the tie layer of the container 83 of FIG. 6. In some embodiments, the tie fluid comprises one or more of the tie materials described above. In some instances, the terms "tie fluid" and "tie material" are used interchangeably herein.

Figure 37:
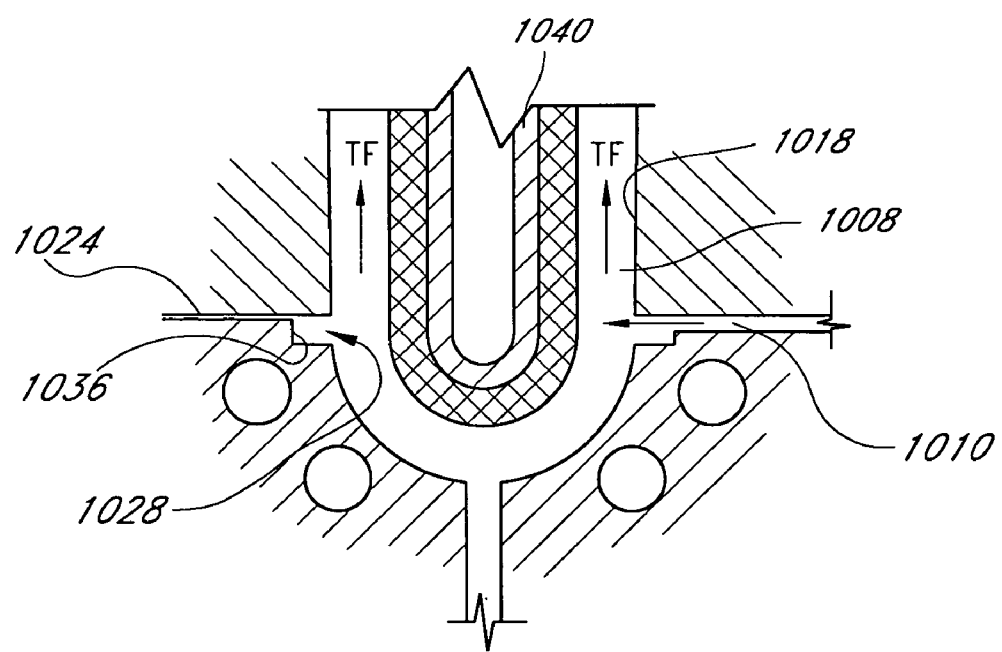
FIG. 37 is a cutaway close up view of the area of FIG. 35 along 37-37.

As shown in FIGS. 35 and 37, the delivery system 1004 may be formed at a joint 1024 between members of the mold cavity surface 1018. An outlet or outlet 1028 is positioned along the mold cavity surface 1018 and preferably spaced from a gate 1040. The gate 1040 can be configured to inject material (e.g., melt, molten polymer, and the like) into the cavity 1008. The illustrated outlet 1028 is formed circumferentially around at least a portion the cavity 1008. The outlet 1028 is sufficiently small that substantially no molten material will enter during melt injection. Alternatively, the outlet 1028 may comprise one or more individual openings or apertures. Optionally, the feed line 1010 has a valve system 1030 (FIG. 34) for selectively controlling the flow of fluid through the feed line 1010. The valve system 1030, if present, can be located at any point along the feed line 1010. In some embodiments, including the illustrated embodiment of FIG. 34, a valve system 1030 is positioned upstream of a plurality of cavities 1008. The valves selectively permit or inhibit flow through the feed line 1010 to the cavities. The valve system 1030 is preferably embedded in the material forming the cavity section 1054. Although not illustrated, the valve system 1030 can be located proximate to an outlet (e.g., the outlet 1028) of the feed line 1010.

The valve system 1030 can be operated in response to pressure, such as positive or negative pressures and can comprise one or more valves, such as a lift type check valve. In one embodiment, the lift type check valve is a ball check valve having a ball and seat arrangement. Pressure within the feed line 1010 may lift the ball away from the seat, but pressure in the opposite direction will force the ball against the seat and prevent flow in the reverse direction. Typically there is also a spring to bias the ball into contact with the seat. When the pressure within the feed line 1010 overcomes the bias of the spring, the ball can be displaced from the seat allowing flow to the cavity 1008 (FIG. 35). In some embodiments, negative pressure can cause fluid to flow through the valve system 1030. For example, if there is a negative pressure in the cavity 1008, it can cause fluid through the valve system 1030. Alternatively, the valve system 1030 can be mechanically controlled independent of pressure. For example, the valve system 1030 can comprise one or more valves (e.g., gate valves, globe valves, and the like). The valve system 130 can be operated to deliver a determined amount of tie fluid to the cavity 1008.

The outlet 1028 of FIG. 35 can be located at any point along the mold cavity surface 1018. The position of the outlet 1028 can be determined on the desired fluid flow about the preform. For example, the illustrated mold 1002 of FIG. 35 has the outlet 1028 positioned near or at the portion of the mold cavity 1008 corresponding to the end cap of the preform. The fluid provided by the feed line 1010 can flow around the end cap of the preform and proceeds upwardly along the cavity 1008 to the exhaust line 1016, thereby depositing material on at least a portion of the preform. The illustrated mold 1002 is configured to deposit tie fluid on the body portion of the preform. As shown in FIG. 37, the outlet 1028 is preferably formed by a step 1036 of between about 0.05 mm (0.002 inches) and about 0.127 mm (0.005 inches) and most preferably about 0.076 mm (0.003 inches) in depth. Because of its small size, the outlet 1028 generally will not fill with melt during injection but will enable fluid (tie fluid, air, and/or other fluids) to be delivered out of the outlet 1028. In some embodiments, fluid (e.g., air, tie fluid, etc.) can pass through the outlet 1028 to clear out any material within the outlet 1028. Although not illustrated, the outlet 1028 can be positioned at other locations along the surface 1018. For example, the outlet 1028 can be position at a location along the surface 1018 corresponding to the body, neck finish, and/or support ring of the preform. For example, the outlet 1028 can be positioned near the end cap region of the mold, below the support ring of the preform, at the neck finish of the preform, or at body portion of the preform. Additionally, a plurality of outlets 1028 can be positioned along the surface 1018. A skilled artisan can select the size, configuration, and placement of the outlet 1028 to achieve the desired deposition of material on the substrate. The outlets 1028 can be positioned on the same or opposing side of the preform as an inlet configured to receive unused tie fluid. For example, an outlet 1028 can be diametrically spaced from an inlet. In the illustrated embodiment, the inlet 1029 and the outlet 1028 are positioned on the same side of the preform.

With reference to FIGS. 34 and 35, the exhaust line 1016 is configured to draw in fluid from the cavity 1008 (FIG. 35). The exhaust line 1016 then delivers the tie fluid to the vent 1020, or recirculation system so that fluid can be passed through the cavity 1008 again. The exhaust line 1016 can have a valve system 1038 that can be similar to the valve system 1030 and therefore will not be described in further detail.

Figure 36:
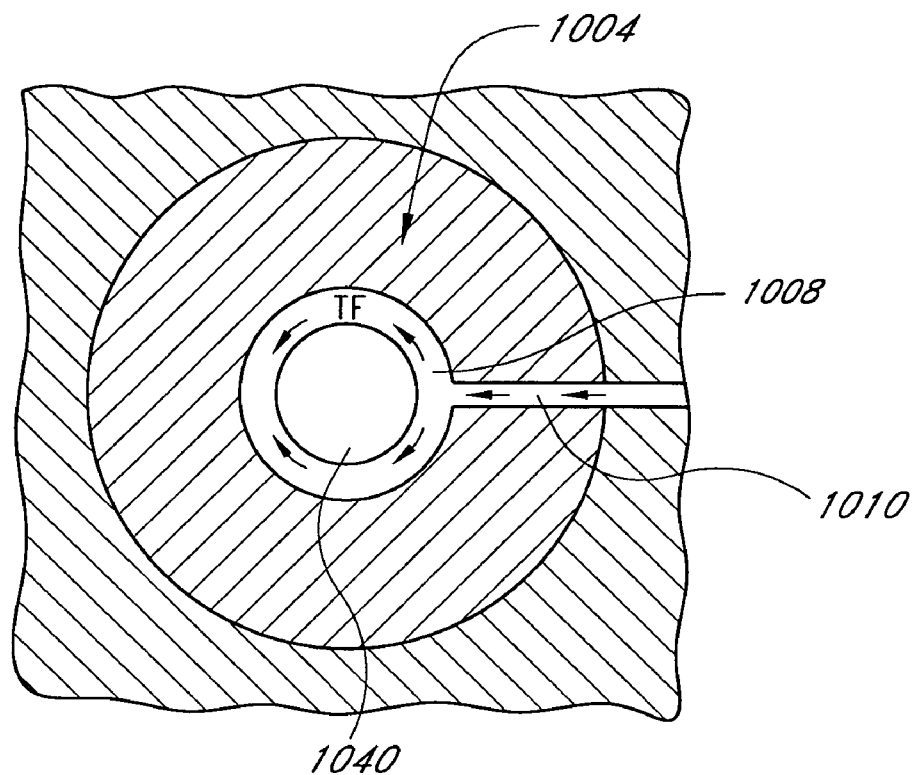
FIG. 36 is a cross-section of the mold of FIG. 35 taken along lines 36-36.

In operation, after the preform is positioned in the mold 1002, the valve system 1030 permits fluid to flow through the feed line 1010 and into the cavity 1008. As shown in FIGS. 36 and 37, the tie fluid TF can flow through the cavity 1008 and coat at least a portion of the exterior surface of the preform. Preferably, the tie fluid TF coats a substantial portion of the preform forming the interior surface defining the cavity 1008. In some embodiments, including the illustrated embodiment, the tie fluid TF forms a thin layer of material on most of the body portion of the preform, or a generally uniform continuous or discontinuous coating. However, the tie fluid TF can coat any portion of the preform exposed to the fluid. For example, the thread finish and the body portion can be coated with the tie fluid, if the cavity 1008 is defined by both the thread finish and the body portion of the preform.

To enhance coating of the preform, the mold 1002 can selectively control the temperature of the preform. In one embodiment, the core 1040 of FIG. 35 heats or cools the preform to promote coating of the preform. A skilled artisan can select the desired temperature of the preform depending on the properties of the tie fluid that coats the preform. Alternatively, the preforms can be electrostatically charged to promote coating of the preform. In other embodiments, the preform can be physically or chemically roughened or textured to enhance coating of the preform. Optionally, the mold cavity surfaces 1018 can be thermally controlled to enhance coating of the preform. For example, the mold cavity surface 1018 can be chilled to ensure that gases in the cavity 1008 generally remain in gas phase.

Optionally, the temperature of the tie material can be selectively controlled. For example, the tie material may include tie fluid that is heated to reduce the viscosity of the tie fluid to facilitate spreading of the tie fluid. Heaters and/or chillers can be employed to control the temperature of the tie material.

As the delivery system 1004 feeds tie fluid into the cavity 1008, the tie fluid coats the preform and may flow out of the cavity 1008 and into the exhaust system 1012. After the preform has been coated, or after a predetermined period of time, the delivery system 1004 can reduce, or preferably stop the flow of fluid into the cavity 1008. The coating on the preform can form a tie layer for tying the substrate preform 1022 to a material that is subsequently injected through the gate 1040 into the cavity 1008. If the tie material is a solvent/solute, the flow can be reduced or stopped and the cavity 1008 can be vented. The feed line 1010 can deliver a gas or vapor (e.g., air, inert gases such as nitrogen, or other gases) to purge the cavity 1008. The exhaust system 1012 can optionally provide a negative pressure causing gas or vapor in the cavity 1008 to be removed. In this manner, one or more solvents can be removed in order to achieve desirable characteristics of the tie layer and/or overmolded material.

During melt injection, the valve system 1030 is preferably closed. The melt injected through the gate 1040 proceeds up along and fills the cavity 1008. In some embodiments, excess tie fluid is pushed out of the mold cavity 1008 by the injected melt stream. Thus, the melt stream can cause tie fluid to be removed from the cavity 1008. For example, if the tie fluid is a gas, the gas can be forced out of the cavity 1008 by the advancing melt stream. The tie coating formed on the preform can be spread on the preform by the melt stream. As the melt stream proceeds along the cavity 1008, the melt stream can push and spread the tie material about the surface of the preform to ensure that at least a portion of the body portion, preferably most or all of the body portion, is coated with a tie material. A skilled artisan can determine the appropriate location of the outlet 1028 based on the properties of the tie layer and melt stream to achieve the desired tie layer in the container produced from the preform.

With reference to FIG. 35, during the injection of the melt stream, the valve system 1038 can be opened to allow tie fluid to escape from the cavity 1008. The valve system 1038 can be closed after a predetermined amount of melt stream has been injected to prevent or inhibit melt from entering the exhaust line 1016. Additionally, the inlet 1029 of the exhaust line 1016 can have a small size so that melt will not substantially enter therein, but will enable fluid (tie fluid, air, and/or other fluids) to be delivered into the exhaust line 1016.

Optionally, when injection is complete, pressurized fluid, preferably air, is supplied to the outlet 1028 in order to defeat a vacuum that may form between a preform and the cavity wall. The supply of air is delivered to the outlet 1028 at a pressure between about 75 psi (about 0.52 MPa) and 150 psi (about 1.03 MPa) and most preferably about 100 psi (about 0.69 MPa). In other embodiments, the preform is removed from the mold cavity 1018 without the aid of pressurized fluid from the feed line 1010. Additionally, similar delivery systems may be utilized in other portions of the mold, such as the thread area, for example but without limitation.

Optionally, the core section 1052 and the cavity section 1054 can cooperate to form a seal to inhibit or prevent the tie fluid from escaping into the environment surrounding the mold 1002 illustrated in FIG. 35. Thus, if the tie fluid has volatile organic compounds (VOCs) or other substances undesirable for inhalation or the environment, the tie fluid can be contained within the mold 1002. The mold 1002 can circulate and reuse the tie fluid to also reduce waste. The tie fluid can be vented via the exhaust system 1012 or by another means. If the tie fluid is suitable for release into the atmosphere, the tie fluid can be vented to the atmosphere. For example, the tie fluid can escape between, the preform and the ledge 1056 and then may proceed between the core section 1052 and the cavity section 1054 and out into the atmosphere.

The preform can be coated with a tie material before the mold 1002 is in the fully closed position. The tie material can be deposited on the substrate preform as the preform is inserted and advanced into the cavity section 1054. Thus, the preform is coated with tie material when the preform is proximate to or at least partially within the cavity section 1054. In some embodiments, the delivery system 1004 outputs fluid when the mold 1002 is in a partially or fully opened position. In one embodiment, the delivery system 1004 injects tie fluid into the cavity 1008 as the mold 1002 is moved from an open position to the illustrated closed position of FIG. 35. As the preform is advanced into the cavity section 1054, the tie fluid flows upwardly through the cavity 1008 and coats at least a portion of the preform. Before the mold 1002 is in the closed position, the tie fluid can escape into the atmosphere. Thus, the mold 1002 may or may not have an exhaust system 1012. For example, if the tie material is deposited before the mold 1002 is in the closed position, the mold 1002 preferably does not have the exhaust system 1012. If the tie material is deposited after the mold 1002 is in the closed position, the mold 1002 preferably has an exhaust system 1012, especially when the tie fluid is not suitable for venting directly to the atmosphere.

Figure 38:
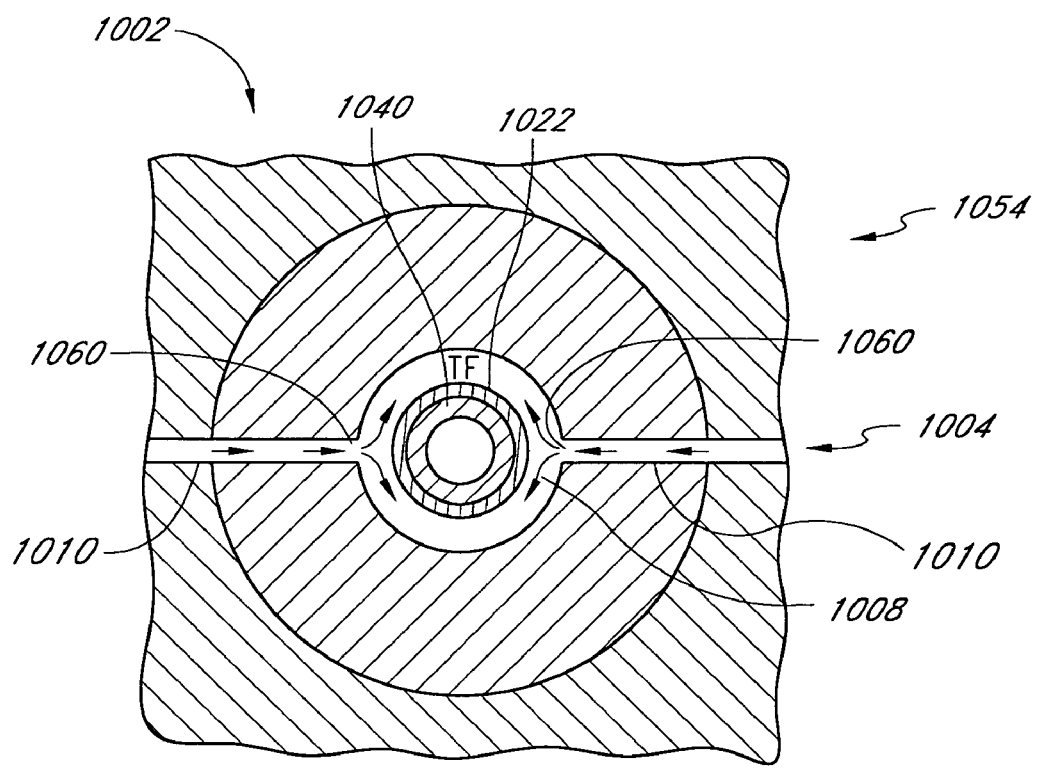
FIG. 38 is a cross-section of a modified mold of FIG. 35 taken along lines 36-36.

FIG. 38 illustrates another embodiment of the delivery system 1004. The delivery system 1004 has a plurality of inlets 1060 for injecting or delivering fluid (e.g., tie fluid, air, etc.) into the cavity 1008. The fluid can be delivered in response to positive pressure in the feed line 1010, or drawn into the cavity 1008 under a negative pressure. In the illustrated embodiment, the mold 1002 has a feed line 1010 connected to each inlet. The delivery system 1004 having a plurality of outlets 1060 may promote more uniform coating of the preform 1022.

Figure 39:
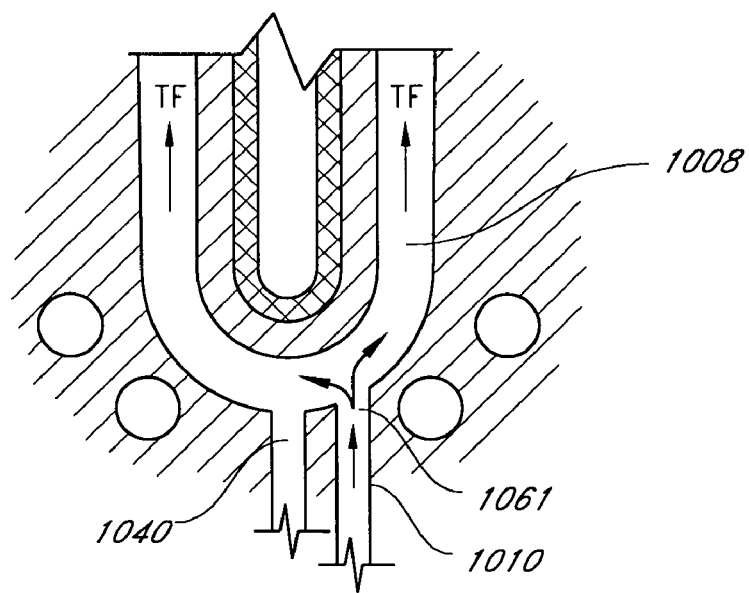
FIG. 39 is a cutaway close up view of a modified mold of FIG. 35 along 37-37.

The delivery system 1004 of FIG. 39 has an inlet 1061 defined by the end cap region. The position of the inlet 1061 results in generally uniform unidirectional flow through the cavity 1008. In some embodiments, the feed line 1010 delivers tie fluid in the form of a liquid that douses the end cap of the preform. After an amount of tie fluid has been delivered, melt can be delivered into the cavity 1008 through the gate 1040. The melt spreads the tie material on the surface of the preform.

Other apparatus disclosed herein can be used to deposit tie material on articles. For example, the molds of FIGS. 28, 30, 31 can be modified to deposit tie material on the inner layer or underlying substrate.

Optionally, the delivery system 1004 can be connected to the line that delivers melt into a cavity. For example, the feed line 1010 can feed tie fluid into a line through a gate to coat a substrate. After the substrate is coated, the melt can be injected through the same line and gate to form an outer layer.

Additionally, the insertion system of the mold (e.g., the mold illustrated in FIG. 26) of U.S. Pat. No. 6,352,426 and the other incorporated applications and patents can inject tie fluid to both coat a preform and aid in the release of the preform. The coated substrate preform can then be overmolded. The delivery system (or insertion systems) can be used to delivery other materials (e.g., one or more of the materials discloses herein) onto articles. For the sake of simplicity, the apparatuses were described delivering a tie fluid. However, it is to be understood in many cases that other materials may be delivered out by the apparatuses described above. For example, the tie material or fluid can be replaced with colorant, chemical, melt, polymer, powder, coating material, barrier material, and/or any other material suitable for coating at least a portion of a substrate.

G. Preferred Articles

Generally, preferred articles described herein include articles comprising one or more materials. The material(s) may form one or more layers of the articles. The layers of the articles may preferably provide some functionality and may be applied as multiple layers, each layer having one or more functional characteristics, or as a single layer containing one or more functional components. The articles may be in the form of packaging, such as preforms, closures, containers, etc. The materials, methods, ranges, and embodiments disclosed herein are given by way of example only and are not intended to limit the scope of the disclosure in any way. The articles disclosed herein can be formed with any suitable material disclosed herein. Nevertheless, some articles and materials are discussed below. In view of the present disclosure, embodiments and materials can be modified by a skilled artisan to produce other alternative embodiments and/or uses and obvious modifications and equivalents thereof.

1. General Description of Preferred Materials Forming Articles a. Non-limiting Articles Comprising Foam Material Articles may comprise foam material. In some non-limiting embodiments, foam material can form a portion of an article, such as the body or neck finish of a preform. In some non-limiting embodiments, foam material comprises less than about 90% by weight, also including less than about 10%, 20%, 30%, 40%, 50%, 60%, 70%, 80% by weight, of the article (such as a preform, closures, container, sheet, etc.). In some non-limiting embodiments, the foam material comprises about 5-30% by weight of the article. In some non-limiting embodiments, the foam material comprises about 20%-60% by weight of the article. In some non-limiting embodiments, the foam material comprises about 10%-30% by weight of the article. In some embodiments, the foam material comprises more than about 90% by weight of the article. The foam material can form most or all of the article. The foam material may result in reduced weight articles as compared to conventional articles and therefore may desirably reduce the transportation cost of the articles. Additionally, foam material can reduce the amount of material that is used to form the articles, since the foam material may have a substantial number of voids.

The foam material can be made from expandable material. For example, at least a portion of an article can comprise expandable that has a first density that is reduced when the expandable material is expanded. In some non-limiting embodiments, a first material, preferably expandable material, has a first density and the second material, preferably foam material, made from the first material has a second density. The second density is less than about 95%, 90%, 80%, 70%, 50%, 30%, 20%, 10%, 5%, 2%, 1% and ranges encompassing such percentages of the first density. In some non-limiting embodiments, the second density is in the range of about 30% to 60% of the first density. Thus, foam material with a low density relative to an expandable material can be made.

It is contemplated that articles may comprise any suitable amount of foaming agent including those above and below the particular percentages recited above, depending on the desired use of the articles.

b. Non-limiting Articles Comprising Phenoxy Type Thermoplastic Material

Articles may comprise phenoxy type thermoplastics, such as phenoxy and blends (e.g., polyolefin-phenoxy blend), PET-phenoxy, and combinations thereof). In some non-limiting embodiments, the phenoxy type thermoplastic can form a portion of the article, such as at least a portion of the interior surface of the preform, closure, container, etc. In some non-limiting embodiments, the phenoxy type thermoplastic comprises less than about 30% by weight, also including less than about 1%, 2%, 5%, 7.5%, 10%, 12%, 15%, 20%, 25%, 50% by weight, of the article. In another non-limiting embodiment, the phenoxy type thermoplastic comprises about 1-4% by weight of the article. In another non-limiting embodiment, the phenoxy type thermoplastic comprises about 1-15% by weight of the article. In another non-limiting embodiment, the phenoxy type thermoplastic comprises about 7-25% by weight of the article. In another non-limiting embodiment, the phenoxy type thermoplastic material comprises about 5-30% by weight of the article. In some embodiments, the phenoxy type thermoplastic forms a discrete layer or a layer blended with another material. In some embodiments, a discrete layer comprises phenoxy type thermoplastic that forms about 0.1% to 1% by weight of the article. In some embodiments, a discrete layer comprise phenoxy type thermoplastic that forms about 0.1% to 1% by weight of the article. In some embodiments, the phenoxy type thermoplastic is blended with a polymer material (e.g., PET, polyolefin, combinations thereof) and can comprise more than about 0.5%, 1%, 2%, 5%, 7.5%, 10%, 12%, 15%, 20%, 25%, 50%, 70% by weight of the article. It is contemplated that these percentages can be by volume in certain embodiments. The phenoxy type thermoplastic may result in articles having one or more of the following properties: desirable flavor scalping, color scalping, oxygen barrier, recyclable, and/or other properties especially well suited for food contact. These percentages may result in effective desirable characteristics while minimizing the amount of phenoxy type thermoplastic used, thus providing a cost effective article.

Various combinations of phenoxy type thermoplastic with polyethylene, polypropylene, foam material, and the like can be used to produce preforms, containers, and other packaging of relatively larger sizes and having desirable characteristics, especially when the phenoxy type thermoplastic forms the surface of the packaging that contacts foodstuffs. Phenoxy type thermoplastics can provide desirable adhesive between a layer comprising PET and a layer comprising PP.

It is contemplated that articles may comprise any suitable amount of phenoxy type thermoplastics including those above and below the particular percentages recited above, depending on the desired use of the articles.

2. Articles in the Form of Preforms/Containers

Foam material may form one or more portions of layers of the articles (such as packaging including preforms and containers). The preform 30 of FIG. 1 can comprise a foam material. In some embodiments, the preform 30 comprises mostly foam material. In some embodiments, the preform 30 can comprise a phenoxy type thermoplastic formed through a molding process. For example, the preform 30 may comprise mostly a phenoxy type thermoplastic. In some embodiments, the preform 30 may be formed by a co-injection process, wherein the interior portion and exterior portions of the preform 30 comprise different materials. The co-injected material can be compressed into a desired shape. For example, the preform 30 may have an interior portion that comprises one or more of the following: phenoxy type thermoplastic, PET, PETG, expandable/foam materials or the like. The outer portion of the preform 30 can comprise one or more of the following: polyethylene, polypropylene (including clarified polypropylene), PET, combinations thereof, and the like. Optionally, a portion of the preform 30 may comprise foam material.

In some embodiments, the preform 30 can be coated with a layer to enhance its barrier characteristics. For example, the preform 30 can be coated with a barrier material. For example, U.S. application Ser. No. 10/614,731 (Publication No. 2004-0071885), which is incorporated in its entirety and describes systems and methods of coating preforms. This system and other systems disclosed or incorporated herein can be employed to form a barrier layers described herein. The coated preform can then be overmolded with another material to form an outer layer.

With respect to FIG. 5, the preform 50 can comprises an uncoated preform 39 coated with a foam layer 52. Preferably, the uncoated preform 39 comprises a polymer material, such as polypropylene, polyester, PET, PETG, phenoxy type thermoplastics, and/or other thermoplastic materials. In one embodiment, for example, the uncoated preform 39 substantially comprises polypropylene. In another embodiment, the uncoated preform 39 substantially comprises polyester.

The foam layer 52 may comprise either a single material or several materials (such as several microlayers of at least two materials). In some non-limiting embodiments, the foam layer 52 can comprise about 2%, 5%, 10%, 20%, 30%, 40%, 50%, 60%, 70%, 80%, 90%, and ranges encompassing such percentages of the preform. In some embodiments, the foam layer 52 comprises about 2% to about 90% of the preform. In some non-limiting embodiments, the foam layer 52 can comprise about 5% to about 50% of the preform. In some embodiments, the foam layer 52 comprises about 10% to about 30% of the preform. In some non-limiting embodiments, the foam layer 52 can comprise about 5% to about 25% of the preform. In some non-limiting embodiments, the foam layer 52 can comprise less than about 20% of the preform. It is contemplated that these percentages can be by weight or by volume in different embodiments. The foam layer 52 may comprise foam material that is not expanded. The outer layer 52 of the preform 50 may have a thickness, preferably the average wall thickness, of about 0.2 mm (0.008 inches) to about 0.5 mm (0.02 inches). In another non-limiting embodiment, the outer layer 52 has a thickness of about 0.3 mm (0.012 inches). In some embodiments, the average wall thickness is taken only along the body portion of the preform 50. In some non-limiting embodiments, the outer layer 52 comprises less than about 90% of the average thickness of a wall of the preform 50, also including less than about 80%, 70%, 60%, 50%, 40%, 30%, 20%, 10%, 9%, 8%, 7%, 6%, 5% of the average thickness of a wall of the preform 50.

The foam layer 52 may comprise microspheres that are either not expanded or partially expanded, for example. Further, the foam layer 52 can be generally homogenous or generally heterogeneous. Although not illustrated, the foam layer 52 can form other portions of the preform 50. For example, the foam layer 52 can form at least a portion of the inner surface of the preform 50 or a portion of the neck portion 32.

In some embodiments, the inner layer 54 can comprise one or more of the following: polyethylene, PET, polypropylene (e.g., foamed polypropylene, non foamed polypropylene, clarified polypropylene), combinations thereof, and the like. For example, the preform 50 can comprise an outer layer 52 of polypropylene (preferably foamed) and an inner layer 54 comprising PET. Optionally, a tie layer can be interposed between the layers 52, 54 and may comprise a phenoxy type thermoplastic.

In some embodiments, a barrier layer can be interposed between the layers 52, 54. The barrier layer can inhibit or prevent egress and/or ingress of one or more gases, UV rays, and the like through the walls of a container made from the preform 50.

In some embodiments, second layer 54 comprises polypropylene. The polypropylene may be grafted or modified with maleic anhydride, glycidyl methacrylate, acryl methacrylate and/or similar compounds to improve adhesion. In one embodiment, the polypropylene further comprises nanoparticles. In a further embodiment, the polypropylene comprises nanoparticles and is grafted or modified with maleic anhydride, glycidyl methacrylate, acryl methacrylate and/or similar compounds.

With reference to FIG. 6, the container 83 can be used as a carbonated beverage container, the thickness 44, preferably the average wall thickness, of the outer layer 52 of the container 83 that is about 0.76 mm (0.030 inch), 1.52 mm (0.060 inch), 2.54 mm (0.10 inch), 3.81 mm (0.15 inch), 5.08 mm (0.2 inch), 6.35 mm (0.25 inch), and ranges encompassing such thicknesses. In some embodiments, the outer layer is preferably less than about 7.62 mm (0.3 inch), more preferably about 1.27 mm (0.05 inch) to 5.08 mm (0.2 inch). The outer layer 52 may comprise foam material having a thickness more than about 3.81 mm (0.15 inch). In some non-limiting embodiments, the outer layer 52 has a thickness in the range of about 0.127 mm (0.005 inch) to about 0.635 mm (0.025 inch).

In some non-limiting embodiments, the thickness 46 of the inner layer 54, preferably the average thickness, of the inner layer 54 is preferably about 0.127 mm (0.005 inch), 0.635 mm (0.025 inch), 1.07 mm (0.040 inch), 1.52 mm (0.060 inch), 2.03 mm (0.080 inch), 2.54 mm (0.100 inch), 3.05 mm (0.120 inch), 3.56 mm (0.140 inch), 4.07 mm (0.160 inch), and ranges encompassing such thicknesses. In some embodiments, the inner layer 54 of the container 83 has a thickness of less than about 2.54 mm (0.1 inch) to provide a cost effective food barrier. In some non-limiting embodiments, the inner layer 54 has a thickness in the range of about 0.127 mm (0.005 inch) to about 0.635 mm (0.025 inch). The overall thickness 48 of the wall of the container can be selected to achieve the desired properties of the container 83.

To enhance barrier characteristics of the container 83, the container 83 can have a barrier layer. On or more barrier layers can be formed on the interior surface of the inner layer 54, between the layers 52, 54, on the exterior of the outer layer 52, and the like. For example, the outer layer 52 of the container (or the preform that makes the container 83) can be coated with barrier material by using methods disclosed herein. For example, the barrier layer can be formed by using apparatuses, methods, and systems disclosed in U.S. application Ser. No. 10/614,731 (Publication No. 2004-0071885), which is incorporated in its entirety. Additionally, in some embodiments, the container 82 comprises substantially closed cell foam that may inhibit the migration of fluid through the foam. For example, the foam can be a barrier that inhibits, preferably prevents, migration of $CO_2$ gas through the wall 84 of the container 83 formed from the preform.

The preform 60 of FIG. 11 has an inner layer 164 that comprises a first material and the outer layer 162 preferably comprises another material. In some non-limiting embodiments, the layer 162 can comprise about 2%, 5%, 10%, 20%, 30%, 40%, 50%, 60%, 70%, 80%, 90%, and ranges encompassing such percentages of the preform. In some embodiments, the foam layer 162 comprises less than about 97% of the preform. In some embodiments, the layer 162 comprises about 5% to about 99% of the preform. In some non-limiting embodiments, the layer 162 can comprise less than about 90% of the preform. In some non-limiting embodiments, the layer 162 can comprise about 40% to 80% of the preform. In some non-limiting embodiments, the layer 162 can comprise about 60% to 90% of the preform. In some non-limiting embodiments, the layer 162 can comprise more than about 60% of the preform. It is contemplated that these percentages can be by weight or by volume in different embodiments. In some embodiments, the outer layer 162 can comprise foam material and the inner layer 164 can comprise a polymer material, such as PET (e.g., virgin or post-consumer/recycled PET). The foam layer 162 may comprise foam material that is not expanded. For example, the foam layer 162 may comprise microspheres that are either not expanded or partially expanded, for example. The foam layer 162 may provide a desirable insulating layer when the preform 160 is molded into a container.

Preferably, a substantial portion of the outer layer 162 comprises foam material and a substantial portion of the inner layer 164 comprises PET or other material for contacting foodstuffs. In one non-limiting embodiment, the foam material comprises PP and expandable microspheres. In yet another embodiment, the outer layer 162 comprises PP and the inner layer 164 can comprise PET. Preferably, a substantial portion of the outer layer 162 comprises PP and a substantial portion of the inner layer 164 comprises PET. In one non-limiting embodiment, the outer layer 162 comprises generally entirely PP. In yet another embodiment, substantial portions of the inner layer 164 and outer layer 162 can comprise foam material. The preforms 76, 132 may similarly comprise foam material and material suitable for contacting foodstuffs.

In some embodiments, the inner layer 164 may comprise one or more of the following: PET, phenoxy type thermoplastic (including blends), foam material (e.g., foamed PET), and/or other coating/layer suitable for contacting foodstuff. The outer layer 162 may comprise one or more of the following: foam material (including foamed PP, foamed PET, etc.), non foamed material (e.g., phenoxy type-thermoplastics, PET, PP), or other material suitable for forming the outer portion of a preform. In some embodiments, the preform 160 comprises a phenoxy type thermoplastic. In some non-limiting embodiments, the phenoxy type thermoplastic can comprise less than about 1%, 2.5%, 5%, 10%, 20%, 30%, 50%, 60%, 70%, 80%, 90%, and ranges encompassing such percentages of the preform. In some embodiments, the phenoxy type thermoplastic material comprises about 10% to 30% by weight of the preform. In some embodiments, the phenoxy type thermoplastic material comprises most of or all of the preform. The weight is for phenoxy type thermoplastic in a discrete or blend form. It is contemplated that these percentages can be by weight or by volume in different embodiments. For example, in some embodiments the layer 164 comprises phenoxy type thermoplastic that forms less than 10% of the preform. The layer 164 can have a thickness suitable for forming a food contacting layer. The thickness 174 of the inner layer 164 is preferably less than about 3.81 mm (0.150 inch) to form a cost effective food contacting layer. The thickness 174 of the inner layer 164 may be less than about 0.01 mm (0.0004 inch), 0.02 mm (0.0007 inch), 0.05 mm (0.002 inch), 0.10 mm (0.004 inch), 0.15 mm (0.006 inch), 0.20 mm (0.008 inch), 0.30 mm (0.01 inch), 0.5 mm (0.019 inch), and ranges encompassing such thicknesses. In some non-limiting embodiments, the inner layer 174 comprising phenoxy type thermoplastic having a thickness in the range of about 0.01 mm (0.0004 inches) to about 0.05 mm (0.002 inches). In some embodiments, the preform 160 may be formed by an molding process, wherein the interior portion and exterior portions of the preform comprise different materials.

In some embodiments, the outer layer 162 comprises a first material and the inner layer 164 preferably comprises another material. For example, the outer layer 162 can comprise polypropylene and the inner layer 64 can comprise PETG. In another embodiment, the polypropylene may be grafted or modified with maleic anhydride, glycidyl methacrylate, acryl methacrylate and/or similar compounds to improve adhesion. In one embodiment, the polypropylene further comprises nanoparticles. In a further embodiment, the polypropylene comprises nanoparticles and is grafted or modified with maleic anhydride, glycidyl methacrylate, acryl methacrylate and/or similar compounds.

The preform 180 (FIG. 12) may have the inner layer 184 that is similar or identical to the inner layer 164 and the outer layer 182 that is similar or identical to the outer layer 162. The preform 190 (FIG. 13) may have the inner layer 194 that is similar or identical to the inner layer 164 and the outer layer 199 that is similar or identical to the outer layer 162. The materials forming the inner layer 194 and the outer layer 199 can be selected to provide desirable interaction with the locking structure 197. The preform 202 (FIG. 14) may have layers formed of similar or identical materials as the preform 160.

The preforms and resulting containers may be particularly well suited for thermal applications, such as hot-fill processes. The container 211 of FIG. 14A can generally maintain its shape during hot-fill processes. After blow molding or hot-filling, the final dimensions of the neck portion 132 of the container 211 are substantially identical to the initial dimensions of the preform. Additionally, this results in reduced dimension variations of the threads on the neck finish. For example, the inner layer 283 can be formed of a material for contacting foodstuffs, such as PET. The outer layer 203 can comprise moldable materials (e.g., mostly or entirely of PP, PP and a foaming agent, crystalline PET, lamellar material, homopolymers, copolymers, and other materials described herein) suitable for hot-filling. The outer layer 203 provides dimensional stability to the neck finish 132 even during and after hot-filling. The width of the outer layer 203 can be increased or decreased to increase or decrease, respectively, the dimensional stability of the neck finish 132. Preferably, one of the layers forming the neck finish 132 comprises a material having high thermal stability; however, the neck finish 132 can also be made of materials having low temperature stability, especially for non hot-fill applications.

Additionally, the dimensional stability of the outer layer 203 ensures that the closure 213 remains attached to the container 211 of FIG. 14A. For example, the outer layer 203 of PP can maintain its shape thereby preventing the closure 213 from unintentionally decoupling from the container 211.

The preforms described above can be modified by adding one or more layers to achieve desired properties. For example, a barrier layer can be formed on the body portions of the preforms.

3. Articles in the Form of Closures

Closures may comprise foam material. In some non-limiting embodiments, the foam material comprises less than about 95% by weight, also including less than about 5%, 15%, 25%, 35%, 45%, 55%, 65%, 75%, 85%, and ranges encompassing such percentages of the closure. It is contemplated that these percentages can be by weight or by volume in different embodiments. In some embodiments, foam material comprising ranges encompassing these percentages by weight of the closure. In one non-limiting embodiment, the foam material comprises about 45-60% by weight of the closure. In another non-limiting embodiment, the foam material comprises about 15-70% by weight of the closure. In some embodiments, the closure comprises mostly or entirely of foam material. For example, the closure can be a monolayer closure that is made from foam material.

With reference to FIG. 19, at least a portion of the closure 302 comprises a foam material. The layer 314 and/or the outer portion 311 may comprise foam material (e.g., foamed PET, foamed PP, etc.). In one embodiment, the outer portion 311 comprises foam material and the layer 314 comprises non-foamed material (such as PP, PET, etc.).

Additionally, the inner portion of the closures may comprise foam material. In some embodiments, the outer portions of closures may or may not comprise foam material. The closures of FIGS. 21A to 21E may have similar or different inner and outer layers (or outer portions).

FIG. 21C illustrates the closure 360 that may have an intermediate layer 364 formed of materials that have desired structural, thermal, optical, barrier and/or characteristics. For example, the layer 364 can be formed of PET, PP, PET, PETG, and/or the like.

In one embodiment, a further advantage is provided where the outer portion of the closure is formed of foam material to provide a comfortable gripping surface so that a user can comfortably remove the closure from a container. The outer portion 311 of FIG. 19 can be foam to increase the space occupied by the outer portion 311 and can provide the user with greater leverage for easy opening and closing of the closure device.

The closures can have an internally threaded surface that is configured to threadably mate with an externally threaded surface of the container. The enlarged outer portion 311 of FIG. 19 can provide increased leverage such that the user can easily rotate the closure 302 onto and off of the container. Advantageously, the similar, or same, amount of material that forms a conventional cap can be used to form the enlarged diameter closure device. Thus, the cost of materials for producing the closure 302 can be reduced.

Closures may comprise phenoxy type thermoplastic materials. In some non-limiting embodiments, the phenoxy type thermoplastic material comprises less than about 25% by weight, also including less than about 1%, 2%, 4%, 5%, 10%, 15%, 20% by weight, of the closure. In some embodiments, phenoxy type thermoplastic material comprising ranges encompassing these percentages by weight of the closure. The weight is for phenoxy type thermoplastic in discrete or blend form. In one non-limiting embodiment, the phenoxy type thermoplastic material comprises about 0.5 to 5% by weight of the closure. In another non-limiting embodiment, the phenoxy type thermoplastic material comprises about 1 to 6% by weight of the closure.

The phenoxy type thermoplastic can form at least a portion of the interior surface of the closure. For example, a phenoxy type thermoplastic layer can be deposited on the interior surface 309 of the layer 314 (FIG. 19). Optionally, the layer 314 can be made of a phenoxy type thermoplastic. The phenoxy type thermoplastic can form at least a portion of the layer 344 of the closure 340 (FIG. 21A), the layer 356 of the closure 350 (FIG. 21B), the layer 366 and/or layer 364 of the closure 360 (FIG. 21C), the layer 374 of the closure 370 (FIG. 21D), the layer 383 of the closure 380 (FIG. 21E), for example. Of course, these layers may comprise material (e.g., lamellar material, PET, PP, and/or the like) that is coated with a phenoxy type thermoplastic, such a phenoxy or polyolefin-phenoxy blend.

The closures described above can have one or more barrier layers to enhance its barrier characteristics. For example, an inner layer, one or more intermediate layers, and/or exterior barrier layers can be formed by using systems and methods disclosed in U.S. application Ser. No. 10/614,731 (Publication No. 2004-0071885), which is incorporated in its entirety and describes systems and methods of forming barrier layers. In some embodiments, the materials of the closures can be modified to enhance barrier characteristics. For example, foam material may have additives (e.g., microparticulates) that improve the barrier characteristics of the foam material. A skilled artisan can select the design of the closures to achieve the desired barrier properties.

4. Articles with Tie Layers

Exemplary articles can be multilayer articles. A tie layer can be disposed between one or more portions or layers of the articles. For example, articles can have a tie layer interposed between layers of materials. Articles can have a plurality of tie layers, preferably one of the tie layers is positioned between a pair of adjacent layers. In some embodiments, a plurality of pairs of adjacent layers each have interposed therebetween one of the tie layers.

The container 83 of FIG. 6 can have a tie layer 85 (FIG. 7) between the layer 52 and the layer 54. In some non-limiting embodiments, the layer 52 comprises one or more of the following: foam material (including foamed PP, foamed PET, etc.), non foamed material (e.g., phenoxy type-thermoplastics, PET, PP), combinations thereof, or other material suitable for forming the outer portion of a preform. The layer 54 comprises one or more of the following: PET, phenoxy, polyolefin-phenoxy blend, combinations thereof, or other suitable materials suitable for forming a portion of the wall of a container. In some embodiments, outer layer 52 comprises PP (foamed or unfoamed) and the inner layer 54 comprises PET. The tie layer 85 may comprise adhesives, phenoxy type thermoplastics, polyolefins, or combinations thereof (e.g., polyolefin-phenoxy blend). The tie layer 85 can advantageously adhere to both of the layers 52, 54. Phenoxy may provide desirable adhesion between an inner layer 54 comprising PET and an outer layer 52 comprising PP, for example.

The multilayer articles illustrated in FIGS. 8-14B and 18-21E can have one or more tie layers, preferably one tie layer, is between at least two of the layers of the articles. For example, a tie layer can be interposed between the layers 52, 54 of the preform 76 (FIG. 9). A tie layer can be interposed between the layers 134, 136 and/or the preform 30 and the layer 134 of FIG. 10. The preform 160 (FIG. 11) can have a tie layer interposed between the layer 164 and the layer 162. The preform 180 (FIG. 12) can have a tie layer interposed between the layer 184 and the layer 183. The preform 190 (FIG. 13) can have a tie layer interposed between the layer 194 and the layer 199. The preform 202 (FIG. 14) can have a tie layer interposed between the layer 203 and the layer 283.

With respect to FIG. 19, the closure 302 can have a tie layer between the layer 314 and the outer portion 311. In some non-limiting embodiments, the outer portion 311 comprises one or more of the following: foam material (including foamed PP, foamed PET, etc.), non-foamed material (e.g., phenoxy type-thermoplastics, PET, PP), combinations thereof, or other materials suitable for forming the outer portion of a closure. The layer 314 comprises one or more of the following: PET, phenoxy, polyolefin-phenoxy blend, combinations thereof, or other suitable materials suitable for forming a portion of the closure. The tie layer may comprise adhesives, phenoxy, polyolefin, combinations thereof (e.g., polyolefin-phenoxy blend). Similarly, the closures illustrated in FIGS. 21A-21E can likewise have one or more tie layers, preferably at least one tie layer is between a pair of adjacent layers.

A further advantage is provided wherein a tie layer comprising a phenoxy type thermoplastic, such as a phenoxy blend, which can help compatibilization of a somewhat pure phenoxy layer and another layer. Phenoxy can effectively compatibilize with polypropylene, polyethylene, and the like.

In view of the present disclosure, a skilled artisan can select various material(s) and tie layer(s) to achieve the desired properties of an article.

5. Articles Comprising Lamellar Material

Figure 40:
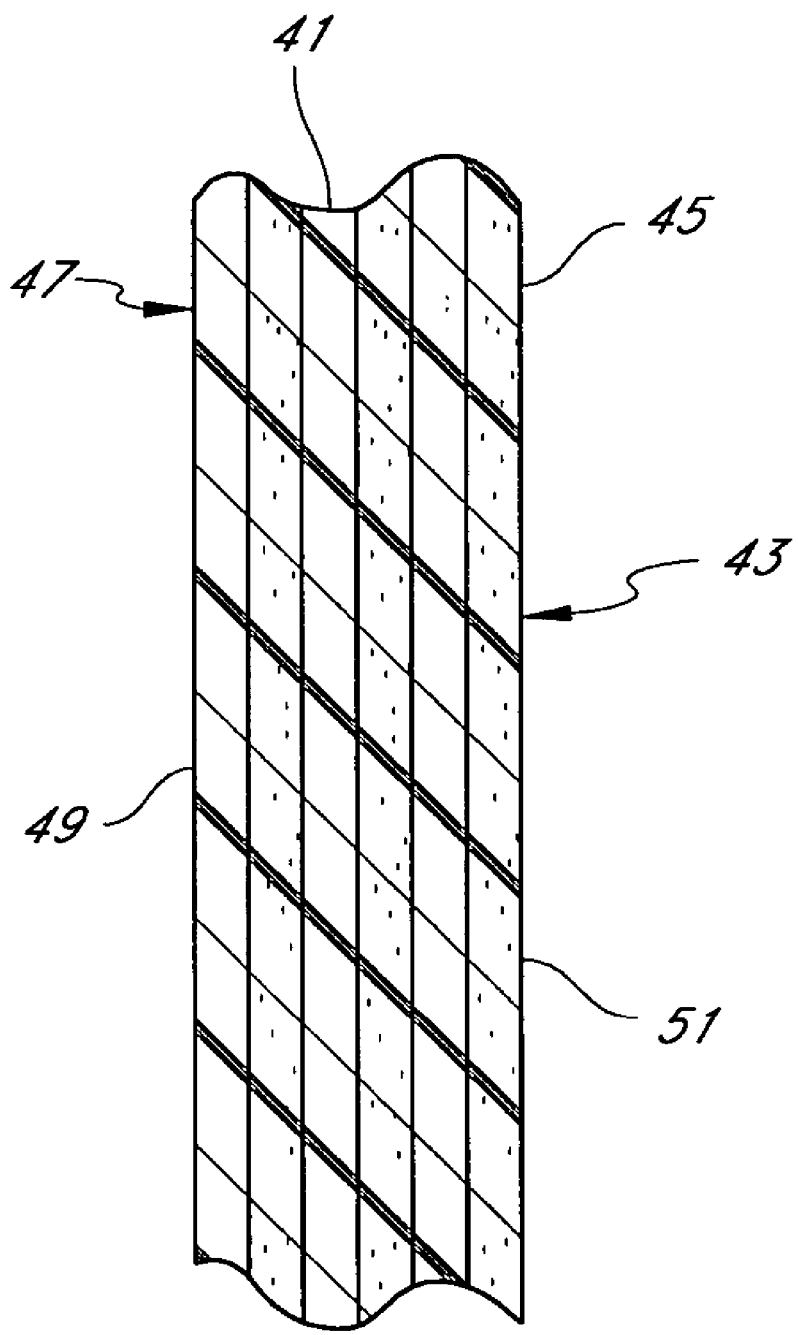
FIG. 40 is a cross sectional view of lamellar material.

Lamellar material may form one or more portions of layers of the articles (such as packaging including preforms, closures, and containers). Referring to FIG. 2, the preform 30 may comprise lamellar material. As FIG. 40 is an enlarged cross-sectional view of the wall section 43 of the preform 30. In the illustrated embodiment, the wall section 43 comprises lamellar material that includes one or more layers. Preferably, the lamellar material is made up of a plurality of microlayers. However, the layers of the lamellar material can have any suitable size based on the desired properties and characteristics of the preform, and the resulting container formed from the preform. The layers of wall section 43 can comprise generally similar or different materials to one another. One or more of the layers forming the wall section 43 can be made from materials disclosed herein, or other materials known in the art.

In the illustrated embodiment, the wall section 43 has an inner layer 47, an outer layer 45, and one or more intermediate layers 41 therebetween. In some embodiments, the inner layer 47 is suitable for contacting foodstuffs, such as virgin polyethylene terephtalate ("PET"), or other suitable material that can form the inner chamber of the bottle made from the preform 30.

Optionally, the wall section 43 can have at least one layer of a material with good gas barrier characteristics. In some embodiments, the wall section 43 of the preform 30 has a plurality of layers having good gas barrier characteristics. Advantageously, one or more layers of the wall section 43 that comprise a barrier material can inhibit or prevent ingress and/or egress of fluid through the wall of a container made from the preform 30. However, the wall section 43 can comprise a plurality of layers that do not have good barrier characteristics.

The wall section 43 of the preform 30 can have at least one layer formed from recycled or post-consumer PET ("RPET"). For example, in one embodiment, the wall section 43 can have the plurality of layers formed from RPET. In some embodiments, the inner layer 47 can be formed from virgin PET and other layers from the wall section 43 can be formed from virgin PET or RPET. Thus, the preform 30 can comprise alternating thin layers of PET, RPET, barrier material, and combinations thereof. Additionally, other materials can be used to obtain the desired characteristics and physical properties of the preform 30, or resulting container made from the preform 30.

Each of the layers of the wall section 43 can have generally the same thickness. Alternatively, the layers of the wall section 43 can have thicknesses that are generally different from each other. A skilled artisan can determine the desired number of layers, thickness of each layer, and composition of each layer of the wall section 43. In one non-limiting embodiment, the preform 30 can have a wall section 43 including more than two layers. In some preferred embodiments, the wall section 43 has more than three layers.

As shown in FIG. 40, the layers of the lamellar material forming the wall section 43 can be generally parallel to one of an inner surface 49 and an outer surface 51 of the preform 30. Portions of the lamellar material forming the body portion 34 can comprise layers that are generally parallel to the longitudinal axis of the preform 30.

The distance and/or orientation of the layers of the walls section 45 can vary or remain generally constant along the wall section 43. Additionally, the thicknesses of one or more layers of the wall section 43 also may vary, or they may be substantially constant along the preform 30. It is contemplated that one or more of the layers may have holes, openings, or diffuse into an adjacent layer.

Lamellar material can also form other monolayer and multilayer articles. Referring to FIG. 5, for example, the preform 50 can comprise an outer layer 52 and an inner layer 54 defining an interior surface of the preform 50. The outer layer 52 preferably does not extend to the neck portion 32, nor is it present on the interior surface of the preform 50 at least one of the outer layer 52 and the inner layer 54 can comprise lamellar material. In the illustrated embodiment, the outer layer 52 comprises lamellar material and the inner layer 54 comprises another material. Preferably, the inner layer 54 comprises PET, preferably virgin PET, so that the interior surface of the preform 50 is suitable for contacting foodstuffs. In another embodiment not illustrated, the inner layer 54 comprises lamellar material and the outer layer 52 comprises another material. Preferably, the inner layer 54 comprises PET that forms the interior surface. However, the inner layer 54 can comprise other materials described herein (e.g., foam material, PET including virgin PET and RPET, PP, etc.). Alternatively, both the inner layer 54 and the outer layer 52 can comprise lamellar material. Thus, various combinations of materials can be used to form the preforms disclosed herein.

The articles illustrated in FIGS. 6-17 may comprises multiple layers. One or more of the layers of these articles can comprise lamellar material. For example, the preform 60 illustrated in FIG. 8A comprises an outer layer 52 formed of lamellar material. The outer layer 52 covers the bottom surface of the support ring 38 and extends along the body portion 34.

Referring to FIG. 10, one or more of the layers 134 and 136 may comprise lamellar material. In one embodiment, for example, substantially the entire preform 132 is formed of different lamellar layers 134 and 136 that are adhered together. In some embodiments, at least one of the layers 134 and 136 comprises a lamellar material, foam material, phenoxy type thermoplastics, PET, PP (including foamed and non-foamed), and the like. Optionally, only one of the layers 134 and 136 may be formed of lamellar material.

Closures may also comprise lamellar material. The lamellar material can form a substantial portion of the closure or only a portion thereof. In some non-limiting embodiments, the lamellar material comprises less than about 95% by weight, also including less than about 5%, 15%, 25%, 35%, 45%, 55%, 65%, 75%, 85% by weight, of the closure. In some embodiments, lamellar material comprising ranges encompassing these percentages by weight of the closure.

As shown in FIG. 19, at least a portion of the closure 302 comprises a lamellar material. The layer 314 and/or the outer portion 311 may comprise lamellar material. In one embodiment, the outer portion 311 comprises lamellar material and the layer 314 comprises lamellar material (such as PP, PET, etc.). Additionally, the inner portion of the closures may comprise lamellar material. In some embodiments, the outer portions of closures may or may not comprise lamellar material. The closures of FIGS. 21A to 21E may have similar or different inner and outer layers (or outer portions).

FIG. 21C illustrates a closure 360 has the intermediate layer 364 that is formed of materials that have desired structural, thermal, optical, barrier and/or characteristics. For example, the layer 364 can be formed of lamellar material.

The lamellar material can form at least a portion of the layer 344 of the closure 340 (FIG. 21A), layer 356 of the closure 350 (FIG. 21B), layer 366 and/or layer 364 of the closure 360 (FIG. 21C), layer 374 of the closure 370 (FIG. 21D), layer 383 of the closure 380 (FIG. 21E), for example. The other portions of the closures can be formed of a similar material or different material. In some embodiments, the majority of or the entire closure comprises lamellar material.

6. Articles Comprising a Heat Resistance Layer

Articles described herein can comprise one or more heat resistant materials. As used herein the phrase "heat resistant materials" is a broad phrase and is used in its ordinary meaning and includes, without limitation, materials that may be suitable for hot-fill or warm-fill applications. For example, the heat resistant material may include high heat resistant material that has dimensional stability during a hot-fill process. The heat resistant material may include a mid heat resistant material that has dimensional stability during a warm-fill process. Heat resistant materials may include, but are not limited to, polypropylene, crystalline material, polyester, and the like. In some embodiments, heat resistant material has greater thermal dimensional stability then amorphous PET. Heat resistant material can form a portion of articles (e.g., one or more layers of a preform, container, closure, sheet, and other articles described herein.)

In some embodiments, a container comprises an inner layer, comprising a thermoplastic polyester, an outer layer, comprising a thermoplastic material (e.g., a polymer heat resistant material) having a heat resistance greater than that of the thermoplastic polyester of the inner layer, and an intermediate tie layer, providing adhesion between the inner layer and the outer layer, where the layers are co extruded prior to blow molding. Preferably, the thermoplastic polyester of the inner layer is PET, and may further comprise at least one of an oxygen scavenger and a passive barrier material blended with the thermoplastic polyester. Preferably, the passive barrier material is a polyamide, such as MXD 6.

In view of the present disclosure, a skilled artisan can select various types of lamellar material(s) to achieve the desired properties of an article made therefrom. The articles disclosed herein may be formed through any suitable means. For example, the articles can be formed through injection molding, blow molding, injection blow molding, extrusion, co-extrusion, and injection stretch blow molding, and other methods disclosed herein. The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor a skilled artisan can select various types of lamellar material(s) to achieve the desired properties of an article made therefrom. The articles disclosed herein may be formed through any suitable means. For example, the articles can be formed through injection molding, blow molding, injection blow molding, extrusion, co-extrusion, and injection stretch blow molding, and other methods disclosed herein. The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein. Instead, Applicant intends that the scope of the invention be limited solely by reference to the attached claims, and that variations on the methods and materials disclosed herein which are apparent to those of skill in the art will fall within the scope of Applicant's invention.

What is claimed is:

1. A preform comprising:
   a neck portion; and
   a body portion having a wall portion and an end cap, the body portion comprising a first layer and a second layer, the second layer comprising a partially expanded expandable material, wherein the second layer is the outermost layer of the preform
   wherein the expandable material comprises microspheres that enlarge during heat treatment.

2. The preform of claim 1, wherein the second layer comprises polyethylene, post-consumer PET or recycled PET.

3. The preform of claim 1, wherein the heat treatment comprises a preheating cycle for elevating the temperature of the preform to a temperature suitable for blow molding.

4. The preform of claim 1, wherein the expandable material comprises a polymer carrier material and a foaming agent.

5. The preform of claim 1, wherein the expandable material further comprises fully collapsed microspheres and/or fully expanded microspheres.

6. The preform of claim 1, wherein the expandable material is configured to expand to form foam when heated above an expansion temperature.

7. The preform of claim 1, wherein the expandable material comprises about 5% to about 60% by weight of the preform.

8. The preform of claim 1, wherein the first layer is selected from the group consisting of polyester, and polypropylene.

9. The preform of claim 1, wherein the first layer and the second layer are formed by injection molding.

10. The preform of claim 1, wherein the neck portion is a monolayer threaded neck finish having the same composition as the first layer.

11. The preform of claim 1, wherein the expandable material comprises mostly polypropylene by weight.

12. The preform of claim 1, wherein at least one of the first layer and the second layer comprises a barrier material.

13. The preform of claim 1, the preform further comprising a third layer disposed between the first and second layers comprising barrier material.

14. A preform comprising:
    a threaded neck portion; and
    a body portion including a wall portion and an end cap, the body portion comprising at least an innermost layer and an outermost layer, wherein the outermost layer comprises a partially expanded expandable material adapted to further expand when activated
    wherein the expandable material comprises microspheres and a carrier material.

15. The preform of claim 14, wherein the expandable material forms less than about 40% by weight of the preform.

16. The preform of claim 14, wherein the expandable material comprises less than 20% by weight of the preform.

17. The preform of claim 14, wherein the innermost layer comprises polyester or polypropylene.

18. The preform of claim 14, wherein the carrier material is selected from the group consisting of polypropylene, polyethylene terephtalate, and combinations thereof.

19. The preform of claim 14, further comprising a gas barrier material forming a layer disposed between the innermost and outermost layers.

20. The preform of claim 14, wherein the carrier material comprises post-consumer or recycled PET.

* * * * *